(12) United States Patent
Kalgi

(10) Patent No.: US 11,900,359 B2
(45) Date of Patent: Feb. 13, 2024

(54) ELECTRONIC WALLET CHECKOUT PLATFORM APPARATUSES, METHODS AND SYSTEMS

(71) Applicant: VISA INTERNATIONAL SERVICE ASSOCIATION, San Francisco, CA (US)

(72) Inventor: Avinash Kalgi, Kirkland, WA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 17/321,773

(22) Filed: May 17, 2021

(65) Prior Publication Data

US 2021/0272101 A1 Sep. 2, 2021

Related U.S. Application Data

(63) Continuation of application No. 16/140,879, filed on Sep. 25, 2018, now Pat. No. 11,010,753, which is a
(Continued)

(51) Int. Cl.
*G06Q 20/36* (2012.01)
*G06Q 20/20* (2012.01)
(Continued)

(52) U.S. Cl.
CPC .............. *G06Q 20/36* (2013.01); *G06Q 20/12* (2013.01); *G06Q 20/20* (2013.01); *G06Q 20/325* (2013.01);
(Continued)

(58) Field of Classification Search
None
See application file for complete search history.

(56) References Cited

U.S. PATENT DOCUMENTS 789,106 A 5/1905 Seymour
4,896,363 A 1/1990 Taylor
(Continued)

FOREIGN PATENT DOCUMENTS

CN 1841425 A 10/2006
CN 1922623 A 2/2007
(Continued)

OTHER PUBLICATIONS

Ruiz-Martínez, A., Cánovas, Ó., & Gómez-Skarmeta, A.,F. (2009). Design and implementation of a generic per-fee-link framework. Internet Research, 19(3), 293-312. doi:https://doi.org/10.1108/10662240910965360 (Year: 2009).*

(Continued)

*Primary Examiner* — Joseph W. King
*Assistant Examiner* — Carol A See
(74) *Attorney, Agent, or Firm* — K&L Gates LLP

(57) ABSTRACT

The ELECTRONIC WALLET CHECKOUT PLATFORM APPARATUSES, METHODS AND SYSTEMS ("EWCP") transform customer purchase requests triggering electronic wallet applications via EWCP components into electronic purchase confirmation and receipts. In one implementation, the EWCP receives a merchant payment request, and determines a payment protocol handler associated with the merchant payment request. The EWCP instantiates a wallet application via the payment protocol handler. The EWCP obtains a payment method selection via the wallet application, wherein the selected payment method is one of a credit card, a debit card, a gift card selected from an electronic wallet, and sends a transaction execution request for a transaction associated with the merchant payment request. Also, the EWCP receives a purchase response to the transaction execution request, and outputs purchase response information derived from the received purchase response.

10 Claims, 44 Drawing Sheets

Example: E-Wallet Checkout Data Flow

Related U.S. Application Data continuation of application No. 13/542,443, filed on Jul. 5, 2012, now Pat. No. 10,121,129.

(60) Provisional application No. 61/504,348, filed on Jul. 5, 2011.

(51) Int. Cl.

| | |
|---|---|
| *G06Q 20/32* | (2012.01) |
| *G06Q 20/42* | (2012.01) |
| *G06Q 30/0601* | (2023.01) |
| *G06Q 20/12* | (2012.01) |
| *G06Q 20/34* | (2012.01) |

(52) U.S. Cl.
CPC ..... *G06Q 20/3226* (2013.01); *G06Q 20/3276* (2013.01); *G06Q 20/3278* (2013.01); *G06Q 20/34* (2013.01); *G06Q 20/363* (2013.01); *G06Q 20/425* (2013.01); *G06Q 30/0601* (2013.01)

(56) References Cited

U.S. PATENT DOCUMENTS

| | | |
|---|---|---|
| 5,177,342 A | 1/1993 | Adams |
| 5,221,838 A | 6/1993 | Gutman |
| 5,237,164 A | 8/1993 | Takada |
| 5,311,594 A | 5/1994 | Penzias |
| 5,383,113 A | 1/1995 | Kight |
| 5,384,449 A | 1/1995 | Peirce |
| 5,446,890 A | 8/1995 | Renslo |
| 5,459,656 A | 10/1995 | Fields |
| 5,500,513 A | 3/1996 | Langhans |
| 5,510,777 A | 4/1996 | Pilc |
| 5,521,362 A | 5/1996 | Powers |
| 5,526,409 A | 6/1996 | Conrow |
| 5,530,438 A | 6/1996 | Bickham |
| 5,536,045 A | 7/1996 | Adams |
| 5,590,038 A | 12/1996 | Pitroda |
| 5,613,012 A | 3/1997 | Hoffman |
| 5,615,110 A | 3/1997 | Wong |
| 5,615,264 A | 3/1997 | Kazmierczak |
| 5,621,201 A | 4/1997 | Langhans |
| 5,640,193 A | 6/1997 | Wellner |
| 5,649,118 A | 7/1997 | Carlisle |
| 5,655,007 A | 8/1997 | McAllister |
| 5,748,737 A | 5/1998 | Daggar |
| 5,781,438 A | 7/1998 | Lee |
| 5,796,832 A | 8/1998 | Kawan |
| 5,815,657 A | 9/1998 | Williams |
| 5,850,446 A | 12/1998 | Berger |
| 5,878,337 A | 3/1999 | Joao |
| 5,883,810 A | 3/1999 | Franklin |
| 5,884,271 A | 3/1999 | Pitroda |
| 5,892,838 A | 4/1999 | Brady |
| 5,903,830 A | 5/1999 | Joao |
| 5,914,472 A | 6/1999 | Foladare |
| 5,943,624 A | 8/1999 | Fox |
| 5,953,710 A | 9/1999 | Fleming |
| 5,956,699 A | 9/1999 | Wong |
| 5,963,924 A | 10/1999 | Williams |
| 6,000,832 A | 12/1999 | Franklin |
| 6,006,200 A | 12/1999 | Boies |
| 6,014,635 A | 1/2000 | Harris |
| 6,044,360 A | 3/2000 | Picciallo |
| 6,052,675 A | 4/2000 | Checchio |
| 6,064,990 A | 5/2000 | Goldsmith |
| 6,092,053 A | 7/2000 | Boesch |
| 6,160,903 A | 12/2000 | Hamid |
| 6,161,130 A | 12/2000 | Horvitz |
| 6,163,771 A | 12/2000 | Walker |
| 6,164,533 A | 12/2000 | Barton |
| 6,182,894 B1 | 2/2001 | Hackett |
| 6,193,155 B1 | 2/2001 | Walker |
| 6,195,447 B1 | 2/2001 | Ross |
| 6,202,052 B1 | 3/2001 | Miller |
| 6,202,933 B1 | 3/2001 | Poore |
| 6,226,624 B1 | 5/2001 | Watson |
| 6,227,447 B1 | 5/2001 | Campisano |
| 6,236,981 B1 | 5/2001 | Hill |
| 6,243,688 B1 | 6/2001 | Kalina |
| 6,263,447 B1 | 7/2001 | French |
| 6,267,292 B1 | 7/2001 | Walker |
| 6,327,578 B1 | 12/2001 | Linehan |
| 6,336,099 B1 | 1/2002 | Barnett |
| 6,339,766 B1 | 1/2002 | Gephart |
| 6,341,724 B2 | 1/2002 | Campisano |
| 6,381,584 B1 | 4/2002 | Ogram |
| 6,385,596 B1 | 5/2002 | Wiser |
| 6,385,655 B1 | 5/2002 | Smith |
| 6,422,462 B1 | 7/2002 | Cohen |
| 6,425,523 B1 | 7/2002 | Shem-Ur |
| 6,439,345 B1 | 8/2002 | Recktenwald |
| 6,456,984 B1 | 9/2002 | Demoff |
| 6,473,500 B1 | 10/2002 | Risafi |
| 6,529,725 B1 | 3/2003 | Joao |
| 6,535,855 B1 | 3/2003 | Cahill |
| 6,560,581 B1 | 5/2003 | Fox |
| 6,592,044 B1 | 7/2003 | Wong |
| 6,601,761 B1 | 8/2003 | Katis |
| 6,636,833 B1 | 10/2003 | Flitcroft |
| 6,735,572 B2 | 5/2004 | Landesmann |
| 6,748,367 B1 | 6/2004 | Lee |
| 6,805,287 B2 | 10/2004 | Bishop |
| 6,853,982 B2 | 2/2005 | Smith |
| 6,857,073 B2 | 2/2005 | French |
| 6,865,522 B1 | 3/2005 | Gastiger |
| 6,873,974 B1 | 3/2005 | Schutzer |
| 6,879,965 B2 | 4/2005 | Fung |
| 6,891,953 B1 | 5/2005 | Demello |
| 6,898,598 B2 | 5/2005 | Himmel |
| 6,901,387 B2 | 5/2005 | Wells |
| 6,925,439 B1 | 8/2005 | Pitroda |
| 6,931,382 B2 | 8/2005 | Laage |
| 6,934,528 B2 | 8/2005 | Loureiro |
| 6,938,019 B1 | 8/2005 | Uzo |
| 6,941,285 B2 | 9/2005 | Sarcanin |
| 6,944,595 B1 | 9/2005 | Graser |
| 6,980,670 B1 | 12/2005 | Hoffman |
| 6,990,470 B2 | 1/2006 | Hogan |
| 6,991,157 B2 | 1/2006 | Bishop |
| 6,999,943 B1 | 2/2006 | Johnson |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,051,929 B2 | 5/2006 | Li |
| 7,069,249 B2 | 6/2006 | Stolfo |
| 7,089,208 B1 | 8/2006 | Levchin |
| 7,096,003 B2 | 8/2006 | Joao |
| 7,103,576 B2 | 9/2006 | Mann |
| 7,111,789 B2 | 9/2006 | Rajasekaran |
| 7,113,930 B2 | 9/2006 | Eccles |
| 7,117,172 B1 | 10/2006 | Black |
| 7,136,835 B1 | 11/2006 | Flitcroft |
| 7,155,411 B1 | 12/2006 | Blinn |
| 7,156,311 B2 | 1/2007 | Attia |
| 7,167,903 B2 | 1/2007 | Percival |
| 7,177,835 B1 | 2/2007 | Walker |
| 7,177,848 B2 | 2/2007 | Hogan |
| 7,180,457 B2 | 2/2007 | Trott |
| 7,194,437 B1 | 3/2007 | Britto |
| 7,206,847 B1 | 4/2007 | Alberth |
| 7,209,561 B1 | 4/2007 | Shankar |
| 7,212,979 B1 | 5/2007 | Matz |
| 7,228,011 B1 | 6/2007 | Queeno |
| RE39,736 E | 7/2007 | Morrill |
| 7,264,154 B2 | 9/2007 | Harris |
| 7,266,557 B2 | 9/2007 | Aschen |
| 7,268,667 B2 | 9/2007 | Beenau |
| 7,268,668 B2 | 9/2007 | Beenau |
| 7,287,692 B1 | 10/2007 | Patel |
| 7,290,704 B1 | 11/2007 | Ball |
| 7,292,999 B2 | 11/2007 | Hobson |

(56) References Cited

U.S. PATENT DOCUMENTS

| | | |
|---|---|---|
| 7,313,546 B2 | 12/2007 | Alarcon-Luther |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,350,230 B2 | 3/2008 | Forrest |
| 7,353,382 B2 | 4/2008 | Labrou |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,379,919 B2 | 5/2008 | Hogan |
| 7,392,222 B1 | 6/2008 | Hamilton |
| RE40,444 E | 7/2008 | Linehan |
| 7,395,242 B2 | 7/2008 | Blinn |
| 7,398,250 B2 | 7/2008 | Blinn |
| 7,413,113 B1 | 8/2008 | Zhu |
| 7,415,443 B2 | 8/2008 | Hobson |
| 7,415,469 B2 | 8/2008 | Singh |
| 7,427,021 B2 | 9/2008 | Kemper |
| 7,444,676 B1 | 10/2008 | Asghari-Kamrani |
| 7,450,966 B2 | 11/2008 | Vanska |
| 7,469,151 B2 | 12/2008 | Khan |
| 7,477,780 B2 | 1/2009 | Boncyk |
| 7,499,889 B2 | 3/2009 | Golan |
| 7,500,607 B2 | 3/2009 | Williams |
| 7,505,935 B2 | 3/2009 | Mendiola |
| 7,533,064 B1 | 5/2009 | Boesch |
| 7,536,318 B1 | 5/2009 | Wolfe |
| 7,536,335 B1 | 5/2009 | Weston |
| 7,536,360 B2 | 5/2009 | Stolfo |
| 7,540,012 B1 | 5/2009 | Herzberg |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,140 B2 | 8/2009 | Weichert |
| 7,571,142 B1 | 8/2009 | Flitcroft |
| 7,580,898 B2 | 8/2009 | Brown |
| 7,584,153 B2 | 9/2009 | Brown |
| 7,593,858 B2 | 9/2009 | Matz |
| 7,593,896 B1 | 9/2009 | Flitcroft |
| 7,603,311 B1 | 10/2009 | Yadav-Ranjan |
| 7,606,560 B2 | 10/2009 | Labrou |
| 7,627,531 B2 | 12/2009 | Breck |
| 7,627,895 B2 | 12/2009 | Gifford |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,650,314 B1 | 1/2010 | Saunders |
| 7,660,749 B2 | 2/2010 | Koski |
| 7,664,733 B2 | 2/2010 | Erol |
| 7,668,754 B1 | 2/2010 | Bridgelall |
| 7,669,760 B1 | 3/2010 | Zettner |
| 7,676,434 B2 | 3/2010 | Evans |
| 7,685,037 B2 | 3/2010 | Reiners |
| 7,685,067 B1 | 3/2010 | Britto |
| 7,698,221 B2 | 4/2010 | Blinn |
| 7,702,578 B2 | 4/2010 | Fung |
| 7,707,113 B1 | 4/2010 | Dimartino |
| 7,707,120 B2 | 4/2010 | Dominguez |
| 7,708,194 B2 | 5/2010 | Vawter |
| 7,708,198 B2 | 5/2010 | Gangi |
| 7,712,655 B2 | 5/2010 | Wong |
| 7,712,658 B2 | 5/2010 | Gangi |
| 7,720,436 B2 | 5/2010 | Hamynen |
| 7,734,527 B2 | 6/2010 | Uzo |
| 7,739,194 B2 | 6/2010 | Blinn |
| 7,742,984 B2 | 6/2010 | Mohsenzadeh |
| 7,753,265 B2 | 7/2010 | Harris |
| 7,770,789 B2 | 8/2010 | Oder |
| 7,774,076 B2 | 8/2010 | Skowronek |
| 7,783,569 B2 | 8/2010 | Abel |
| 7,784,684 B2 | 8/2010 | Labrou |
| 7,784,685 B1 | 8/2010 | Hopkins |
| 7,793,851 B2 | 9/2010 | Mullen |
| 7,797,215 B1 | 9/2010 | Zerenner |
| 7,801,826 B2 | 9/2010 | Labrou |
| 7,801,829 B2 | 9/2010 | Gray |
| 7,802,719 B2 | 9/2010 | Johnson |
| 7,805,376 B2 | 9/2010 | Smith |
| 7,805,378 B2 | 9/2010 | Berardi |
| 7,810,720 B2 | 10/2010 | Lovett |
| 7,818,264 B2 | 10/2010 | Hammad |
| 7,819,307 B2 | 10/2010 | Lyons |
| 7,827,288 B2 | 11/2010 | Da |
| 7,828,206 B2 | 11/2010 | Hessburg |
| 7,828,220 B2 | 11/2010 | Mullen |
| 7,828,992 B2 | 11/2010 | Kilickiran |
| 7,835,960 B2 | 11/2010 | Breck |
| 7,837,125 B2 | 11/2010 | Biskupski |
| 7,841,523 B2 | 11/2010 | Oder |
| 7,841,539 B2 | 11/2010 | Hewton |
| 7,844,530 B2 | 11/2010 | Ziade |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,870,027 B1 | 1/2011 | Tannenbaum |
| 7,873,579 B2 | 1/2011 | Hobson |
| 7,873,580 B2 | 1/2011 | Hobson |
| 7,877,299 B2 | 1/2011 | Bui |
| 7,878,400 B2 | 2/2011 | Harris |
| 7,890,370 B2 | 2/2011 | Whitsitt |
| 7,890,393 B2 | 2/2011 | Talbert |
| 7,891,563 B2 | 2/2011 | Oder |
| 7,895,119 B2 | 2/2011 | Praisner |
| 7,896,238 B2 | 3/2011 | Fein |
| 7,899,744 B2 | 3/2011 | Bishop |
| 7,904,360 B2 | 3/2011 | Evans |
| 7,908,216 B1 | 3/2011 | Davis |
| 7,908,227 B2 | 3/2011 | Zizzimopoulos |
| 7,922,082 B2 | 4/2011 | Muscato |
| 7,926,714 B1 | 4/2011 | Zhu |
| 7,931,195 B2 | 4/2011 | Mullen |
| 7,933,779 B2 | 4/2011 | Rooks |
| 7,937,324 B2 | 5/2011 | Patterson |
| 7,938,318 B2 | 5/2011 | Fein |
| 7,942,337 B2 | 5/2011 | Jain |
| 7,954,705 B2 | 6/2011 | Mullen |
| 7,959,076 B1 | 6/2011 | Hopkins |
| 7,962,418 B1 | 6/2011 | Wei |
| 7,963,441 B2 | 6/2011 | Emmons |
| 7,967,196 B1 | 6/2011 | Bierbaum |
| 7,971,782 B1 | 7/2011 | Shams |
| 7,996,259 B1 | 8/2011 | Distefano, III |
| 7,996,288 B1 | 8/2011 | Stolfo |
| 8,016,192 B2 | 9/2011 | Messerges |
| 8,020,763 B1 | 9/2011 | Kowalchyk |
| 8,024,260 B1 | 9/2011 | Hogl |
| 8,025,223 B2 | 9/2011 | Saunders |
| 8,028,041 B2 | 9/2011 | Olliphant |
| 8,032,438 B1 | 10/2011 | Barton |
| 8,041,338 B2 | 10/2011 | Chen |
| 8,046,256 B2 | 10/2011 | Chien |
| 8,050,997 B1 | 11/2011 | Nosek |
| 8,060,413 B2 | 11/2011 | Castell |
| 8,060,448 B2 | 11/2011 | Jones |
| 8,060,449 B1 | 11/2011 | Zhu |
| 8,073,565 B2 | 12/2011 | Johnson |
| 8,074,876 B2 | 12/2011 | Foss |
| 8,074,877 B2 | 12/2011 | Mullen |
| 8,074,879 B2 | 12/2011 | Harris |
| 8,082,210 B2 | 12/2011 | Hansen |
| 8,090,351 B2 | 1/2012 | Klein |
| 8,095,113 B2 | 1/2012 | Kean |
| 8,095,602 B1 | 1/2012 | Orbach |

(56) References Cited

U.S. PATENT DOCUMENTS

| | | |
|---|---|---|
| 8,104,679 B2 | 1/2012 | Brown |
| 8,108,261 B2 | 1/2012 | Carlier |
| RE43,157 E | 2/2012 | Bishop |
| 8,109,436 B1 | 2/2012 | Hopkins |
| 8,117,127 B1 | 2/2012 | Sanders |
| 8,121,942 B2 | 2/2012 | Carlson |
| 8,121,956 B2 | 2/2012 | Carlson |
| 8,126,449 B2 | 2/2012 | Beenau |
| 8,127,982 B1 | 3/2012 | Casey |
| 8,131,666 B2 | 3/2012 | Obrien |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,171,525 B1 | 5/2012 | Pelly |
| 8,175,235 B2 | 5/2012 | Mumford |
| 8,175,965 B2 | 5/2012 | Moore |
| 8,175,967 B2 | 5/2012 | Oleary |
| 8,175,968 B2 | 5/2012 | Oleary |
| 8,175,973 B2 | 5/2012 | Davis |
| 8,175,975 B2 | 5/2012 | Cai |
| 8,175,979 B2 | 5/2012 | Baentsch |
| 8,176,416 B1 | 5/2012 | Williams |
| 8,176,554 B1 | 5/2012 | Kennedy |
| 8,179,563 B2 | 5/2012 | King |
| 8,180,289 B1 | 5/2012 | Glickman |
| 8,180,705 B2 | 5/2012 | Kowalchyk |
| 8,180,804 B1 | 5/2012 | Narayanan |
| 8,190,513 B2 | 5/2012 | Felger |
| 8,190,523 B2 | 5/2012 | Patterson |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,196,813 B2 | 6/2012 | Vadhri |
| 8,200,582 B1 | 6/2012 | Zhu |
| 8,200,868 B1 | 6/2012 | Maarten |
| 8,204,774 B2 | 6/2012 | Chwast |
| 8,204,829 B2 | 6/2012 | Alvarez |
| 8,205,791 B2 | 6/2012 | Randazza |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,489 B2 | 7/2012 | Patterson |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,385 B2 | 7/2012 | Chow |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,852 B2 | 7/2012 | Carlson |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,245,139 B2 | 8/2012 | Michelman |
| 8,249,925 B2 | 8/2012 | Broms |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,265,993 B2 | 9/2012 | Chien |
| 8,275,704 B2 | 9/2012 | Bishop |
| 8,280,777 B2 | 10/2012 | Mengerink |
| 8,281,991 B2 | 10/2012 | Wentker |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,321,364 B1 | 11/2012 | Gharpure |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,328,095 B2 | 12/2012 | Oder |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,336,088 B2 | 12/2012 | Raj |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,346,666 B2 | 1/2013 | Lindelsee |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |

(56) References Cited

U.S. PATENT DOCUMENTS

| | | |
|---|---|---|
| 8,364,587 B2 | 1/2013 | Nuzum |
| 8,364,590 B1 | 1/2013 | Casey |
| 8,370,264 B1 | 2/2013 | Wei |
| 8,376,225 B1 | 2/2013 | Hopkins |
| 8,380,177 B2 | 2/2013 | Laracey |
| 8,380,349 B1 | 2/2013 | Hickman |
| 8,386,078 B1 | 2/2013 | Hickman |
| 8,387,873 B2 | 3/2013 | Saunders |
| 8,396,750 B1 | 3/2013 | Hariharan |
| 8,396,810 B1 | 3/2013 | Cook |
| 8,401,539 B2 | 3/2013 | Beenau |
| 8,401,898 B2 | 3/2013 | Chien |
| 8,401,904 B1 | 3/2013 | Simakov |
| 8,402,555 B2 | 3/2013 | Grecia |
| 8,403,211 B2 | 3/2013 | Brooks |
| 8,412,586 B1 | 4/2013 | Foulser |
| 8,412,623 B2 | 4/2013 | Moon |
| 8,412,630 B2 | 4/2013 | Ross |
| 8,412,837 B1 | 4/2013 | Emigh |
| 8,417,633 B1 | 4/2013 | Chmara |
| 8,417,642 B2 | 4/2013 | Oren |
| 8,423,462 B1 | 4/2013 | Amacker |
| 8,429,521 B2 | 4/2013 | Lloyd |
| 8,437,633 B2 | 4/2013 | Chmara |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand |
| 8,504,478 B2 | 8/2013 | Saunders |
| 8,510,816 B2 | 8/2013 | Quach |
| 8,433,116 B2 | 9/2013 | Davis |
| 8,527,360 B2 | 9/2013 | Groat |
| 8,533,860 B1 | 9/2013 | Grecia |
| 8,538,845 B2 | 9/2013 | Liberty |
| 8,555,079 B2 | 10/2013 | Shablygin |
| 8,560,004 B1 | 10/2013 | Tsvetkov |
| 8,566,168 B1 | 10/2013 | Bierbaum |
| 8,567,670 B2 | 10/2013 | Stanfield |
| 8,571,937 B2 | 10/2013 | Rose |
| 8,571,939 B2 | 10/2013 | Lindsey |
| 8,577,336 B2 | 11/2013 | Mechaley |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,612,325 B2 | 12/2013 | Stacy |
| 8,615,468 B2 | 12/2013 | Varadarajan |
| 8,620,754 B2 | 12/2013 | Fisher |
| 8,627,420 B2 | 1/2014 | Furlan |
| 8,635,157 B2 | 1/2014 | Smith |
| 8,639,621 B1 | 1/2014 | Ellis |
| 8,646,059 B1 | 2/2014 | Von Behren |
| 8,651,374 B2 | 2/2014 | Brabson |
| 8,656,180 B2 | 2/2014 | Shablygin |
| 8,661,495 B2 | 2/2014 | Reisman |
| 8,662,384 B2 | 3/2014 | Dodin |
| 8,739,016 B1 | 5/2014 | Goldman |
| 8,751,391 B2 | 6/2014 | Freund |
| 8,762,263 B2 | 6/2014 | Gauthier |
| 8,762,288 B2 | 6/2014 | Dill |
| 8,793,186 B2 | 7/2014 | Patterson |
| 8,838,982 B2 | 9/2014 | Carlson |
| 8,856,539 B2 | 10/2014 | Weiss |
| 8,887,308 B2 | 11/2014 | Grecia |
| 8,893,009 B2 | 11/2014 | Raleigh |
| 9,008,616 B2 | 4/2015 | Wall |
| 9,065,643 B2 | 6/2015 | Hurry |
| 9,070,129 B2 | 6/2015 | Sheets |
| 9,082,119 B2 | 7/2015 | Ortiz |
| 9,100,826 B2 | 8/2015 | Weiss |
| 9,105,050 B2 | 8/2015 | Tietzen |
| 9,160,741 B2 | 10/2015 | Wentker |
| 9,195,750 B2 | 11/2015 | Hayden |
| 9,229,964 B2 | 1/2016 | Stevelinck |
| 9,245,267 B2 | 1/2016 | Singh |
| 9,249,241 B2 | 2/2016 | Dai |
| 9,256,871 B2 | 2/2016 | Anderson |
| 9,280,765 B2 | 3/2016 | Hammad |
| 9,307,342 B2 | 4/2016 | Sojoodi |
| 9,324,098 B1 | 4/2016 | Agrawal |
| 9,355,393 B2 | 5/2016 | Purves |
| 9,448,972 B2 | 9/2016 | Greenberg |
| 9,524,089 B1 | 12/2016 | Ghosh |
| 9,530,137 B2 | 12/2016 | Weiss |
| 9,582,598 B2 | 2/2017 | Kalgi |
| 9,626,351 B2 | 4/2017 | Davis |
| 9,710,807 B2 | 7/2017 | Theurer |
| 9,772,987 B2 | 9/2017 | Davis |
| 9,804,834 B1 | 10/2017 | Lopyrev |
| 9,830,590 B2 | 11/2017 | Grigg |
| 9,846,863 B2 | 12/2017 | Grossi |
| 9,904,537 B2 | 2/2018 | Lopyrev |
| 9,959,531 B2 | 5/2018 | Purves |
| 10,121,129 B2 | 11/2018 | Kalgi |
| 10,154,084 B2 | 12/2018 | Kalgi |
| 10,223,691 B2 | 3/2019 | Katzin |
| 10,360,561 B2 | 7/2019 | Poon |
| 10,586,227 B2 | 3/2020 | Makhdumi |
| 10,699,290 B1 | 6/2020 | Varadarajan |
| 10,825,001 B2 | 11/2020 | Purves |
| 11,144,905 B1 | 10/2021 | Wilkinson |
| 2001/0029485 A1 | 10/2001 | Brody |
| 2001/0034720 A1 | 10/2001 | Armes |
| 2001/0037297 A1 | 11/2001 | McNair |
| 2001/0049635 A1 | 12/2001 | Chung |
| 2001/0054003 A1 | 12/2001 | Chien |
| 2001/0056359 A1 | 12/2001 | Abreu |
| 2001/0056409 A1 | 12/2001 | Bellovin |
| 2002/0002522 A1 | 1/2002 | Clift |
| 2002/0004783 A1 | 1/2002 | Paltenghe |
| 2002/0007320 A1 | 1/2002 | Hogan |
| 2002/0016749 A1 | 2/2002 | Borecki |
| 2002/0026575 A1 | 2/2002 | Wheeler |
| 2002/0029193 A1 | 3/2002 | Ranjan |
| 2002/0035548 A1 | 3/2002 | Hogan |
| 2002/0040325 A1 | 4/2002 | Takae |
| 2002/0046184 A1 | 4/2002 | Villaret |
| 2002/0052778 A1 | 5/2002 | Murphy |
| 2002/0069122 A1 | 6/2002 | Yun |
| 2002/0073045 A1 | 6/2002 | Rubin |
| 2002/0077976 A1 | 6/2002 | Meyer |
| 2002/0077978 A1 | 6/2002 | Oleary |
| 2002/0087894 A1 | 7/2002 | Foley |
| 2002/0099642 A1 | 7/2002 | Schwanki |
| 2002/0099647 A1 | 7/2002 | Howorka |
| 2002/0099656 A1 | 7/2002 | Poh Wong |
| 2002/0107755 A1 | 8/2002 | Steed |
| 2002/0111919 A1 | 8/2002 | Weller |
| 2002/0112014 A1 | 8/2002 | Bennett |
| 2002/0116271 A1 | 8/2002 | Mankoff |
| 2002/0116341 A1 | 8/2002 | Hogan |
| 2002/0120864 A1 | 8/2002 | Wu |
| 2002/0128977 A1 | 9/2002 | Nambiar |
| 2002/0133467 A1 | 9/2002 | Hobson |
| 2002/0138290 A1 | 9/2002 | Metcalfe |
| 2002/0138445 A1 | 9/2002 | Laage |
| 2002/0141575 A1 | 10/2002 | Hird |
| 2002/0143614 A1 | 10/2002 | Maclean |
| 2002/0147913 A1 | 10/2002 | Lun Yip |

(56) References Cited

U.S. PATENT DOCUMENTS

| | | |
|---|---|---|
| 2002/0174030 A1 | 11/2002 | Praisner |
| 2002/0178370 A1 | 11/2002 | Gurevich |
| 2002/0194081 A1 | 12/2002 | Perkowski |
| 2003/0014307 A1 | 1/2003 | Heng |
| 2003/0018524 A1 | 1/2003 | Fishman |
| 2003/0026404 A1 | 2/2003 | Joyce |
| 2003/0028451 A1 | 2/2003 | Ananian |
| 2003/0028481 A1 | 2/2003 | Flitcroft |
| 2003/0055785 A1 | 3/2003 | Lahiri |
| 2003/0080185 A1 | 5/2003 | Werther |
| 2003/0097318 A1 | 5/2003 | Yu |
| 2003/0101134 A1 | 5/2003 | Liu |
| 2003/0126076 A1 | 7/2003 | Kwok |
| 2003/0130955 A1 | 7/2003 | Hawthorne |
| 2003/0144935 A1 | 7/2003 | Sobek |
| 2003/0174823 A1 | 9/2003 | Justice |
| 2003/0177361 A1 | 9/2003 | Wheeler |
| 2003/0179230 A1 | 9/2003 | Seidman |
| 2003/0191709 A1 | 10/2003 | Elston |
| 2003/0191711 A1 | 10/2003 | Jamison |
| 2003/0191945 A1 | 10/2003 | Keech |
| 2003/0195659 A1 | 10/2003 | Kasuga |
| 2003/0200142 A1 | 10/2003 | Hicks |
| 2003/0200184 A1 | 10/2003 | Dominguez |
| 2003/0212589 A1 | 11/2003 | Kish |
| 2003/0212642 A1 | 11/2003 | Weller |
| 2003/0216996 A1 | 11/2003 | Cummings |
| 2003/0220835 A1 | 11/2003 | Barnes |
| 2004/0010462 A1 | 1/2004 | Moon |
| 2004/0030601 A1 | 2/2004 | Pond |
| 2004/0050928 A1 | 3/2004 | Bishop |
| 2004/0059682 A1 | 3/2004 | Hasumi |
| 2004/0068443 A1 | 4/2004 | Hopson |
| 2004/0078332 A1 | 4/2004 | Ferguson |
| 2004/0093281 A1 | 5/2004 | Silverstein |
| 2004/0103037 A1 | 5/2004 | Wetmore |
| 2004/0103063 A1 | 5/2004 | Takayama |
| 2004/0111698 A1 | 6/2004 | Soong |
| 2004/0128197 A1 | 7/2004 | Bam |
| 2004/0138999 A1 | 7/2004 | Friedman |
| 2004/0139008 A1 | 7/2004 | Mascavage |
| 2004/0143532 A1 | 7/2004 | Lee |
| 2004/0148255 A1 | 7/2004 | Beck |
| 2004/0158532 A1 | 8/2004 | Breck |
| 2004/0204128 A1 | 10/2004 | Zakharia |
| 2004/0210449 A1 | 10/2004 | Breck |
| 2004/0210498 A1 | 10/2004 | Freund |
| 2004/0215560 A1 | 10/2004 | Amalraj |
| 2004/0215963 A1 | 10/2004 | Kaplan |
| 2004/0230536 A1 | 11/2004 | Fung |
| 2004/0232225 A1 | 11/2004 | Bishop |
| 2004/0236646 A1 | 11/2004 | Wu |
| 2004/0236819 A1 | 11/2004 | Anati |
| 2004/0243520 A1 | 12/2004 | Bishop |
| 2004/0254891 A1 * | 12/2004 | Blinn .................... G06Q 20/12 705/67 |
| 2004/0260646 A1 | 12/2004 | Berardi |
| 2004/0267608 A1 | 12/2004 | Mansfield |
| 2004/0267655 A1 | 12/2004 | Davidowitz |
| 2004/0267878 A1 | 12/2004 | Osias |
| 2005/0010483 A1 | 1/2005 | Ling |
| 2005/0037735 A1 | 2/2005 | Courts |
| 2005/0038724 A1 | 2/2005 | Roever |
| 2005/0065819 A1 | 3/2005 | Pamela |
| 2005/0080730 A1 | 4/2005 | Sorrentino |
| 2005/0080732 A1 | 4/2005 | Warin |
| 2005/0080747 A1 | 4/2005 | Anderson |
| 2005/0080821 A1 | 4/2005 | Breil |
| 2005/0097320 A1 | 5/2005 | Golan |
| 2005/0101309 A1 | 5/2005 | Croome |
| 2005/0102188 A1 | 5/2005 | Hutchison |
| 2005/0108178 A1 | 5/2005 | York |
| 2005/0114784 A1 | 5/2005 | Spring |
| 2005/0137969 A1 | 6/2005 | Shah |
| 2005/0144082 A1 | 6/2005 | Coolman |
| 2005/0171894 A1 | 8/2005 | Traynor |
| 2005/0171898 A1 | 8/2005 | Bishop |
| 2005/0184145 A1 | 8/2005 | Law |
| 2005/0187873 A1 | 8/2005 | Labrou |
| 2005/0192893 A1 | 9/2005 | Keeling |
| 2005/0192895 A1 | 9/2005 | Rogers |
| 2005/0199709 A1 | 9/2005 | Linlor |
| 2005/0220326 A1 | 10/2005 | Sim |
| 2005/0234817 A1 | 10/2005 | Vanfleet |
| 2005/0246278 A1 | 11/2005 | Gerber |
| 2005/0246293 A1 | 11/2005 | Ong |
| 2005/0251446 A1 | 11/2005 | Jiang |
| 2005/0254714 A1 | 11/2005 | Anne |
| 2005/0256802 A1 | 11/2005 | Ammermann |
| 2005/0261967 A1 | 11/2005 | Barry |
| 2005/0269401 A1 | 12/2005 | Spitzer |
| 2005/0269402 A1 | 12/2005 | Spitzer |
| 2005/0273462 A1 | 12/2005 | Reed |
| 2006/0002607 A1 | 1/2006 | Boncyk |
| 2006/0020542 A1 | 1/2006 | Litle |
| 2006/0053056 A1 | 3/2006 | Alspach-Goss |
| 2006/0059277 A1 | 3/2006 | Zito |
| 2006/0069619 A1 | 3/2006 | Walker |
| 2006/0075235 A1 | 4/2006 | Renkis |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178918 A1 | 8/2006 | Mikurak |
| 2006/0178986 A1 | 8/2006 | Giordano |
| 2006/0178994 A1 | 8/2006 | Stolfo |
| 2006/0190332 A1 | 8/2006 | Grider |
| 2006/0190347 A1 | 8/2006 | Cuervo |
| 2006/0195598 A1 | 8/2006 | Fujita |
| 2006/0208060 A1 | 9/2006 | Mendelovich |
| 2006/0212434 A1 | 9/2006 | Crawford |
| 2006/0226216 A1 | 10/2006 | Keithley |
| 2006/0235795 A1 | 10/2006 | Johnson |
| 2006/0237528 A1 | 10/2006 | Bishop |
| 2006/0247982 A1 | 11/2006 | Stolfo |
| 2006/0277143 A1 | 12/2006 | Almonte |
| 2006/0278704 A1 | 12/2006 | Saunders |
| 2006/0282332 A1 | 12/2006 | Pfleging |
| 2006/0293947 A1 | 12/2006 | Nicholson |
| 2007/0011025 A1 | 1/2007 | Cracchiolo |
| 2007/0016523 A1 | 1/2007 | Blair |
| 2007/0022007 A1 | 1/2007 | Lawe |
| 2007/0038515 A1 | 2/2007 | Postrel |
| 2007/0038516 A1 | 2/2007 | Apple |
| 2007/0055571 A1 | 3/2007 | Fox |
| 2007/0063024 A1 | 3/2007 | Guillot |
| 2007/0067215 A1 | 3/2007 | Agarwal |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106504 A1 | 5/2007 | Deng |
| 2007/0106607 A1 | 5/2007 | Seib |
| 2007/0106627 A1 | 5/2007 | Srivastava |
| 2007/0107044 A1 | 5/2007 | Yuen |
| 2007/0113289 A1 | 5/2007 | Blumenau |
| 2007/0125840 A1 | 6/2007 | Law |
| 2007/0129955 A1 | 6/2007 | Dalmia |
| 2007/0136193 A1 | 6/2007 | Starr |
| 2007/0136211 A1 | 6/2007 | Brown |
| 2007/0143204 A1 | 6/2007 | Claus |
| 2007/0150413 A1 | 6/2007 | Morgenstern |
| 2007/0156726 A1 | 7/2007 | Levy |
| 2007/0162350 A1 | 7/2007 | Friedman |
| 2007/0170247 A1 | 7/2007 | Friedman |
| 2007/0179885 A1 | 8/2007 | Bird |
| 2007/0180119 A1 | 8/2007 | Khivesara |
| 2007/0198435 A1 | 8/2007 | Siegal |
| 2007/0198587 A1 | 8/2007 | Kobayasfii |
| 2007/0208662 A1 | 9/2007 | Jeronimus |
| 2007/0208671 A1 | 9/2007 | Brown |
| 2007/0214078 A1 | 9/2007 | Coppinger |
| 2007/0214250 A1 | 9/2007 | Ahmed |

(56) References Cited

U.S. PATENT DOCUMENTS

| | | |
|---|---|---|
| 2007/0226152 A1 | 9/2007 | Jones |
| 2007/0233590 A1 | 10/2007 | Hardison |
| 2007/0233615 A1 | 10/2007 | Tumminaro |
| 2007/0239502 A1 | 10/2007 | Babu |
| 2007/0245414 A1 | 10/2007 | Chan |
| 2007/0276765 A1 | 11/2007 | Hazel |
| 2007/0288377 A1 | 12/2007 | Shaked |
| 2007/0291995 A1 | 12/2007 | Rivera |
| 2008/0004116 A1 | 1/2008 | Van |
| 2008/0004952 A1 | 1/2008 | Koli |
| 2008/0010096 A1 | 1/2008 | Patterson |
| 2008/0013335 A1 | 1/2008 | Tsutsumi |
| 2008/0015988 A1 | 1/2008 | Brown |
| 2008/0021829 A1 | 1/2008 | Kranzley |
| 2008/0027218 A1 | 1/2008 | Daugs |
| 2008/0027850 A1 | 1/2008 | Brittan |
| 2008/0029607 A1 | 2/2008 | Mullen |
| 2008/0035738 A1 | 2/2008 | Mullen |
| 2008/0048022 A1 | 2/2008 | Vawter |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0059370 A1 | 3/2008 | Sada |
| 2008/0065554 A1 | 3/2008 | Hogan |
| 2008/0065555 A1 | 3/2008 | Mullen |
| 2008/0077489 A1 | 3/2008 | Gilley |
| 2008/0082424 A1 | 4/2008 | Walton |
| 2008/0086365 A1 | 4/2008 | Zollino |
| 2008/0090513 A1 | 4/2008 | Collins |
| 2008/0091553 A1 | 4/2008 | Koski |
| 2008/0091616 A1 | 4/2008 | Helwin |
| 2008/0097856 A1 | 4/2008 | Blagg |
| 2008/0103795 A1 | 5/2008 | Jakubowski |
| 2008/0114639 A1 | 5/2008 | Meek |
| 2008/0114737 A1 | 5/2008 | Neely |
| 2008/0126145 A1 | 5/2008 | Racklet, III |
| 2008/0133351 A1 | 6/2008 | White |
| 2008/0133403 A1 | 6/2008 | Hamzeh |
| 2008/0140568 A1 | 6/2008 | Henry |
| 2008/0140684 A1 | 6/2008 | Oreilly |
| 2008/0147883 A1 | 6/2008 | Philyaw |
| 2008/0154623 A1 | 6/2008 | Derker |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0201232 A1 | 8/2008 | Walker |
| 2008/0201264 A1 | 8/2008 | Brown |
| 2008/0201265 A1 | 8/2008 | Hewton |
| 2008/0221945 A1 | 9/2008 | Pace |
| 2008/0223918 A1 | 9/2008 | Williams |
| 2008/0228646 A1 | 9/2008 | Myers |
| 2008/0229217 A1 | 9/2008 | Kembel |
| 2008/0235261 A1 | 9/2008 | Malek |
| 2008/0024561 A1 | 10/2008 | Maeda |
| 2008/0243305 A1 | 10/2008 | Lee |
| 2008/0243702 A1 | 10/2008 | Hart |
| 2008/0245855 A1 | 10/2008 | Fein |
| 2008/0245861 A1 | 10/2008 | Fein |
| 2008/0270300 A1 | 10/2008 | Jones |
| 2008/0272188 A1 | 11/2008 | Keithley |
| 2008/0283591 A1 | 11/2008 | Oder |
| 2008/0288376 A1 | 11/2008 | Panthaki |
| 2008/0288889 A1 | 11/2008 | Hunt |
| 2008/0300980 A1 | 12/2008 | Benjamin |
| 2008/0301055 A1 | 12/2008 | Borgs |
| 2008/0302869 A1 | 12/2008 | Mullen |
| 2008/0302876 A1 | 12/2008 | Mullen |
| 2008/0313264 A1 | 12/2008 | Pestoni |
| 2008/0319905 A1 | 12/2008 | Carlson |
| 2009/0006181 A1 | 1/2009 | Ghosh |
| 2009/0006262 A1 | 1/2009 | Brown |
| 2009/0010488 A1 | 1/2009 | Matsuoka |
| 2009/0013266 A1 | 1/2009 | Gandhi |
| 2009/0018895 A1 | 1/2009 | Weinblatt |
| 2009/0024527 A1 | 1/2009 | Sellen |
| 2009/0024636 A1 | 1/2009 | Shiloh |
| 2009/0037255 A1 | 2/2009 | Chiu |
| 2009/0037326 A1 | 2/2009 | Chitti |
| 2009/0037333 A1 | 2/2009 | Flitcroft |
| 2009/0037388 A1 | 2/2009 | Cooper |
| 2009/0043702 A1 | 2/2009 | Bennett |
| 2009/0048934 A1 | 2/2009 | Haddad |
| 2009/0048971 A1 | 2/2009 | Hathaway |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0083065 A1 | 3/2009 | Unland |
| 2009/0089176 A1 | 4/2009 | McCabe |
| 2009/0089193 A1 | 4/2009 | Paintin |
| 2009/0104888 A1 | 4/2009 | Cox |
| 2009/0106112 A1 | 4/2009 | Dalmia |
| 2009/0106151 A1 | 4/2009 | Nelsen |
| 2009/0106160 A1 | 4/2009 | Skowronek |
| 2009/0106234 A1 | 4/2009 | Siedlecki |
| 2009/0108080 A1 | 4/2009 | Meyer |
| 2009/0112775 A1 | 4/2009 | Chiulli |
| 2009/0119176 A1 | 5/2009 | Johnson |
| 2009/0119190 A1 | 5/2009 | Realini |
| 2009/0119211 A1 | 5/2009 | Johnson |
| 2009/0125429 A1 | 5/2009 | Takayama |
| 2009/0132347 A1 | 5/2009 | Anderson |
| 2009/0132366 A1 | 5/2009 | Lam |
| 2009/0132395 A1 | 5/2009 | Lam |
| 2009/0134217 A1 | 5/2009 | Flitcroft |
| 2009/0144104 A1 | 6/2009 | Johnson |
| 2009/0144201 A1 | 6/2009 | Gierkink |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0164344 A1 | 6/2009 | Shiftan |
| 2009/0170608 A1 | 7/2009 | Herrmann |
| 2009/0171778 A1 | 7/2009 | Powell |
| 2009/0173782 A1 | 7/2009 | Muscato |
| 2009/0182664 A1 | 7/2009 | Trombley |
| 2009/0187492 A1 | 7/2009 | Hammad |
| 2009/0200371 A1 | 8/2009 | Kean |
| 2009/0210300 A1 | 8/2009 | Cansler |
| 2009/0216910 A1 | 8/2009 | Duchesneau |
| 2009/0222347 A1 | 9/2009 | Whitten |
| 2009/0228211 A1 | 9/2009 | Rasanen |
| 2009/0233579 A1* | 9/2009 | Castell ............... G06Q 30/0601 705/64 |
| 2009/0234751 A1* | 9/2009 | Chan .................. G06Q 40/00 705/26.1 |
| 2009/0240620 A1 | 9/2009 | Kendrick |
| 2009/0241159 A1 | 9/2009 | Campagna |
| 2009/0248583 A1 | 10/2009 | Chhabra |
| 2009/0248738 A1 | 10/2009 | Martinez |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271246 A1 | 10/2009 | Alvarez |
| 2009/0271265 A1 | 10/2009 | Lay |
| 2009/0271635 A1 | 10/2009 | Liu |
| 2009/0276347 A1 | 11/2009 | Kargman |
| 2009/0281948 A1 | 11/2009 | Carlson |
| 2009/0288012 A1 | 11/2009 | Hertel |
| 2009/0294527 A1 | 12/2009 | Brabson |
| 2009/0307060 A1 | 12/2009 | Merz |
| 2009/0307135 A1 | 12/2009 | Gupta |
| 2009/0307139 A1 | 12/2009 | Mardikar |
| 2009/0308921 A1 | 12/2009 | Mullen |
| 2009/0313132 A1 | 12/2009 | Mckenna |
| 2009/0319638 A1 | 12/2009 | Faith |
| 2009/0327045 A1 | 12/2009 | Olives |
| 2009/0327088 A1 | 12/2009 | Puthupparambil |

(56) References Cited

U.S. PATENT DOCUMENTS

| | | |
|---|---|---|
| 2009/0327131 A1 | 12/2009 | Beenau |
| 2010/0004989 A1 | 1/2010 | Bonalle |
| 2010/0005025 A1 | 1/2010 | Kumar |
| 2010/0008535 A1 | 1/2010 | Abulafia |
| 2010/0009663 A1 | 1/2010 | Chang |
| 2010/0010964 A1 | 1/2010 | Skowronek |
| 2010/0012728 A1 | 1/2010 | Rosset |
| 2010/0021149 A1 | 1/2010 | Mulder |
| 2010/0023386 A1 | 1/2010 | Avisar |
| 2010/0023455 A1 | 1/2010 | Dispensa |
| 2010/0023457 A1 | 1/2010 | Riviere |
| 2010/0036741 A1 | 2/2010 | Cleven |
| 2010/0036775 A1 | 2/2010 | Edens |
| 2010/0036884 A1 | 2/2010 | Brown |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0057548 A1 | 3/2010 | Edwards |
| 2010/0063903 A1 | 3/2010 | Whipple |
| 2010/0070359 A1 | 3/2010 | Heasley |
| 2010/0076873 A1 | 3/2010 | Taylor |
| 2010/0076890 A1 | 3/2010 | Low |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0088237 A1 | 4/2010 | Wankmueller |
| 2010/0094730 A1 | 4/2010 | Koski |
| 2010/0094755 A1 | 4/2010 | Kloster |
| 2010/0094878 A1 | 4/2010 | Soroca |
| 2010/0100480 A1 | 4/2010 | Altman |
| 2010/0106602 A1 | 4/2010 | Fuzell-Casey |
| 2010/0106644 A1 | 4/2010 | Annan |
| 2010/0114664 A1 | 5/2010 | Jobin |
| 2010/0120408 A1 | 5/2010 | Beenau |
| 2010/0121707 A1 | 5/2010 | Goeldi |
| 2010/0125492 A1 | 5/2010 | Lin |
| 2010/0125495 A1 | 5/2010 | Smith |
| 2010/0125509 A1 | 5/2010 | Kranzley |
| 2010/0125803 A1 | 5/2010 | Johnson |
| 2010/0131347 A1 | 5/2010 | Sarptipi |
| 2010/0131415 A1 | 5/2010 | Sartipi |
| 2010/0133334 A1 | 6/2010 | Vadhri |
| 2010/0133339 A1 | 6/2010 | Gibson |
| 2010/0138026 A1 | 6/2010 | Kaushal |
| 2010/0138347 A1 | 6/2010 | Chen |
| 2010/0145860 A1 | 6/2010 | Pelegero |
| 2010/0153865 A1 | 6/2010 | Barnes |
| 2010/0155470 A1 | 6/2010 | Woronec |
| 2010/0161433 A1 | 6/2010 | White |
| 2010/0162126 A1 | 6/2010 | Donaldson |
| 2010/0174599 A1 | 7/2010 | Rosenblatt |
| 2010/0179855 A1 | 7/2010 | Chen |
| 2010/0185505 A1 | 7/2010 | Sprogoe |
| 2010/0185531 A1 | 7/2010 | Van |
| 2010/0185545 A1 | 7/2010 | Royyuru |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D'Angelo et al. |
| 2010/0211469 A1 | 8/2010 | Salmon |
| 2010/0211499 A1 | 8/2010 | Zanzot |
| 2010/0211505 A1 | 8/2010 | Saunders |
| 2010/0217613 A1 | 8/2010 | Kelly |
| 2010/0217682 A1 | 8/2010 | Chan |
| 2010/0223186 A1 | 9/2010 | Hogan |
| 2010/0228668 A1 | 9/2010 | Hogan |
| 2010/0235284 A1 | 9/2010 | Moore |
| 2010/0243728 A1 | 9/2010 | Wiesman |
| 2010/0250351 A1 | 9/2010 | Gillenson |
| 2010/0250955 A1 | 9/2010 | Trevithick |
| 2010/0256976 A1 | 10/2010 | Atsmon |
| 2010/0258620 A1 | 10/2010 | Torreyson |
| 2010/0268645 A1 | 10/2010 | Martino |
| 2010/0276484 A1 | 11/2010 | Banerjee |
| 2010/0287048 A1 | 11/2010 | Ramer |
| 2010/0287229 A1 | 11/2010 | Hauser |
| 2010/0291904 A1 | 11/2010 | Musfeldt |
| 2010/0293032 A1 | 11/2010 | Engelsma |
| 2010/0299267 A1 | 11/2010 | Faith |
| 2010/0299292 A1 | 11/2010 | Collazo |
| 2010/0305848 A1 | 12/2010 | Stallman |
| 2010/0306075 A1 | 12/2010 | Drance |
| 2010/0306076 A1 | 12/2010 | Taveau |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0312724 A1 | 12/2010 | Pinckney |
| 2010/0325041 A1 | 12/2010 | Berardi |
| 2010/0332262 A1 | 12/2010 | Horvitz |
| 2010/0332283 A1 | 12/2010 | Ng |
| 2011/0004498 A1 | 1/2011 | Readshaw |
| 2011/0010292 A1 | 1/2011 | Giordano |
| 2011/0016047 A1 | 1/2011 | Wu |
| 2011/0016320 A1 | 1/2011 | Bergsten |
| 2011/0035273 A1 | 2/2011 | Parikh |
| 2011/0040640 A1 | 2/2011 | Erikson |
| 2011/0040655 A1 | 2/2011 | Hendrickson |
| 2011/0047017 A1 | 2/2011 | Lieblang |
| 2011/0047075 A1 | 2/2011 | Fourez |
| 2011/0047076 A1 | 2/2011 | Carlson |
| 2011/0078082 A1 | 3/2011 | Gupta |
| 2011/0082789 A1 | 4/2011 | Boyd |
| 2011/0083018 A1 | 4/2011 | Kesanupalli |
| 2011/0087596 A1 | 4/2011 | Dorsey |
| 2011/0087726 A1 | 4/2011 | Shim |
| 2011/0093335 A1 | 4/2011 | Fordyce |
| 2011/0093397 A1 | 4/2011 | Carlson |
| 2011/0099057 A1 | 4/2011 | Tenyer |
| 2011/0105183 A1 | 5/2011 | Hsiao |
| 2011/0106698 A1 | 5/2011 | Issacson |
| 2011/0109737 A1 | 5/2011 | Aben |
| 2011/0119300 A1 | 5/2011 | Marcade |
| 2011/0125597 A1 | 5/2011 | Oder |
| 2011/0137740 A1 | 6/2011 | Bhattacharya |
| 2011/0137742 A1 | 6/2011 | Parikh |
| 2011/0153437 A1 | 6/2011 | Archer |
| 2011/0153498 A1 | 6/2011 | Makhotin |
| 2011/0154466 A1 | 6/2011 | Harper |
| 2011/0161233 A1 | 6/2011 | Tieken |
| 2011/0178896 A1 | 7/2011 | Nakajima |
| 2011/0178926 A1 | 7/2011 | Lindelsee |
| 2011/0180598 A1 | 7/2011 | Morgan |
| 2011/0184827 A1 | 7/2011 | Hubert |
| 2011/0191244 A1 | 8/2011 | Dai |
| 2011/0208418 A1 | 8/2011 | Looney |
| 2011/0215146 A1 | 9/2011 | Shams |
| 2011/0218870 A1 | 9/2011 | Shams |
| 2011/0221692 A1 | 9/2011 | Seydoux |
| 2011/0238474 A1 | 9/2011 | Carr |
| 2011/0238511 A1 | 9/2011 | Park |
| 2011/0238573 A1 | 9/2011 | Varadarajan |
| 2011/0246290 A1 | 10/2011 | Howard |
| 2011/0246317 A1 | 10/2011 | Coppinger |
| 2011/0251892 A1 | 10/2011 | Laracey |
| 2011/0258049 A1 | 10/2011 | Ramer |
| 2011/0258111 A1 | 10/2011 | Raj |
| 2011/0258123 A1 | 10/2011 | Dawkins |
| 2011/0270665 A1 | 11/2011 | Kim |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |

(56) References Cited

U.S. PATENT DOCUMENTS

| | | |
|---|---|---|
| 2011/0276424 A1 | 11/2011 | Mullen |
| 2011/0276425 A1 | 11/2011 | Mullen |
| 2011/0282780 A1 | 11/2011 | French |
| 2011/0288684 A1 | 11/2011 | Farlow |
| 2011/0295745 A1 | 12/2011 | White |
| 2011/0296508 A1 | 12/2011 | Os |
| 2011/0302081 A1 | 12/2011 | Saunders |
| 2011/0312423 A1 | 12/2011 | Mosites |
| 2011/0320344 A1 | 12/2011 | Faith |
| 2011/0320345 A1 | 12/2011 | Taveau |
| 2012/0005026 A1 | 1/2012 | Khan |
| 2012/0011009 A1 | 1/2012 | Lindsey |
| 2012/0011063 A1 | 1/2012 | Killian |
| 2012/0016731 A1 | 1/2012 | Smith |
| 2012/0022943 A1 | 1/2012 | Howard |
| 2012/0023026 A1 | 1/2012 | Chen |
| 2012/0023417 A1 | 1/2012 | Nesladek |
| 2012/0023567 A1 | 1/2012 | Hammad |
| 2012/0028609 A1 | 2/2012 | Hruska |
| 2012/0030047 A1 | 2/2012 | Fuentes |
| 2012/0030101 A1 | 2/2012 | Boyd |
| 2012/0035998 A1 | 2/2012 | Chien |
| 2012/0036071 A1 | 2/2012 | Fulton |
| 2012/0041881 A1 | 2/2012 | Basu |
| 2012/0047237 A1 | 2/2012 | Arvidsson |
| 2012/0066065 A1 | 3/2012 | Switzer |
| 2012/0066078 A1 | 3/2012 | Kingston |
| 2012/0072311 A1 | 3/2012 | Khan |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0084132 A1 | 4/2012 | Khan |
| 2012/0084204 A1 | 4/2012 | Castell |
| 2012/0095852 A1 | 4/2012 | Bauer |
| 2012/0095865 A1 | 4/2012 | Doherty |
| 2012/0095895 A1 | 4/2012 | Aston |
| 2012/0101881 A1 | 4/2012 | Taylor |
| 2012/0110044 A1 | 5/2012 | Nagpal |
| 2012/0116902 A1 | 5/2012 | Cardina |
| 2012/0116966 A1 | 5/2012 | Tan |
| 2012/0118950 A1 | 5/2012 | Belk |
| 2012/0123838 A1 | 5/2012 | Sparks |
| 2012/0123882 A1 | 5/2012 | Carlson |
| 2012/0123924 A1 | 5/2012 | Rose |
| 2012/0123940 A1 | 5/2012 | Killian |
| 2012/0124496 A1 | 5/2012 | Rose |
| 2012/0129514 A1 | 5/2012 | Beenau |
| 2012/0130794 A1 | 5/2012 | Strieder |
| 2012/0136780 A1 | 5/2012 | El-Awady |
| 2012/0143706 A1 | 6/2012 | Crake |
| 2012/0143767 A1 | 6/2012 | Abadir |
| 2012/0143772 A1 | 6/2012 | Abadir |
| 2012/0150750 A1 | 6/2012 | Law |
| 2012/0158580 A1 | 6/2012 | Eram |
| 2012/0158589 A1 | 6/2012 | Katzin |
| 2012/0158593 A1 | 6/2012 | Garfinkle |
| 2012/0158792 A1 | 6/2012 | Maclaurin |
| 2012/0158893 A1 | 6/2012 | Boyns |
| 2012/0159163 A1 | 6/2012 | Von Behren |
| 2012/0165978 A1 | 6/2012 | Li |
| 2012/0166333 A1* | 6/2012 | von Behren ......... G06Q 20/105 705/41 |
| 2012/0166655 A1 | 6/2012 | Maddali |
| 2012/0173431 A1 | 7/2012 | Ritchie |
| 2012/0173962 A1 | 7/2012 | Oh |
| 2012/0185386 A1 | 7/2012 | Salama |
| 2012/0190386 A1 | 7/2012 | Anderson |
| 2012/0197691 A1 | 8/2012 | Grigg |
| 2012/0197794 A1 | 8/2012 | Grigg |
| 2012/0197807 A1 | 8/2012 | Schlesser |
| 2012/0203662 A1 | 8/2012 | Morgan |
| 2012/0203664 A1 | 8/2012 | Torossian |
| 2012/0203665 A1 | 8/2012 | Morgan |
| 2012/0203666 A1 | 8/2012 | Torossian |
| 2012/0203673 A1 | 8/2012 | Morgan |
| 2012/0209735 A1 | 8/2012 | Subramanian |
| 2012/0209749 A1 | 8/2012 | Hammad |
| 2012/0209773 A1 | 8/2012 | Ranganathan |
| 2012/0215640 A1 | 8/2012 | Ramer |
| 2012/0215648 A1 | 8/2012 | Rose |
| 2012/0215650 A1 | 8/2012 | Oba |
| 2012/0215684 A1 | 8/2012 | Kidron |
| 2012/0215688 A1 | 8/2012 | Musser |
| 2012/0215696 A1 | 8/2012 | Salonen |
| 2012/0221421 A1 | 8/2012 | Hammad |
| 2012/0221502 A1 | 8/2012 | Jerram |
| 2012/0226582 A1 | 9/2012 | Hammad |
| 2012/0231844 A1 | 9/2012 | Coppinger |
| 2012/0233004 A1 | 9/2012 | Bercaw |
| 2012/0233073 A1 | 9/2012 | Salmon |
| 2012/0233170 A1 | 9/2012 | Musgrove |
| 2012/0239417 A1 | 9/2012 | Pourfallah |
| 2012/0239556 A1 | 9/2012 | Magruder |
| 2012/0239560 A1 | 9/2012 | Pourfallah |
| 2012/0246070 A1 | 9/2012 | Vadhri |
| 2012/0246071 A1 | 9/2012 | Jain |
| 2012/0246079 A1 | 9/2012 | Wilson |
| 2012/0254108 A1 | 10/2012 | Wedewer |
| 2012/0259763 A1 | 10/2012 | Pessin |
| 2012/0265631 A1 | 10/2012 | Cronic |
| 2012/0265685 A1 | 10/2012 | Brudnicki |
| 2012/0271770 A1 | 10/2012 | Harris |
| 2012/0284035 A1 | 11/2012 | Gillin |
| 2012/0290472 A1 | 11/2012 | Mullen |
| 2012/0297446 A1 | 11/2012 | Webb |
| 2012/0300932 A1 | 11/2012 | Cambridge |
| 2012/0303425 A1 | 11/2012 | Katzin |
| 2012/0303503 A1 | 11/2012 | Cambridge |
| 2012/0303736 A1 | 11/2012 | Novotny |
| 2012/0303961 A1 | 11/2012 | Kean |
| 2012/0304273 A1 | 11/2012 | Bailey |
| 2012/0310725 A1 | 12/2012 | Chien |
| 2012/0310826 A1* | 12/2012 | Chatterjee ............. G06Q 20/36 705/41 |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0317149 A1 | 12/2012 | Jagota |
| 2012/0323664 A1 | 12/2012 | Klems |
| 2012/0330874 A1 | 12/2012 | Jerram |
| 2013/0013499 A1 | 1/2013 | Kalgi |
| 2013/0017784 A1 | 1/2013 | Fisher |
| 2013/0018757 A1 | 1/2013 | Anderson |
| 2013/0019098 A1 | 1/2013 | Gupta |
| 2013/0024364 A1 | 1/2013 | Shrivastava |
| 2013/0024371 A1 | 1/2013 | Hariramani |
| 2013/0024916 A1 | 1/2013 | Evans |
| 2013/0030828 A1 | 1/2013 | Pourfallah |
| 2013/0030964 A1 | 1/2013 | Nuzzi |
| 2013/0031006 A1 | 1/2013 | Mccullagh |
| 2013/0054337 A1 | 2/2013 | Brendell |
| 2013/0054454 A1 | 2/2013 | Purves |
| 2013/0054466 A1 | 2/2013 | Muscato |
| 2013/0054470 A1 | 2/2013 | Campos |
| 2013/0054474 A1 | 2/2013 | Yeager |
| 2013/0080238 A1 | 3/2013 | Kelly |
| 2013/0081122 A1 | 3/2013 | Svigals |
| 2013/0085877 A1 | 4/2013 | Andreas |
| 2013/0090750 A1 | 4/2013 | Herrman |
| 2013/0091028 A1 | 4/2013 | Oder |
| 2013/0097078 A1 | 4/2013 | Wong |
| 2013/0103574 A1 | 4/2013 | Conrad |
| 2013/0110658 A1 | 5/2013 | Lyman |
| 2013/0110678 A1 | 5/2013 | Vigier |
| 2013/0111599 A1 | 5/2013 | Gargiulo |
| 2013/0117170 A1 | 5/2013 | Coppinger |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144785 A1 | 6/2013 | Karpenko |

(56) References Cited

U.S. PATENT DOCUMENTS

| | | |
|---|---|---|
| 2013/0144888 A1 | 6/2013 | Faith |
| 2013/0144957 A1 | 6/2013 | Sherman |
| 2013/0145148 A1 | 6/2013 | Shablygin |
| 2013/0145172 A1 | 6/2013 | Shablygin |
| 2013/0151417 A1 | 6/2013 | Gupta |
| 2013/0159081 A1 | 6/2013 | Shastry |
| 2013/0159112 A1 | 6/2013 | Schultz |
| 2013/0159154 A1 | 6/2013 | Purves |
| 2013/0159178 A1 | 6/2013 | Colon |
| 2013/0159184 A1 | 6/2013 | Thaw |
| 2013/0159196 A1 | 6/2013 | Dizoglio |
| 2013/0166332 A1 | 6/2013 | Hammad |
| 2013/0166402 A1 | 6/2013 | Parento |
| 2013/0166456 A1 | 6/2013 | Zhang |
| 2013/0166621 A1 | 6/2013 | Zhu |
| 2013/0173404 A1 | 7/2013 | Scipioni |
| 2013/0173736 A1 | 7/2013 | Krzeminski |
| 2013/0179340 A1 | 7/2013 | Alba |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson |
| 2013/0200146 A1 | 8/2013 | Moghadam |
| 2013/0204776 A1 | 8/2013 | King |
| 2013/0204787 A1 | 8/2013 | Dubois |
| 2013/0204793 A1 | 8/2013 | Kerridge |
| 2013/0204886 A1 | 8/2013 | Faith |
| 2013/0204894 A1 | 8/2013 | Faith |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell |
| 2013/0212399 A1 | 8/2013 | Cairns |
| 2013/0212666 A1 | 8/2013 | Mattsson |
| 2013/0218640 A1 | 8/2013 | Kidder |
| 2013/0218657 A1 | 8/2013 | Salmon |
| 2013/0218698 A1 | 8/2013 | Moon |
| 2013/0218721 A1 | 8/2013 | Borhan |
| 2013/0218765 A1 | 8/2013 | Hammad |
| 2013/0218769 A1 | 8/2013 | Pourfallah |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246215 A1 | 9/2013 | Faith |
| 2013/0246258 A1 | 9/2013 | Dessert |
| 2013/0246259 A1 | 9/2013 | Dessert |
| 2013/0246261 A1 | 9/2013 | Purves |
| 2013/0246267 A1 | 9/2013 | Tobin |
| 2013/0246342 A1 | 9/2013 | Faith |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0268437 A1 | 10/2013 | Desai |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0290234 A1 | 10/2013 | Harris |
| 2013/0297501 A1 | 11/2013 | Monk |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0325579 A1 | 12/2013 | Salmon |
| 2013/0332344 A1 | 12/2013 | Weber |
| 2013/0339240 A1 | 12/2013 | Anderson |
| 2013/0339253 A1 | 12/2013 | Sincai |
| 2013/0346302 A1 | 12/2013 | Purves |
| 2013/0346305 A1 | 12/2013 | Mendes |
| 2013/0346314 A1 | 12/2013 | Mogollon |
| 2014/0006195 A1 | 1/2014 | Wilson |
| 2014/0006198 A1 | 1/2014 | Daly |
| 2014/0006277 A1 | 1/2014 | Rao |
| 2014/0006283 A1 | 1/2014 | Hogg |
| 2014/0007213 A1 | 1/2014 | Sanin |
| 2014/0013106 A1 | 1/2014 | Path |
| 2014/0013114 A1 | 1/2014 | Path |
| 2014/0013452 A1 | 1/2014 | Aissi |
| 2014/0019352 A1 | 1/2014 | Shrivastava |
| 2014/0020068 A1 | 1/2014 | Desai |
| 2014/0025581 A1 | 1/2014 | Caiman |
| 2014/0025585 A1 | 1/2014 | Caiman |
| 2014/0025958 A1 | 1/2014 | Caiman |
| 2014/0032417 A1 | 1/2014 | Mattsson |
| 2014/0032418 A1 | 1/2014 | Weber |
| 2014/0040001 A1 | 2/2014 | Harvey |
| 2014/0040127 A1 | 2/2014 | Chatterjee |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047517 A1 | 2/2014 | Ding |
| 2014/0047551 A1 | 2/2014 | Nagasundaram |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0095589 A1 | 4/2014 | Johnson |
| 2014/0108172 A1 | 4/2014 | Weber |
| 2014/0108197 A1 | 4/2014 | Smith |
| 2014/0114857 A1 | 4/2014 | Griggs |
| 2014/0136945 A1 | 5/2014 | Ligman |
| 2014/0143137 A1 | 5/2014 | Carlson |
| 2014/0164176 A1 | 6/2014 | Kitlyar |
| 2014/0164243 A1 | 6/2014 | Aabye |
| 2014/0188586 A1 | 7/2014 | Carpenter |
| 2014/0197234 A1 | 7/2014 | Hammad |
| 2014/0279479 A1 | 9/2014 | Maniar |
| 2014/0294701 A1 | 10/2014 | Dai |
| 2014/0297534 A1 | 10/2014 | Patterson |
| 2014/0310080 A1 | 10/2014 | Salmon |
| 2014/0310183 A1 | 10/2014 | Weber |
| 2014/0330721 A1 | 11/2014 | Wang |
| 2014/0330722 A1 | 11/2014 | Laxminarayanan |
| 2014/0331265 A1 | 11/2014 | Mozell |
| 2014/0337175 A1 | 11/2014 | Katzin |
| 2014/0337236 A1 | 11/2014 | Wong |
| 2014/0344153 A1 | 11/2014 | Raj |
| 2014/0365295 A1 | 12/2014 | Postrel |
| 2014/0372308 A1 | 12/2014 | Sheets |
| 2015/0019443 A1 | 1/2015 | Sheets |
| 2015/0019944 A1 | 1/2015 | Kalgi |
| 2015/0026049 A1 | 1/2015 | Theurer |
| 2015/0032625 A1 | 1/2015 | Dill |
| 2015/0032626 A1 | 1/2015 | Dill |
| 2015/0032627 A1 | 1/2015 | Dill |
| 2015/0039462 A1 | 2/2015 | Shastry |
| 2015/0046241 A1 | 2/2015 | Salmon |
| 2015/0046338 A1 | 2/2015 | Laxminarayanan |
| 2015/0046339 A1 | 2/2015 | Wong |
| 2015/0052064 A1 | 2/2015 | Karpenko |
| 2015/0058162 A1 | 2/2015 | Purves |
| 2015/0088756 A1 | 3/2015 | Makhotin |
| 2015/0089350 A1 | 3/2015 | Davis |
| 2015/0106239 A1 | 4/2015 | Gaddam |

(56) References Cited

U.S. PATENT DOCUMENTS

| | | |
|---|---|---|
| 2015/0112870 A1 | 4/2015 | Nagasundaram |
| 2015/0112871 A1 | 4/2015 | Kumnick |
| 2015/0120472 A1 | 4/2015 | Aabye |
| 2015/0127529 A1 | 5/2015 | Makhotin |
| 2015/0127547 A1 | 5/2015 | Powell |
| 2015/0140960 A1 | 5/2015 | Powell |
| 2015/0142673 A1 | 5/2015 | Nelsen |
| 2015/0154588 A1 | 6/2015 | Purves |
| 2015/0161597 A1 | 6/2015 | Subramanian |
| 2015/0178724 A1 | 6/2015 | Ngo |
| 2015/0180836 A1 | 6/2015 | Wong |
| 2015/0186864 A1 | 7/2015 | Jones |
| 2015/0193222 A1 | 7/2015 | Pirzadeh |
| 2015/0195133 A1 | 7/2015 | Sheets |
| 2015/0199679 A1 | 7/2015 | Palanisamy |
| 2015/0199689 A1 | 7/2015 | Kumnick |
| 2015/0220917 A1 | 8/2015 | Aabye |
| 2015/0242609 A1 | 8/2015 | Zheng |
| 2015/0248664 A1 | 9/2015 | Makhdumi |
| 2015/0269566 A1 | 9/2015 | Gaddam |
| 2015/0302453 A1 | 10/2015 | Tietzen |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339767 A1 | 11/2015 | Chen |
| 2015/0356560 A1 | 12/2015 | Shastry |
| 2016/0028550 A1 | 1/2016 | Gaddam |
| 2016/0042263 A1 | 2/2016 | Gaddam |
| 2016/0063486 A1 | 3/2016 | Purves |
| 2016/0065370 A1 | 3/2016 | Le Saint |
| 2016/0092696 A1 | 3/2016 | Guglani |
| 2016/0092872 A1 | 3/2016 | Prakash |
| 2016/0103675 A1 | 4/2016 | Aabye |
| 2016/0119296 A1 | 4/2016 | Laxminarayanan |
| 2016/0224976 A1 | 8/2016 | Basu |
| 2016/0283941 A1 | 9/2016 | Andrade |
| 2016/0291920 A1 | 10/2016 | Sirpal |
| 2016/0379192 A1 | 12/2016 | Purves |
| 2017/0046696 A1 | 2/2017 | Powell |
| 2017/0103387 A1 | 4/2017 | Weber |
| 2017/0134479 A1 | 5/2017 | Kalgi |
| 2017/0220818 A1 | 8/2017 | Nagasundaram |
| 2017/0228723 A1 | 8/2017 | Taylor |
| 2017/0235786 A9 | 8/2017 | Faith |
| 2017/0235848 A1 | 8/2017 | Van Dusen |
| 2017/0243199 A1 | 8/2017 | Kalgi |
| 2017/0300314 A1 | 10/2017 | Lopyrev |
| 2017/0346876 A1 | 11/2017 | Lim |
| 2017/0372301 A1 | 12/2017 | Theurer |
| 2018/0046623 A1 | 2/2018 | Faith |
| 2018/0075081 A1 | 3/2018 | Chipman |
| 2018/0108008 A1 | 4/2018 | Chumbley |
| 2018/0189756 A1 | 7/2018 | Purves |
| 2018/0341650 A1 | 11/2018 | Faith |
| 2019/0026729 A1 | 1/2019 | Kalgi |
| 2019/0034921 A1 | 1/2019 | Hammad |
| 2019/0075156 A1 | 3/2019 | Kalgi |
| 2019/0147523 A1 | 5/2019 | Shastry |
| 2019/0188691 A1 | 6/2019 | Purves |
| 2019/0188719 A1 | 6/2019 | Das |
| 2019/0205288 A1 | 7/2019 | Faith |
| 2019/0244192 A1 | 8/2019 | Katzin |
| 2019/0266604 A1 | 8/2019 | Desai |
| 2019/0295054 A1 | 9/2019 | Purves |
| 2019/0361845 A1 | 11/2019 | Faith |
| 2019/0385146 A1 | 12/2019 | Priest |
| 2020/0013051 A1 | 1/2020 | Kadiwala |
| 2021/0042726 A1 | 2/2021 | Purves |
| 2021/0084024 A1 | 3/2021 | Sadayoshi |
| 2021/0272102 A1 | 9/2021 | Purves |
| 2022/0253832 A1 | 8/2022 | Hammad |
| 2023/0044764 A1 | 2/2023 | Purves |

FOREIGN PATENT DOCUMENTS

| | | |
|---|---|---|
| CN | 1928907 A | 3/2007 |
| CN | 1959727 A | 5/2007 |
| CN | 101025806 A | 8/2007 |
| CN | 101075316 A | 11/2007 |
| CN | 101231727 A | 7/2008 |
| CN | 101334876 A | 12/2008 |
| CN | 101388125 A | 3/2009 |
| CN | 101710407 A | 5/2010 |
| CN | 101719255 A | 6/2010 |
| CN | 101840550 A | 9/2010 |
| CN | 101924690 A | 12/2010 |
| CN | 101945127 A | 1/2011 |
| CN | 101958025 A | 1/2011 |
| CN | 102143290 A | 8/2011 |
| CN | 102779304 | 11/2012 |
| CN | 102947847 | 2/2013 |
| CN | 103635920 | 3/2014 |
| CN | 105027153 | 11/2015 |
| EP | 0745961 A2 | 12/1996 |
| EP | 0855659 A1 | 7/1998 |
| EP | 1921578 A1 | 5/2008 |
| EP | 2156397 A1 | 2/2010 |
| EP | 2503496 | 9/2012 |
| JP | 2001344544 A | 12/2001 |
| JP | 2005004621 A | 1/2005 |
| JP | 2007328549 | 12/2007 |
| JP | 2008527495 A | 7/2008 |
| JP | 2008545210 A | 12/2008 |
| JP | 2009151730 A | 7/2009 |
| JP | 2009176259 | 8/2009 |
| JP | 2011186660 A | 9/2011 |
| JP | 2012027824 A | 2/2012 |
| KR | 20000065839 A | 10/2000 |
| KR | 20010055426 | 7/2001 |
| KR | 20030065920 A | 5/2004 |
| KR | 20060117177 A | 11/2006 |
| KR | 20070104087 A | 10/2007 |
| SG | 2013069539 | 10/2013 |
| WO | 2000046769 A1 | 8/2000 |
| WO | 2001035304 A1 | 5/2001 |
| WO | 0165502 A2 | 9/2001 |
| WO | 2003001866 A1 | 1/2003 |
| WO | 03023674 A1 | 3/2003 |
| WO | 2003046697 A2 | 6/2003 |
| WO | 2003071386 A2 | 8/2003 |
| WO | 2003083737 A1 | 10/2003 |
| WO | 2004042536 A2 | 5/2004 |
| WO | 2005079254 A2 | 9/2005 |
| WO | 2006113834 A2 | 10/2006 |
| WO | 2009032523 A1 | 3/2009 |
| WO | 2010078522 A1 | 7/2010 |
| WO | 2010148704 A1 | 12/2010 |
| WO | 2010148737 A1 | 12/2010 |
| WO | 2012068078 A2 | 5/2012 |
| WO | 2012098556 A1 | 7/2012 |
| WO | 2012112822 A2 | 8/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 201505136 | 1/2015 |

OTHER PUBLICATIONS

A. Ruiz-Martinez, O. Canovas and A. F. Gomez-Skarmeta, "Towards a generic per-fee-link framework," 2007 2nd International Conference on Digital Information Management, 2007, pp. 37-42, doi: 10.1109/ICDIM.2007.4444197. (Year: 2007).*

Notice of Allowance dated Nov. 18, 2021 for U.S. Appl. No. 16/017,241 (pp. 1-9).

Office Action dated Oct. 27, 2021 for U.S. Appl. No. 17/064,832 (pp. 1-20).

Supplemental Notice of Allowability dated Dec. 3, 2021 for U.S. Appl. No. 16/017,241 (pp. 1-2).

(56) References Cited

OTHER PUBLICATIONS

Aissi et al., U.S. Appl. No. 61/738,832 (unpublished), Management of Sensitive Data filed Dec. 18, 2012.
Australian Examination Report for AU2017203295 dated Apr. 19, 2018, 4 pages.
Australian Patent Office, Patent Examination Report No. 2 in Australian Patent Application No. 2012217606, dated Jun. 15, 2016, 6 pages.
Brick-and-mortar retailers snatching customers away from E-tailers. (Feb. 16, 2012). PR Newswire Retrieved from https:// dialog. proguest.corn/professional/docview/1346330115?accountid= 142257 (Year: 2012) 3 pages.
Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.
Chandra, Shalini; Srivastava, Shirish C .; and Theng, Yin-Leng (2010) "Evaluating the Role ofTrust in Consumer Adoption of Mobile Payment Systems: An Empirical Analysis," Communications of the Association for Information Systems: vol. 27, Article 29. http://aisel.aisnet.org/cais/vol27/iss1/29 (Year: 2010) 30 pages.
Charland et al., Mobile Application Development: Web vs. Native, Apr. 2011, 9 pages.
Chinese Office Action (including English translation) for Application No. CN201710037081.6, dated Feb. 5, 2021, 7 pages.
Chinese Office Action (with English language translation) dated Jan. 30, 2019 for Application No. 201280019629.X, 10 pages.
Chinese Office Action (with English language translation) dated Nov. 6, 2017 for CN Application No. 201280018719.7, 24 pages.
Chinese Office Action (with English language translation) for Application No. 201480023694.9 dated Dec. 3, 2018, 17 pages.
Chinese Office Action (with English language translation) for Application No. 201480023694.9, dated Jun. 26, 2019, 7 pages.
Chinese Office Action (with English language translation) for Application No. CN201480023694.9, dated Jan. 21, 2020, 12 pages.
Chinese Office Action (with English language translation) for Application No. CN201710037081.6, dated Mar. 17, 2020, 23 pages.
Chinese Office Action (with English language translation) for Application No. CN201710037081.6, dated Oct. 21, 2020, 11 pages.
Chinese Office Action dated Oct. 10, 2017 for CN Application No. 201280019629.X, 7 pages.
Chipman, et al., U.S. Appl. No. 15/265,282 (Unpublished), Self-Cleaning Token Vault, filed Sep. 14, 2016. 47 pages.
Corrected Petition for Inter Partes Review of U.S. Pat. No. 8,533,860 Challenging Claims 1-30 Under 35 U.S.C. . sctn.312 and 37 C.F.R. sctn.42.104, dated Mar. 14, 2016, before the USPTO Patent Trial and Appeal Board, IPR 2016-00600, 65 pages.
David Breitkopf, "ACS to Take Over Mich. WC Distribution Program", American Banker, New York, NY: Jul. 20, 2006, vol. 171. Issue 138, p. 6.
Dimmick, U.S. Appl. No. 14/952,444 (unpublished), Tokenization Request Via Access Device, filed Nov. 25, 2015, 78 pages.
Dimmick, U.S. Appl. No. 14/952,514 (unpublished), Systems Communications With Non-Sensitive Identifiers, filed Nov. 25, 2015, 72 pages.
Dizaj, Mohammad Vahid Alizadeh, Moghaddam, Rexa Askari, Momenebellah, Samad, New Mobile Payment Protocol: Mobile Pay Center Protocol 2 (MPCP2) By Using New Key Agreement Protocol: VAM, 3d International Conference on Electronics Computer Technology, vol. 2, Apr. 2011, pp. 12-18.
European Patent Office, Supplementary European Search Report and European Search Opinion, in EP Application No. 12749451.6, dated Apr. 20, 2015, 7 pages.
Ex Parte Quayle Action dated Jan. 18, 2019 for U.S. Appl. No. 16/182,288 (pp. 1-5).
Flurscheim et al., U.S. Appl. No. 62/108,403 (unpublished), Wearables With NFC HCE filed Jan. 27, 2015.
Gaddam et al., U.S. Appl. No. 62/053,736 (unpublished), Completing Transactions Without a User Payment Device, filed Sep. 22, 2014.
Galland et al., U.S. Appl. No. 62/128,709 (unpublished), Tokenizing Transaction Amounts, filed Mar. 5, 2015.
Gao et al., "A 2D Barcode-Based Mobile Payment System", (2009), XP031561633 (10 pages).
Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.
Gopalan, NP & Selvan, B Siva. TCP/IP Illustrated. Prentice-Hall. 2008. pp. 101-102, 175-176 and 235. 7 pages.
Hoverson et al., U.S. Appl. No. 62/038,174 (unpublished), Customized Payment Gateway, filed Aug. 15, 2014.
I. Malavolta, Web-based hybrid mobile apps: state of the practice and research opportunities, 2 pages (Year: 2016).
Immaneni et al., Hybrid retrieval from the unified web, Mar. 2007, 5 pages.
Indian Examination Report for Application No. 8894/DELNP/2015, dated Oct. 21, 2019, 7 pages.
International Preliminary Report on Patentability dated Jan. 14, 2014 cited in related/corresponding International PCT Appl. No. PCT/US2012/045875 filed Jul. 7, 2012. (11 pages).
International Preliminary Report on Patentability dated Jan. 16, 2014 in related/corresponding PCT Patent Appl. No. PCT/US2012/045601 filed Jul. 5, 2012. (7 pages).
International Search Report and Writen Opinion for PCT/US09/54921 dated Oct. 21, 2009. (8 pages).
International Search Report and Written Opinion for PCT/US2010/033229 dated Dec. 29, 2010. (8 pages).
International Search Report and Written Opinion for PCT/US11/57173 dated Mar. 15, 2012. (11 pages).
International Search Report and Written Opinion for PCT/US11/57179 dated Jan. 5, 2012. (7 pages).
International Search Report and Written Opinion for PCT/US11/57180 dated Mar. 15, 2012 (11 pages).
International Search Report and Written Opinion for PCT/US12/37597 dated Sep. 21, 2012 (11 pages).
International Search Report and Written Opinion for PCT/US12/41437 dated Aug. 24, 2012. (20 pages).
International Search Report and Written Opinion for PCT/US12/47092 dated Nov. 26, 2012. 11 pages.
International Search Report and Written Opinion for PCT/US12/55636 dated Nov. 30, 2012. 9 pages.
International Search Report and Written Opinion for PCT/US12/56759 dated Feb. 25, 2013. 12 pages.
International Search Report and Written Opinion for PCT/US12/57528 dated Dec. 17, 2012. 8 pages.
International Search Report and Written Opinion for PCT/US12/65738 dated Apr. 19, 2013. 9 pages.
International Search Report and Written Opinion for PCT/US12/66898 dated Feb. 11, 2013. 14 pages.
International Search Report and Written Opinion for PCT/US13/46875, dated Oct. 24, 2013, 14 pages.
International Search Report and Written Opinion for PCT/US2010/033861 dated Dec. 9, 2010 (7 pages).
International Search Report and Written Opinion for PCT/US2010/041860 dated Feb. 1, 2011. (8 pages).
International Search Report and Written Opinion for PCT/US2010/046833 dated Apr. 26, 2011 (8 pages).
International Search Report and Written Opinion for PCT/US2010/048344 dated Nov. 15, 2010. (7 pages).
International Search Report and Written Opinion for PCT/US2011/024941 dated Apr. 19, 2011 (6 pages).
International Search Report and Written Opinion for PCT/US2011/032093 dated Aug. 24, 2011 (11 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion for PCT/US2012/026205, dated May 29, 2012. 12 pages.

(56) References Cited

OTHER PUBLICATIONS

International Search Report and Written Opinion for PCT/US2012/027043 dated Jul. 13, 2012. 15 pages.
International Search Report and Written Opinion for PCT/US2012/045601 dated Feb. 1, 2013. 11 pages.
International Search Report and Written Opinion for PCT/US2012/057528, dated May 29, 2012. (8 pages).
International Search Report and Written Opinion for PCT/US2012/069557 dated Feb. 22, 2013. 8 pages.
International Search Report and Written Opinion for PCT/US2013/020411 dated May 21, 2013. 18 pages.
International Search Report and Written Opinion for PCT/US2013/024538, dated May 31, 2013. 15 pages.
International Search Report and Written Opinion for PCT/US2013/031084, dated Jun. 4, 2013. 9 pages.
International Search Report and Written Opinion for PCT/US2014/030517, dated Aug. 18, 2014. (9 pages).
International Search Report and Written Opinion issued in connection with PCT/US11/42062 dated Sep. 29, 2011 (8 pages).
International Search Report and Writtten Opinion for PCT/US2011/039178 dated Sep. 16, 2011 (7 pages).
International Search Report for PCT/US11/49393 dated Dec. 5, 2011. (2 pages).
International Search Report for PCT/US11/65305 dated Apr. 16, 2012. 2 pages.
International Search Report for PCT/US12/21000 dated May 15, 2012. 2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report for PCT/US12/39638 dated Sep. 24, 2012. 4 pages.
International Search Report for PCT/US12/45875 dated Nov. 16, 2012. 4 pages.
International Search Report for PCT/US12/57577 dated Nov. 29, 2012. 2 pages.
International Search Report for PCT/US2010/033229 dated Dec. 29, 2010, 3 pages.
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report for PCT/US2011/035268 dated Aug. 5, 2011 (3 pages).
International Search Report PCT/US12/27620 dated Aug. 10, 2012. 3 pages.
IP Australia, Patent Examination Report No. 1, Australian Application No. 2012220669, dated Sep. 8, 2014, 6 pages.
IP Australia, Patent Examination Report No. 2, Australian Application No. 2012220669, dated Jun. 8, 2016, 4 pages.
Jiang Hao, "Research on the discovery mechanism of relay node in the middle of the peer network", the full-text database of excellent Master's degree thesis in China, (May 15, 2009).
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information filed Feb. 17, 2015.
Le Saint et al., U.S. Appl. No. 15/008,388 (unpublished), Methods for Secure Credential Provisioning, filed Jan. 27, 2016. 89 pages.
Lee et al., osgGap: scene graph library for mobile based on hybrid web app framework, Nov. 2013, 4 pages.
Li, U.S. Appl. No. 61/894,749 (unpublished), Methods and Systems for Authentication and Issuance of Tokens in a Secure Environment filed Oct. 23, 2013.
Liang, J., Shi, R., Liang, F., & Gao, Z. H. (2001). WAP clients & SET protocol. Dr.Dobb's Journal, 26(6), 85-91. Retrieved from http:/ /dialog.proquest.conn/professional/docview/202692023?accountid=131444 (Year: 2001) (5 pages).
Lowry P B XML data mediation and collaboration: a proposed comprehensive architecture and query requirements for using XML to mediate heterogeneous data sources and targets, Proceedings of the 34th Hawaii International Conference on System Sciences—2001, Jan. 3, 2001; Jan. 3, 2001-Jan. 6, 2001, IEEE, pp. 1-9.
McCarney et al., "Tapas: Design, Implementation, and Usability Evaluation of a Password Manager," Copyright 2012, ACM 978 1-4503-1312-4/12/12 (10 pages).
McGuire, U.S. Appl. No. 14/600,523 (unpublished), Secure Payment Processing Usnig Authorization Request, filed Jan. 20, 2015. 42 pages.
Notice of Allowance dated Oct. 10, 2018 for U.S. Appl. No. 14/242,403 (pp. 1-11).
Notice of Allowance dated Apr. 12, 2019 for U.S. Appl. No. 16/182,288 (pp. 1-8).
Notice of Allowance dated Feb. 10, 2021 for U.S. Appl. No. 15/627,085 (pp. 1-15).
Notice of Allowance dated Feb. 27, 2019 for U.S. Appl. No. 15/839,493 (pp. 1-9).
Notice of Allowance dated Jan. 14, 2021 for U.S. Appl. No. 16/140,879 (pp. 1-9).
Notice of Allowance dated Jan. 19, 2021 for U.S. Appl. No. 16/283,251 (pp. 1-5).
Notice of Allowance dated Jan. 22, 2021 for U.S. Appl. No. 16/532,095 (pp. 1-10).
Notice of Allowance dated Jan. 27, 2021 for U.S. Appl. No. 16/273,976 (pp. 1-9).
Notice of Allowance dated Jan. 29, 2021 for U.S. Appl. No. 15/988,485 (pp. 1-7).
Notice of Allowance dated Jul. 23, 2018 for U.S. Appl. No. 15/406,325 (pp. 1-9).
Notice of Allowance dated Jun. 10, 2020 for U.S. Appl. No. 15/494,294 (pp. 1-10).
Notice of Allowance dated Jun. 15, 2020 for U.S. Appl. No. 16/440,486 (pp. 1-8).
Notice of Allowance dated Jun. 27, 2018 for U.S. Appl. No. 13/542,443 (pp. 1-13).
Notice of Allowance dated Mar. 31, 2021 for U.S. Appl. No. 16/294,676 (pp. 1-9).
Notice of Allowance dated May 30, 2019 for U.S. Appl. No. 13/758,472 (pp. 1-10).
Notice of Allowance dated Nov. 8, 2019 for U.S. Appl. No. 14/698,317 (pp. 1-10).
Notice of Allowance dated Nov. 30, 2018 for U.S. Appl. No. 15/717,409 (pp. 1-8).
Notice of Allowance dated Oct. 11, 2018 for U.S. Appl. No. 13/520,481 (pp. 1-9).
Office Action dated Feb. 28, 2018 for U.S. Appl. No. 14/242,403 (pp. 1-11).
Office Action dated Apr. 1, 2020 for U.S. Appl. No. 16/140,879 (pp. 1-17).
Office Action dated Apr. 12, 2018 for U.S. Appl. No. 13/520,481 (pp. 1-8).
Office Action dated Aug. 21, 2020 for U.S. Appl. No. 15/988,485 (pp. 1-10).
Office Action dated Dec. 12, 2019 for U.S. Appl. No. 14/935,122 (pp. 1-12).
Office Action dated Dec. 27, 2018 for U.S. Appl. No. 13/398,817 (pp. 1-10).
Office Action dated Dec. 3, 2018 for U.S. Appl. No. 14/935,122 (pp. 1-13).
Office Action dated Dec. 4, 2020 for U.S. Appl. No. 16/017,241 (pp. 1-10).
Office Action dated Feb. 4, 2020 for U.S. Appl. No. 13/629,006 (pp. 1-7).
Office Action dated Jan. 17, 2019 for U.S. Appl. No. 14/216,832 (pp. 1-7).
Office Action dated Jan. 7, 2021 for U.S. Appl. No. 16/245,777 (pp. 1-10).

(56) References Cited

OTHER PUBLICATIONS

Office Action dated Jul. 10, 2019 for U.S. Appl. No. 13/398,817 (pp. 1-8).
Office Action dated Jul. 10, 2020 for U.S. Appl. No. 16/017,241 (pp. 1-9).
Office Action dated Jul. 16, 2018 for U.S. Appl. No. 14/698,317 (pp. 1-13).
Office Action dated Jun. 21, 2018 for U.S. Appl. No. 14/216,351 (pp. 1-12).
Office Action dated Jun. 22, 2018 for U.S. Appl. No. 13/629,006 (pp. 1-8).
Office Action dated Jun. 27, 2018 for U.S. Appl. No. 15/717,409 (pp. 1-7).
Office Action dated Jun. 27, 2019 for U.S. Appl. No. 13/629,006 (pp. 1-7).
Office Action dated Mar. 1, 2019 for U.S. Appl. No. 14/698,317 (pp. 1-11).
Office Action dated Mar. 13, 2020 for U.S. Appl. No. 15/494,294 (pp. 1-8).
Office Action dated Mar. 6, 2020 for U.S. Appl. No. 16,017,241 (pp. 1-7).
Office Action dated Mar. 6, 2020 for U.S. Appl. No. 16/440,486 (pp. 1-8).
Office Action dated May 14, 2019 for U.S. Appl. No. 14/935,122 (pp. 1-11).
Office Action dated May 19, 2020 for U.S. Appl. No. 15/627,085 (pp. 1-11).
Office Action dated May 22, 2018 for U.S. Appl. No. 14/216,382 (pp. 1-8).
Office Action dated May 25, 2021 for U.S. Appl. No. 16/017,241 (pp. 1-13).
Office Action dated Nov. 12, 2020 for U.S. Appl. No. 16/273,976 (pp. 1-9).
Office Action dated Nov. 2, 2018 for U.S. Appl. No. 13/624,779 (pp. 1-18).
Office Action dated Oct. 22, 2020 for U.S. Appl. No. 14/244,488 (pp. 1-13).
Office Action dated Oct. 27, 2020 for U.S. Appl. No. 16/294,676 (pp. 1-9).
Office Action dated Oct. 29, 2019 for U.S. Appl. No. 14/216,382 (pp. 1-8).
Office Action dated Oct. 31, 2019 for U.S. Appl. No. 15/627,085 (pp. 1-9).
Office Action dated Oct. 4, 2018 for U.S. Appl. No. 13/758,472 (pp. 1-22).
Office Action dated Oct. 6, 2020 for U.S. Appl. No. 16/532,095 (pp. 1-13).
Office Action dated Oct. 9, 2020 for U.S. Appl. No. 16/283,251 (pp. 1-6).
Office Action dated Sep. 21, 2018 for U.S. Appl. No. 15/839,493 (pp. 1-21).
Office Action dated Sep. 4, 2020 for U.S. Appl. No. 15/627,085 (pp. 1-10).
Pan Kexian "Development of the Location-Based Service LBS Application of Intelligent Mobile Phone", Information Technologies, Oct. 25, 2009, pp. 134-137, cited on Oct. 10, 2017 in CN201280019629.
Patterson, U.S. Appl. No. 15/019,157 (unpublished), Token Processing Utilizing Multiple Authorizations, filed Feb. 9, 2016. 62 pages.
Patterson, U.S. Appl. No. 62/054,346 (unpublished), Mirrored Token Vault, filed Sep. 23, 2014.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Prakash et al., U.S. Appl. No. 14/955,716 (unpublished), Provisioning Platform for Machine-To-Machine Devices, filed Dec. 1, 2015. 72 pages.
Prakash et al., U.S. Appl. No. 62/037,033 (unpublished), Sharing Payment Token, filed Aug. 13, 2014.
Rangarajan et al., U.S. Appl. No. 61/751,763 (unpublished), Payments Bridge filed Jan. 11, 2013.
Ratha, N., and Bolle, R., 1. History of Fingerprint Pattern Recognition- 1.1 Introduction; 1.2 The Development of Fingerprint Classification Systems "Automatic Fingerprint Recognition Systems," Springer-Verlag, (2004) (466 pages).
Sabba et al., U.S. Appl. No. 15/011,366 (unpublished), Token Check Offline, filed Jan. 29, 2016. 60 pages.
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?arnumber=5369384, pp. 449-452.
Sharma et al., U.S. Appl. No. 62/003,717 (unpublished), Mobile Merchant Application filed May 28, 2014.
ShopSavvy Blog. Feb. 2012. Retrieved from https://web.archive.Org/web/20120212104611/http://shopsavvy.com/blog. pp. 1-13 (Year: 2012).
Smartphone e-payment and Google AD send blog, 'Google Wallet on Smartphone', <http://stockpedia.blogspot.kr/2011/06/google-wallet.html> Jun. 10, 2011, pp. 1-3.
Stack Exchange, Why aren't there automated translators from one programming language to another, 2010 (5 pages).
State Intellectual Property of the People's Republic of China, First Office Action in Chinese Application No. 201280019629.X, dated Aug. 1, 2016, 15 pages.
State Intellectual Property Office of the People's Republic of China, First Office Action in Chinese Application No. 201280018719.7, dated Jul. 4, 2016, 31 pages.
Stubbs et al., U.S. Appl. No. 62/103,522 (unpublished), Methods and Systems for Wallet Provider Provisioning filed Jan. 14, 2015.
U.S. Appl. No. 15/462,658 (Unpublished), Replacing Token on a Multi-Token User Device, filed Mar. 17, 2017. 53 pages.
U.S. Appl. No. 12/940,664 (unpublished), entitled "System and Method for Determining Transaction Distance" filed Nov. 5, 2010. (51 pages).
U.S. Appl. No. 61/250,440, filed Oct. 9, 2009, entitled "Systems and Methods To Provide Loyalty Programs". 164 pages.
Vitt, Elizabeth et al. Data Integration Solutions for Master Data Management (Feb. 2006). https://technet.microsoft.com/en-us/library/aa964123(v=sql.90).aspx (19 pages).
Vitt, Elizabeth, et al. "Microsoft SQL Server 2005 Analysis Services Performance Guide." White Paper, White Paper (2007). (116 pages).
Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Win Anyu, "A cluster based routing relay node selection algorithm", 2010 Asia-Pacific Conference on Information Network and Digital Content Security (2010APCID), (Dec. 31, 2010).
Wong et al., U.S. Appl. No. 14/966,948 (unpublished), Automated Access Data Provisioning filed Dec. 11, 2015. 52 pages.
Wong et al., U.S. Appl. No. 61/879,362 (unpublished), Systems and Methods for Managing Mobile Cardholder Verification Methods filed Sep. 18, 2013.
Written Opinion for PCT/US12/27620 dated Aug. 10, 2012. 5 pages.

(56) References Cited

OTHER PUBLICATIONS

Xing Chang-you and Chen Ming; "Network distance prediction technology", Journal of Software, (Sep. 30, 2009), vol. 20, No. 9, p. 2470-2482 http://www.jos.org.cn/josen/ch/reader/view_abstract.aspx?flag=1&file_no=3559&journal_id=jos.

Yang Jingjing "Help Web: Life Search Forerunner"Scientific and Technological Information, Aug. 5, 2010, pp. 36-37, cited on Oct. 10, 2017 in CN201280019629.

Office Action dated Jul. 23, 2021 for U.S. Appl. No. 16/245,777 (pp. 1-12).

Chinese Office Action (including English translation) issued in App. No. CN201810822482.7, dated Mar. 25, 2022, 15 pages.

Dragt, Bruce. "Universal Commerce: A Seamless, Personalized Purchase Experience for Today's Connected Consumers." A First Data White Paper (2012). (Year: 2012) (pp. 1-17).

Office Action (Notice of Allowance and Fees Due (PTOL-85)) dated Jan. 25, 2022 for U.S. Appl. No. 16/245,777 (pp. 1-11).

Office Action (Notice of Allowance and Fees Due (PTOL-85)) dated Mar. 8, 2022 for U.S. Appl. No. 17/064,832 (pp. 1-8).

Office Action (Notice of Allowance and Fees Due (PTOL-85)) dated Apr. 22, 2022 for U.S. Appl. No. 16/245,777 (pp. 1-9).

Office Action (Notice of Allowance and Fees Due (PTOL-85)) dated Apr. 27, 2022 for U.S. Appl. No. 17/064,832 (pp. 1-2).

Office Action (Non-Final Rejection) dated Sep. 28, 2022 for U.S. Appl. No. 17/321,143 (pp. 1-8).

Office Action (Final Rejection) dated Jan. 19, 2023 for U.S. Appl. No. 17/321,143 (pp. 1-9).

Office Action (Non-Final Rejection) dated Mar. 1, 2023 for U.S. Appl. No. 17/868,502 (pp. 1-7).

\* cited by examiner

FIGURE 1  Example: E-Wallet Checkout Platform

Example: E-Wallet Checkout Mobile Application

FIGURE 3 — Example: E-Wallet Checkout Data Flow

Example Logic Flow: E-Wallet Checkout (EWC) component

Example Logic Flow: E-Wallet Checkout Payment Acquisition (EWCPA) component

Example Logic Flow: E-Wallet Checkout Purchase Transaction (EWCPT) component

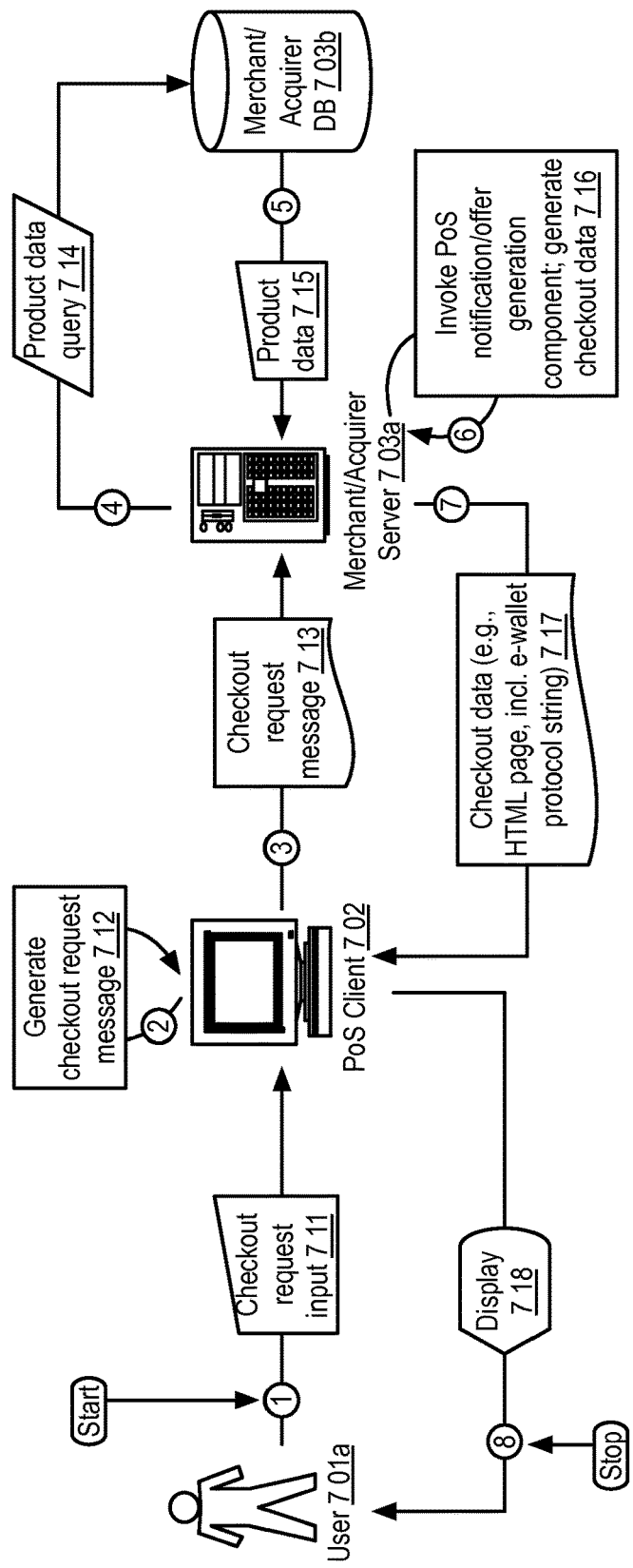
FIGURE 7  Example Datagraph: User Purchase Checkout ("UPC") component

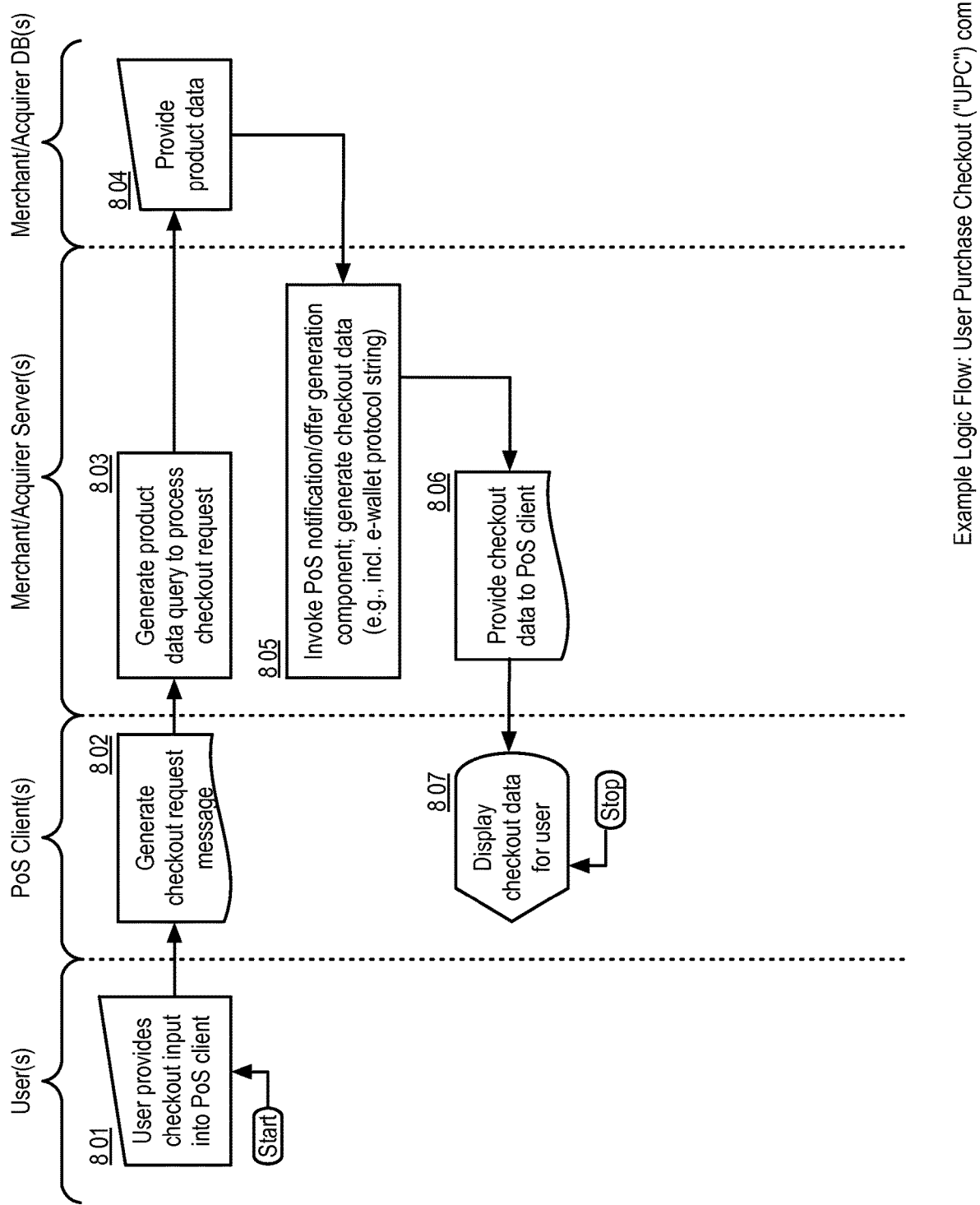
FIGURE 8 — Example Logic Flow: User Purchase Checkout ("UPC") component

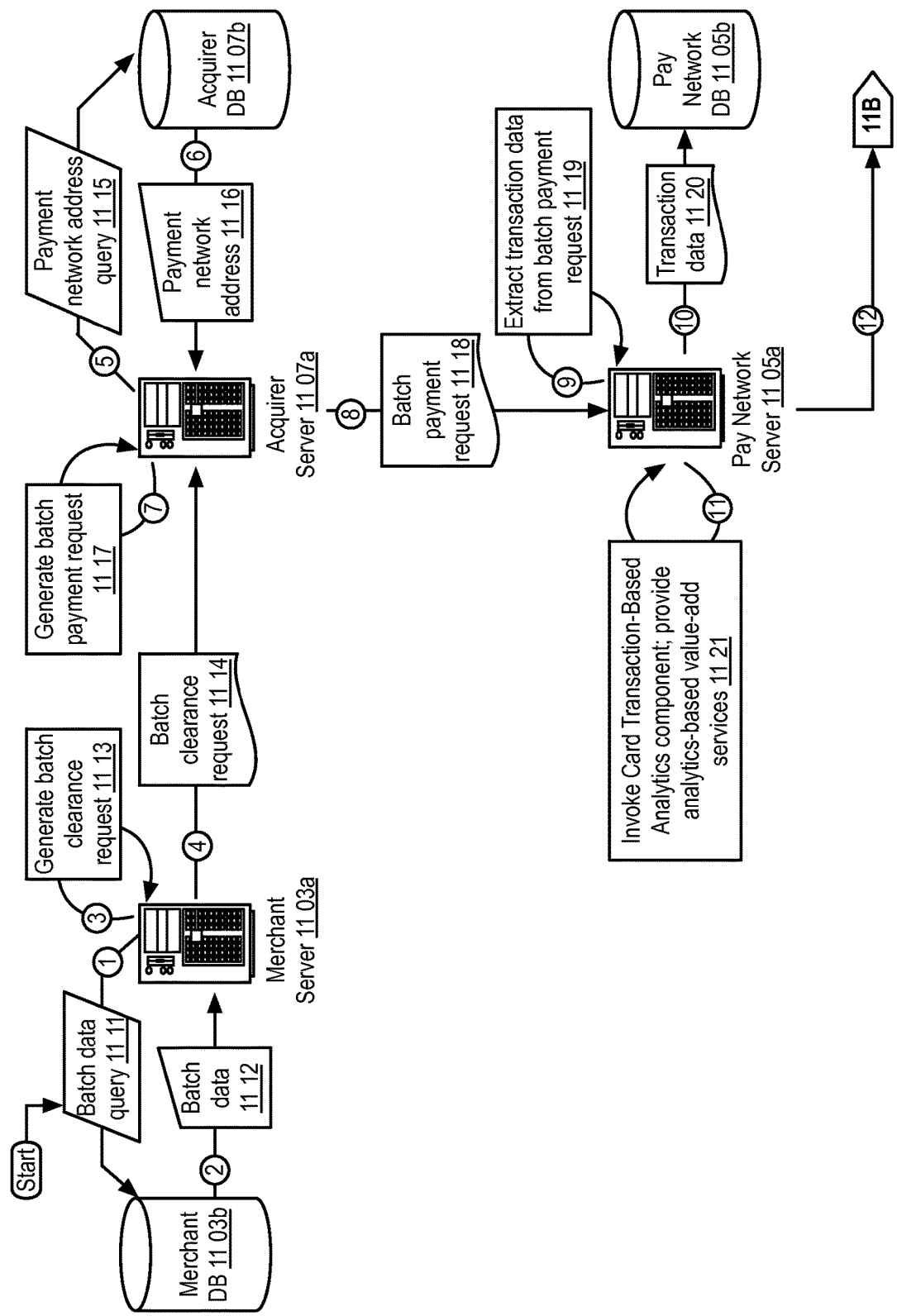
FIGURE 11A  Example Datagraph: Purchase Transaction Clearance ("PTC") component

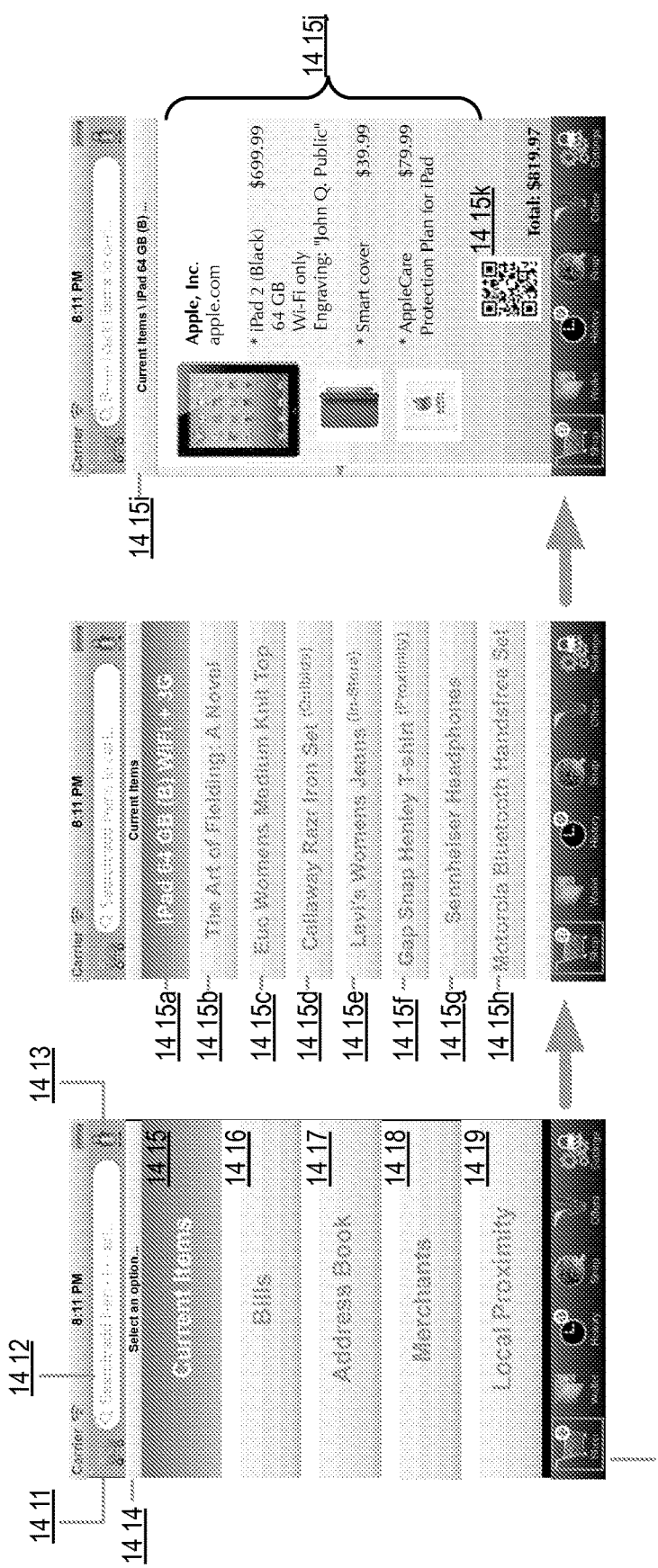
FIGURE 14A — Example: Virtual Wallet Mobile App - Shopping Mode

Example: Virtual Wallet Mobile App - Shopping Mode

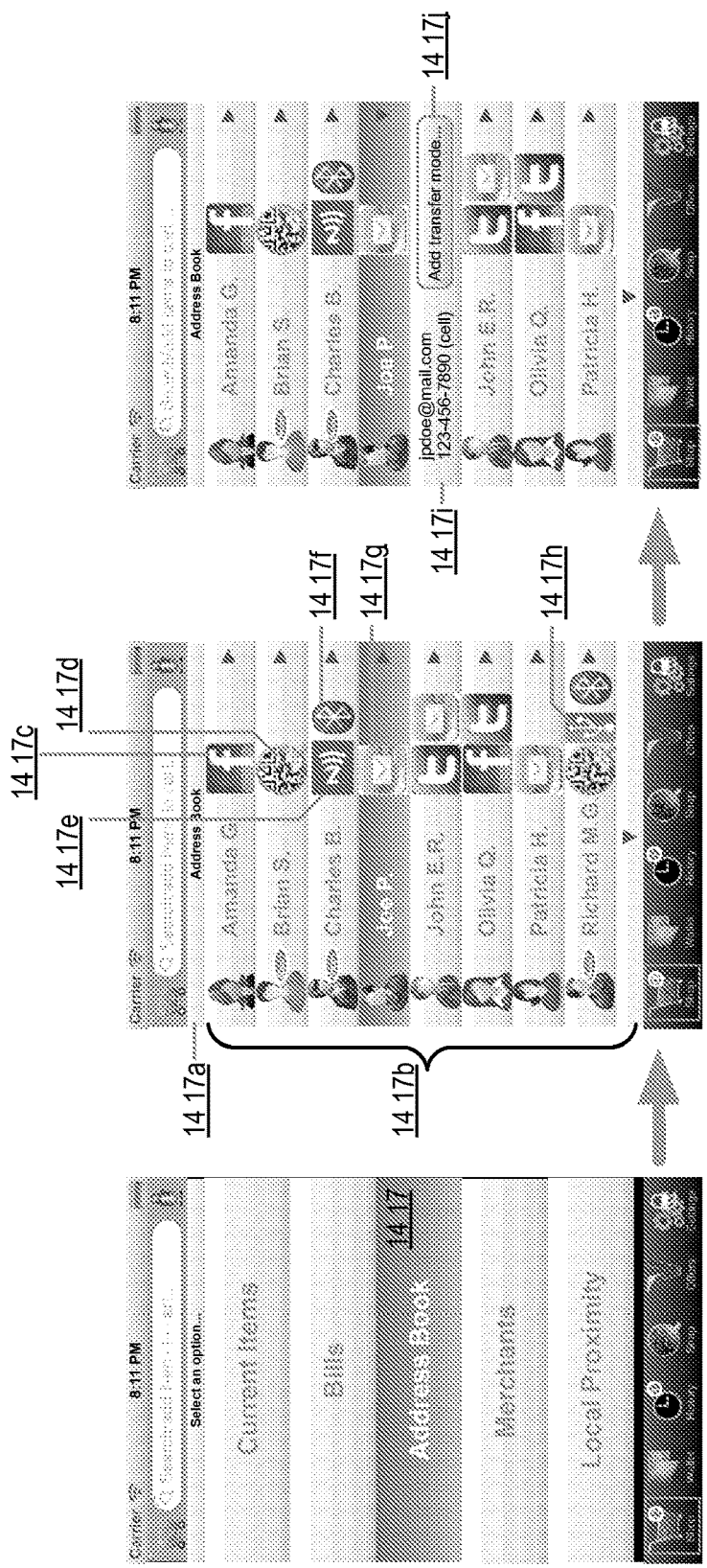
FIGURE 14C  Example: Virtual Wallet Mobile App - Shopping Mode

Example: Virtual Wallet Mobile App - Shopping Mode

Example: Virtual Wallet Mobile App - Shopping Mode

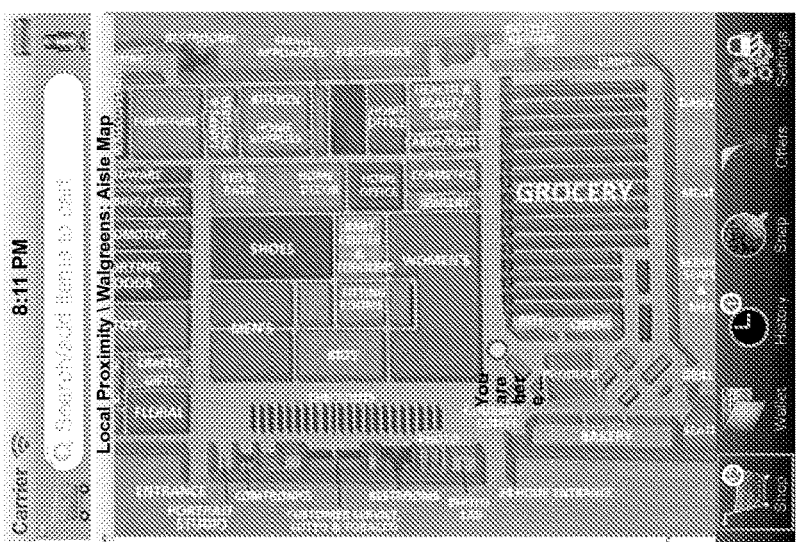
FIGURE 14G
Example: Virtual Wallet Mobile App - Shopping Mode Example: Virtual Wallet Application Embodiment - (Local) Merchant Shopping Mode: Virtual Store Injection

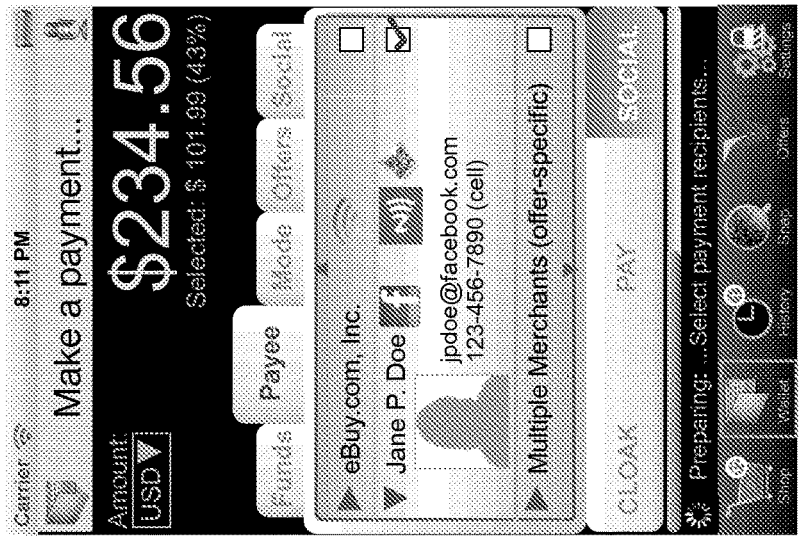
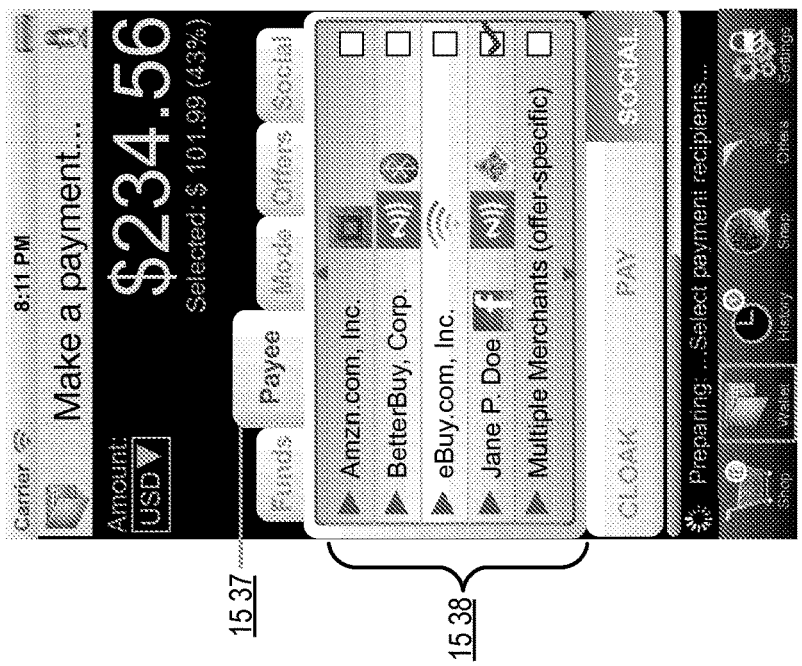
FIGURE 15C
Example: Virtual Wallet Mobile App

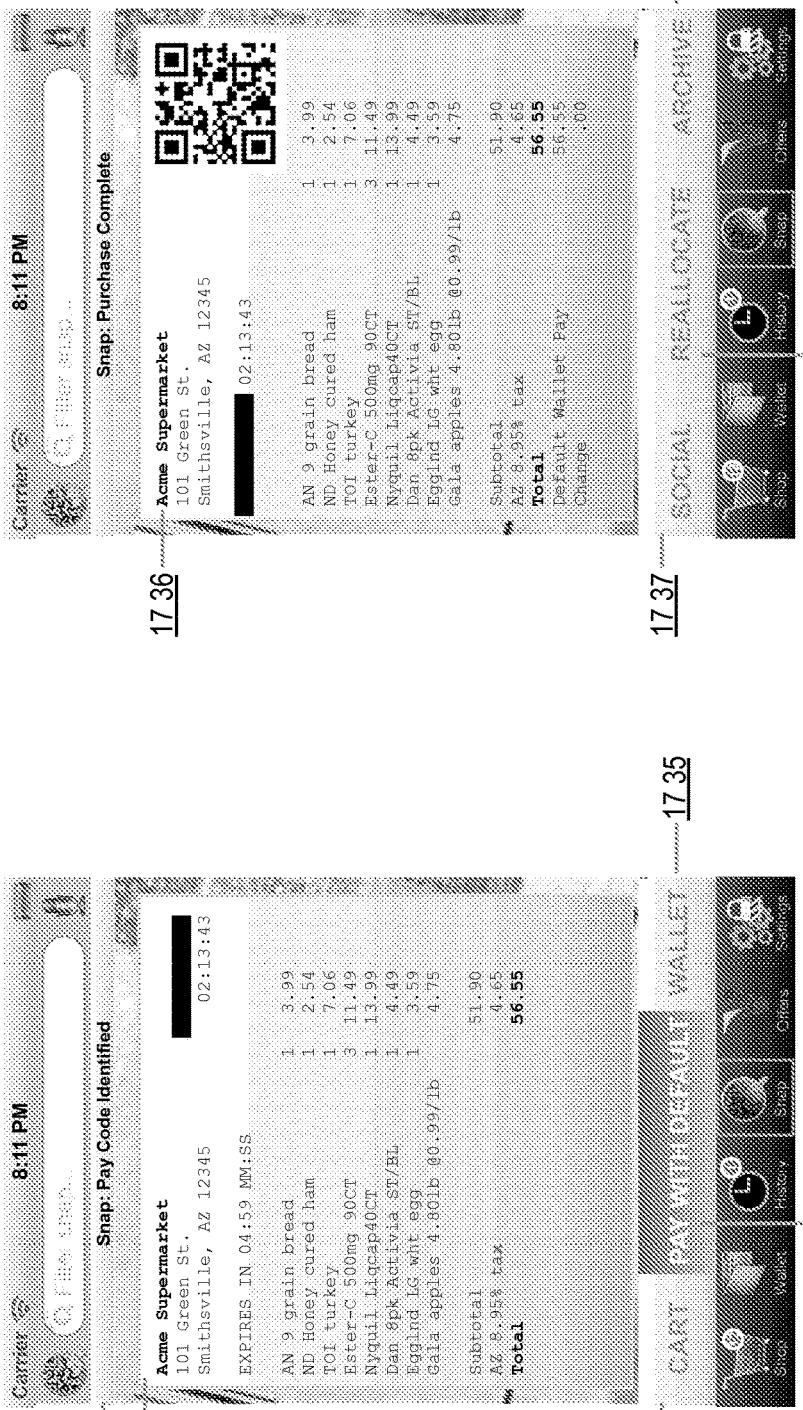
FIGURE 17C  Example: Virtual Wallet Mobile App - Snap Mode

Example: Virtual Wallet Mobile App - Snap Mode

FIGURE 18

Example: Virtual Wallet Mobile App - Offers 18 11 — Search for an offer
18 12 —
18 13 — Come Back! Extra 10% off... Expires in 01:29 mm:ss.
18 14 — Get $50 off with Visa credit (for your cart contents) (mm:ss)
18 15 — $25 @johnq #dinnrmovielastnite
18 16 — @john.q: you owe me $15... (Pay)
18 17 — Multiple: $85 off (15-day ship)
18 18 — HiBuy: Holiday sale! (interactively explore our aisles)
18 19 — BigBuy: $25 off for buys > $75
18 20 — Add-On: Use vWallet rewards Expires in 15:55 mm:ss.
18 21 — Amzn: -5% + 2-day shipping
18 10

ELECTRONIC WALLET CHECKOUT PLATFORM APPARATUSES, METHODS AND SYSTEMS

PRIORITY CLAIM

This application is a continuation of U.S. patent application Ser. No. 16/140,879 filed Sep. 25, 2018, entitled "ELECTRONIC WALLET CHECKOUT PLATFORM APPARATUSES, METHODS AND SYSTEMS," which is a continuation of U.S. patent application Ser. No. 13/542,443 filed Jul. 5, 2012, entitled "ELECTRONIC WALLET CHECKOUT PLATFORM APPARATUSES, METHODS AND SYSTEMS," now U.S. Pat. No. 10,121,129, which claims priority under 35 USC § 119 to U.S. provisional patent application Ser. No. 61/504,348 filed Jul. 5, 2011, entitled "ELECTRONIC WALLET CHECKOUT PLATFORM APPARATUSES, METHODS AND SYSTEMS." The entire contents of the aforementioned applications are expressly incorporated by reference herein.

This application for letters patent discloses and describes various novel innovations and inventive aspects of ELECTRONIC WALLET CHECKOUT PLATFORM technology (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for electronic purchase transactions, and more particularly, include ELECTRONIC WALLET CHECKOUT PLATFORM APPARATUSES, METHODS AND SYSTEMS ("EWCP").

BACKGROUND

Credit cards, debit cards, and gift cards have supplemented cash in facilitating purchase transactions. Such forms of payment are used extensively in online purchase transactions, where direct exchange of cash is usually not practical.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIG. 7 shows a datagraph diagram illustrating example aspects of transforming a user checkout request input via a User Purchase Checkout ("UPC") component into a checkout data display output;

FIG. 8 shows a logic flow diagram illustrating example aspects of transforming a user checkout request input via a User Purchase Checkout ("UPC") component into a checkout data display;

FIGS. 11A-B show datagraph diagrams illustrating example aspects of transforming a merchant transaction batch data query via a Purchase Transaction Clearance ("PTC") component into an updated payment ledger record;

FIGS. 14A-K show user interface and logic flow diagrams illustrating example features of virtual wallet applications in a shopping mode, in some embodiments of the EWCP;

FIGS. 15A-F show user interface diagrams illustrating example features of virtual wallet applications in a payment mode, in some embodiments of the EWCP;

FIGS. 17A-E show user interface diagrams illustrating example features of virtual wallet applications in a snap mode, in some embodiments of the EWCP;

FIG. 18 shows a user interface diagram illustrating example features of virtual wallet applications, in an offers mode, in some embodiments of the EWCP;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Electronic Wallet Checkout Platform (EWCP)

The ELECTRONIC WALLET CHECKOUT PLATFORM APPARATUSES, METHODS AND SYSTEMS (hereinafter "EWCP") transform customer purchase requests triggering electronic wallet applications, via EWCP components, into electronic purchase confirmation and receipts. A consumer who wants to purchase a product and/or a service from a merchant may go to the merchant's website to engage in a purchase transaction. For example, this may involve using the merchant's website to provide personal information, such as credit card billing address and credit card information, to the merchant to facilitate the purchase transaction. Such online shopping experience may be fraught with security risks and usability problems. The customer's data may be exposed or misused by the merchant during the checkout and/or payment flow. If the merchant stores the customer's personal information, this information may be also vulnerable to security breaches that may happen long after the customer engaged in a purchase transaction. In addition, different checkout and payment implementations provide inconsistent user experience across merchant websites, which may result in customer confusion and unpleasant shopping experience. The EWCP externalizes the checkout and/or payment flow from the web based, merchant driven model. Using the EWCP, the customer may engage in a purchase transaction via a secure platform that may provide a consistent user experience across merchant websites.

Figure 1:
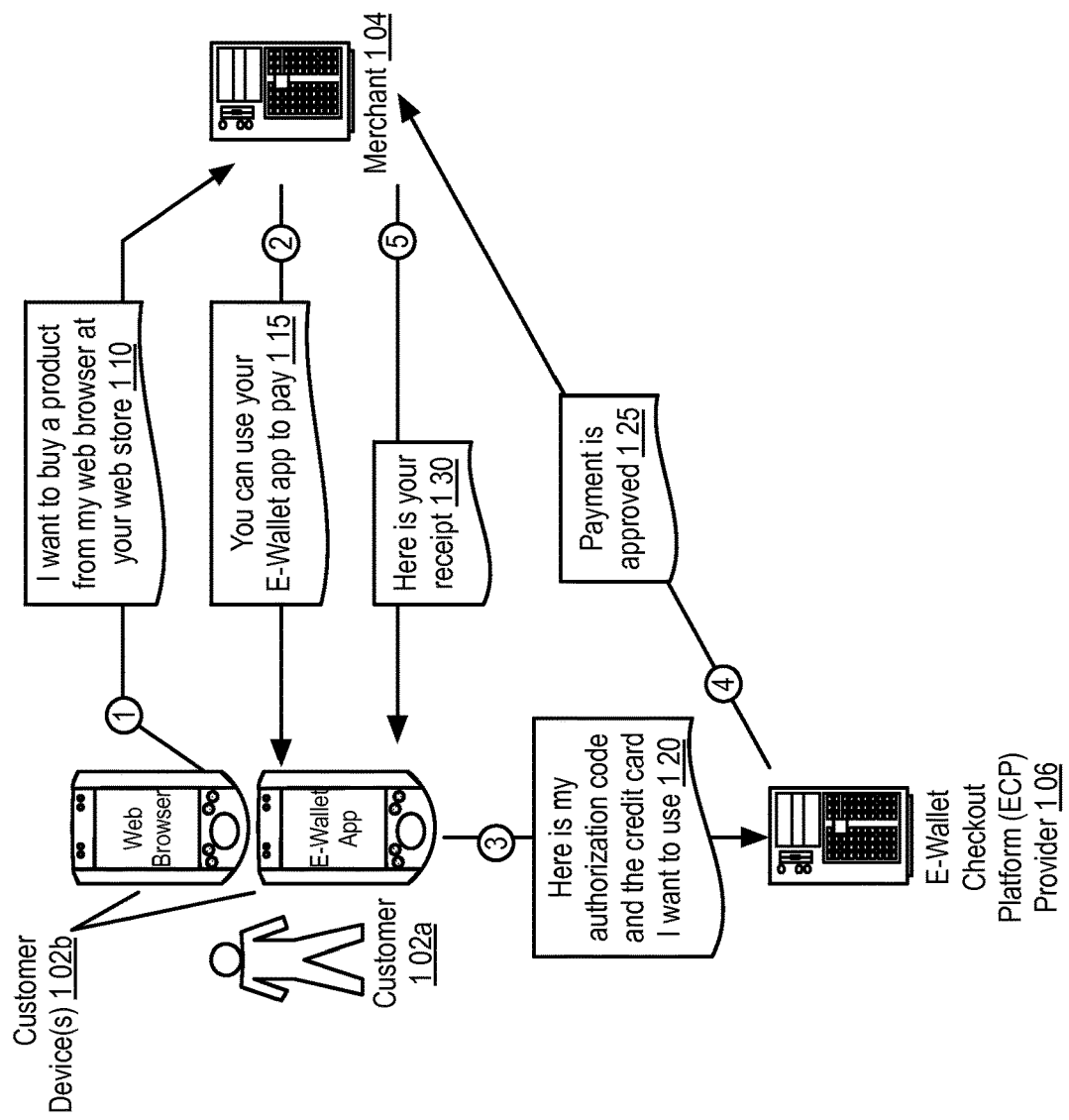
FIG. 1 shows a block diagram of an exemplary e-wallet checkout platform usage scenario in one embodiment of the EWCP.

FIG. 1 shows a block diagram of an exemplary e-wallet checkout platform usage scenario in one embodiment of the EWCP. In FIG. 1, a customer 102a may wish to purchase a product and/or service 110 from a merchant 104 via a web browser (e.g., at the merchant's website). For example, the customer may be shopping online for an item at the merchant's website, via consumer device 102b. In another example, the customer may be shopping at the merchant's retail location and may purchase an item using a mobile device to scan the item's product identifier, as described in more detail in U.S. provisional patent application Ser. No. 61/467,890 filed Mar. 25, 2011, entitled "In-Person One-Tap Purchasing Apparatuses, Methods and Systems,", and in U.S. provisional patent application Ser. No. 61/467,969 filed Mar. 25, 2011, entitled "In-Person One-Tap Purchasing Apparatuses, Methods and Systems," (the entire contents of the aforementioned applications are herein expressly incorporated by reference).

The merchant may provide an indication 115 that the customer may use an e-wallet app (e.g., provided by the EWCP as described with reference to FIGS. 13-19B) to pay for an item. For example, such an indication may take the form of using an EWCP-supported protocol at the checkout webpage. The EWCP may detect that the merchant uses an EWCP-supported protocol (e.g., via a mobile EWCP application described in more detail in FIG. 2), and may prompt the customer to use an EWCP electronic wallet (hereinafter "E-Wallet" or "wallet application") to facilitate payment. Using the E-Wallet may facilitate payment for the item without revealing the customer's personal information to the merchant. The customer may be asked to provide authentication and/or authorization information to use the E-Wallet. The customer may also provide a selection of a payment method (e.g., a specific credit card) 120. In some embodiments, the customer device providing the E-Wallet may be a separate device from the customer device using which the customer initiated shopping with the merchant.

An EWCP provider 106 may verify authentication and/or authorization and/or payment information. The EWCP may use information regarding the merchant selling the item and/or regarding the item (e.g., obtained via parameter values in a universal resource identifier (URI) link used to access the E-Wallet), to facilitate completion of the purchase transaction. For example, the EWCP may determine the price and/or quantity of each item being purchased, calculate the total amount due from the customer, collect the total amount due and provide appropriate payment (e.g., total amount due minus fees) to the merchant. The EWCP provider may also provide a confirmation to the merchant that payment information was obtained 125 (e.g., via an API call, via an email, and/or the like). In one embodiment, the EWCP provider may provide a receipt (e.g., a confirmation page, a confirmation email, and/or the like) to the customer. For example, this may be a receipt customized for the merchant (e.g., containing merchant branding), a generic default receipt, and/or the like. In another embodiment, the merchant may provide a receipt to the customer 130. For example, the merchant may generate the receipt based on the confirmation information received from the EWCP provider.

In some implementations, the wallet application may allow the user to shop within the inventories of merchants participating in the EWCP. For example, the inventories of the merchants may be provided within the wallet application for the user to make purchases. In some implementations, the wallet application may provide a virtual storefront for the user within the graphical user interface of the virtual wallet application. Thus, the user may be virtually injected into a store of the merchant participating in the EWCP's wallet application.

In some implementations, the wallet application may utilize the location coordinates of the user device (e.g., via GPS, IP address, cellular tower triangulation, etc.) to identify merchants that are in the vicinity of the user's current location. In some implementations, the wallet application may utilize such information to provide information to the user on the inventories of the merchants in the locality, and or may inject the merchant store virtually into the user's wallet application.

In some implementations, the wallet application may provide a shopping assistant. For example, a user may walk into a physical store of a merchant. The user may require assistance in the shopping experience. In some implementations, the wallet application may allow the user to turn on the shop assistant, and a store executive in the merchant store may be able to assist the user via another device. In some embodiments, a user may enter into a store (e.g., a physical brick-and-mortar store, virtual online store via a computing device, etc.) to engage in a shopping experience. The user may have a user device. The user device may have executing thereon a wallet application, including features such as those as described herein. Upon entering the store, the user device may communicate with a store management server. For example, the user device may communicate geographical location coordinates, user login information and/or like check-in information to check in automatically into the store. In some embodiments, the EWCP may inject the user into a virtual wallet store upon check in. For example, the wallet app executing on the user device may provide features as described below to augment the user's in-store shopping experience. In some embodiments, the store management server may inform a customer service representative ("CSR") of the user's arrival into the store. For example, the CSR may have a CSR device, and an app ("CSR app") may be executing thereon. For example, the app may include features such as described below in the discussion herein. The CSR app may inform the CSR of the user's entry, including providing information about the user's profile, such as the user's identity, user's prior and recent purchases, the user's spending patterns at the current and/or other merchants, and/or the like. In some embodiments, the store management server may have access to the user's prior purchasing behavior, the user's real-time in-store behavior (e.g., which items' barcode did the user scan using the user device, how many times did the user scan the barcodes, did the user engage in comparison shopping by scanning barcodes of similar types of items, and/or the like), the user's spending patterns (e.g., resolved across time, merchants, stores, geographical locations, etc.), and/or like user profile information. The store management system may utilize this information to provide offers/coupons, recommendations and/or the like to the CSR and/or the user, via the CSR device and/or user device, respectively. In some embodiments, the CSR may assist the user in the shopping experience. For example, the CSR may convey offers, coupons, recommendations, price comparisons, and/or the like, and may perform actions on behalf of the user, such as adding/removing items to the user's physical/virtual cart, applying/removing coupons to the user's purchases, searching for offers, recommendations, providing store maps, or store 3D immersion views, and/or the like. In some embodiments, when the user is ready to checkout, the EWCP may provide a checkout notification to the user's device and/or CSR device. The user may checkout using the user's wallet application executing on the user device, or may utilize a communication mechanism (e.g., near field communication, card swipe, QR code scan, etc.) to provide payment information to the CSR device. Using the payment information, the EWCP may initiate the purchase transaction(s) for the user, and provide an electronic receipt to the user device and/or CSR device. Using the electronic receipt, the user may exit the store with proof of purchase payment.

Figure 2:
FIG. 2 shows a screen shot diagram illustrating a mobile EWCP application in one embodiment of the EWCP.

FIG. 2 shows a screen shot diagram illustrating a mobile EWCP application in one embodiment of the EWCP. As illustrated in screen 201 of FIG. 2, a customer may visit a merchant's website using a mobile device (e.g., a cell phone, a PDA, a tablet, and/or the like). The customer may wish to purchase two 204 Micro SD cards 202 at a price 206 of $3.45 each. The customer may click the "Buy" button 208*a* to purchase these items. The mobile EWCP application may detect that the merchant's website uses an EWCP-supported protocol (see FIG. 5 for additional details regarding detecting merchant support for an EWCP-supported protocol), and may prompt the customer to use an E-Wallet to facilitate payment. In one embodiment, the E-Wallet may be a part of the mobile EWCP application. In another embodiment, the E-Wallet may be a different mobile EWCP application. In yet another embodiment, the E-Wallet may be a website associated with the EWCP provider, and the customer may be redirected to this website.

In one embodiment, the "Buy" button 208*a* may facilitate a single click purchase. The "More" button 208*b* may be used to configure the default payment method to be used upon clicking the "Buy" button 208*a* (e.g., the customer may select the default payment method). For example, clicking the "More" button 208*b* may bring up an E-Wallet popup 208*c* (e.g., a Web 2.0 popup, an HTML popup, a Javascript popup, a Java applet popup, and/or the like) that facilitates selection of the default payment method. In one embodiment, the selections may be set as default for future preferences/transactions and may be synched to other applications and/or devices as default settings for E-Wallet transactions (e.g., as in FIGS. 13-19B). See FIGS. 13-19B for additional details regarding exemplary E-Wallet popup features and/or embodiments. In one embodiment, the E-Wallet may challenge the user with a password login/dialog box prior to displaying the information shown in the E-Wallet popup 208*c* and/or prior to allowing a single click purchase. In one embodiment, subsequent selections of the "Buy" or "Authorize" button(s) may use these default settings. Upon clicking the "Buy" button 208*a*, the default payment method (e.g., a specific credit card) may be used instead of prompting the customer to select a wallet and/or a payment method to be used.

In another embodiment, the "Buy" button 208*a* may trigger the launch of an E-Wallet application and the application may be instantiated. As illustrated in screen 211, upon authentication and/or authorization to use the E-Wallet, the customer may be prompted to select an available wallet. In one embodiment, the customer may select a wallet stored on the mobile device 212 (e.g., stored on the mobile device's memory card, such as on a secure micro SD card). In another embodiment, the customer may select an online wallet 214 (e.g., stored in a database of the EWCP provider and which may be accessed via a Java applet, HTML5 application, Javascript application, and/or the like).

As illustrated in screen 221, the customer may be presented with a choice of payment methods 222*a*-222*d* (e.g., credit cards, debit cards, gift cards, and/or the like) available in the wallet selected by the customer. In one embodiment, the available payment methods in the wallet may be presented to the customer. In another embodiment, the merchant may specify criteria (e.g., via parameter values in a URI link used to access the E-Wallet, via a configuration file stored on the EWCP provider's server, and/or the like) for payment methods that are acceptable (e.g., credit cards and the merchant's gift cards) and only the payment methods that satisfy the specified criteria may be presented to the customer. In some embodiments, merchants may also specify (e.g., via parameter values in a URI link used to access the E-Wallet, via a configuration file stored on the EWCP provider's server, and/or the like) rewards, discounts, bonus items, and/or the like associated with using various payment methods. For example, a merchant may specify that using the merchant's gift card gives an additional 2% discount off the price of the order. The customer may also add additional payment methods if desired. For example, the customer may add a new credit card and select it as the payment method. In some embodiments, a merchant may specify (e.g., via parameter values in a URI link used to access the E-Wallet, via a configuration file stored on the EWCP provider's server, and/or the like) that a customer who does not have a preferred payment method (e.g., the merchant's credit card) should be prompted to sign up for and/or add the preferred payment method to the wallet. The merchant may also specify rewards, discounts, bonus items, and/or the like associated with signing up for and/or adding the preferred payment method to the wallet. Upon selecting a payment method (e.g., 222*a*), the customer may use the "Complete the purchase . . . " button 224 to submit payment information.

The EWCP provider may analyze payment information provided by the customer and/or information regarding the merchant and/or the item (e.g., obtained via parameter values in a URI link used to access the E-Wallet, via a configuration file stored on the EWCP provider's server, and/or the like) to facilitate the purchase transaction. For example, the EWCP provider may verify payment information, determine the amount to charge the customer, verify that the merchant is authorized to receive payment, and/or the like. As illustrated in screen 231, the EWCP provider may provide a receipt 232 to the customer confirming the purchase transaction. The receipt may include item name 234, quantity purchased 236, item price 238, transaction authorization and/or verification code 240, payment information 242, and/or the like. The EWCP provider may also provide a payment confirmation to the merchant to confirm that the payment has been made.

Figure 3:
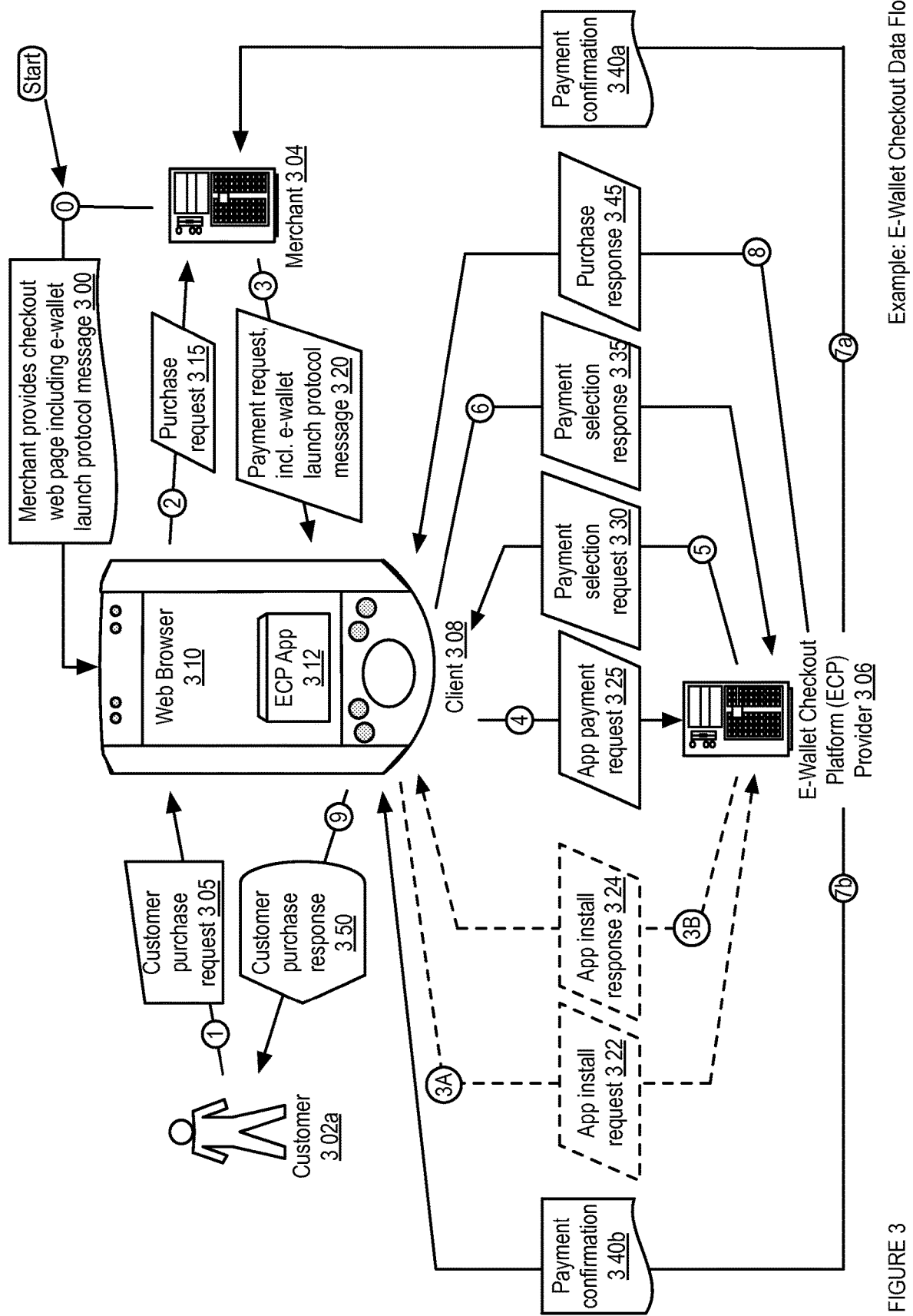
FIG. 3 shows a data flow diagram for e-wallet checkout in one embodiment of the EWCP.

FIG. 3 shows a data flow diagram for e-wallet checkout in one embodiment of the EWCP. In FIG. 3, a merchant may have initially provided to a web browser executing on client 308, for a customer 302a, a checkout page (e.g., a HTML web page), including an e-wallet launch protocol message, e.g., 300. The customer 302a may send, using the client 308, a customer purchase request 305 to client 308. For example, the customer may send a request to purchase an item from a merchant 304. In one implementation, the user may use a keyboard, a mouse, a touch screen, and/or the like to input the customer purchase request via a merchant's website. In another implementation, the customer may use a camera of the client (e.g., of a cell phone, a PDA, a tablet, and/or the like) to scan the item's product identifier. The client may provide a purchase request 315 to the merchant 304 indicating to the merchant that the customer wants to purchase the item. For example, the client may use a web browser 310 to submit the purchase request to the merchant's website and the purchase request may be in XML format substantially in the following form:

<XML>
        <PurchaseRequest>
            <ItemName>SD Card</ItemName>
            <ItemID>ID123I</ItemID>
            <ItemPrice>$3.45</ItemPrice>
            <ItemQuantity>2</ItemQuantity>
            <UserID>ID123U</UserID>
            <PromotionalCodes>Code123C</Promotional-
                Codes>
            <RewardCodes>None</RewardCodes>
        </PurchaseRequest>
    </XML>

The merchant may respond with a payment request 320. The payment request may prompt the customer to provide payment information to pay for the item. In some embodiments, the payment request 320 may include an e-wallet launch protocol message. For example, the payment request may be a webpage that uses a protocol string (e.g., a string starting with "ewalletcheckout://") to indicate that the merchant uses an EWCP-supported protocol. In one embodiment, the protocol string may be detected by an EWCP application 312 (see FIG. 5 for additional details regarding detecting merchant support for an EWCP-supported protocol), and the E-Wallet may be activated in response. In another embodiment, the webpage may detect (e.g., via Javascript) whether an EWCP application 312 is installed on the client and use the protocol string if the EWCP application is installed (and use a non EWCP payment method otherwise). In some embodiments, if the EWCP application is not installed on the client, the merchant's webpage may prompt the customer to install the EWCP application on the client. If the customer chooses to install the EWCP application, an application installation request 322 may be sent by the client to obtain the EWCP application from the EWCP provider 306 via an application installation response 324. For example, the merchant may provide a link to a webpage of the EWCP provider 306, and the customer may follow that link to obtain an installation file for the EWCP application. In another example, the merchant may provide a link to an Apple App Store and/or Android Market distributed application that the customer may follow to obtain the EWCP application.

The client may provide an application payment request 325 to the EWCP provider 306. The application payment request may be used to provide information regarding the merchant, the item, the customer, and/or the like to the EWCP provider to facilitate payment to the merchant. For example, the application payment request may identify the unique ID of the merchant that should receive payment, the unique ID and/or description of the item being purchased, the quantity being purchased, the purchase price, the customer's EWCP login information, client information, and/or the like, and may be in XML format substantially in the following form:

<XML>
        <ApplicationPaymentRequest>
            <MerchantID>ID456M</Merchant>
            <ItemName>SD Card</ItemName>
            <ItemID>ID123I</ItemID>
            <ItemPrice>$3.45</ItemPrice>
            <ItemQuantity>2</ItemQuantity>
            <CustomerID>ID789C</CustomerID>
            <CustomerPassword>* * * * *</CustomerPass-
                word>
            <PromotionalCodes>Code123C</Promotional-
                Codes>
            <RewardCodes>None</RewardCodes>
        </ApplicationPaymentRequest>
    </XML>

The EWCP provider may provide a payment selection request 330 to the client 308. In alternative embodiments, the merchant 304 may provide the payment selection request 330 to the client 308. The payment selection request may be used to determine the wallet and/or the payment method that the customer may wish to use to pay for the item. For example, the payment selection request may include lists of wallets and/or payment methods (e.g., credit cards, debit cards, gift cards, and/or the like) that the customer may use, and may be in XML format substantially in the following form:

```
<XML>
    <PaymentSelectionRequest>
        <Wallet>
            <WalletID>ID234W</WalletID>
            <PaymentMethods>
                <PaymentMethod>Credit Card 1</PaymentMethod>
                <PaymentMethod>Credit Card 2</PaymentMethod>
                <PaymentMethod>Debit Card 1</PaymentMethod>
            </PaymentMethods>
        </Wallet>
        <Wallet>
            <WalletID>ID345W</WalletID>
            <PaymentMethods>
                <PaymentMethod>Credit Card 3</PaymentMethod>
                <PaymentMethod>Credit Card 4</PaymentMethod>
                <PaymentMethod>Gift Card 1</PaymentMethod>
            </PaymentMethods>
        </Wallet>
    </PaymentSelectionRequest>
</XML>
```

In another embodiment, the payment selection request may be a store injection package. For example, the store injection package may use payment request 320 to preselect items provided through the store injection package. In a further example, the merchant may have provided the store injection package along with the payment request 320 to client 308, or may have provided it to the e-wallet checkout platform provider 306 for transmission to the client 308 with the payment selection request 330. The customer may select the desired wallet and/or payment method, and the client may provide a payment selection response 335 to the EWCP provider. For example, the payment selection response may include a payment method selection, a payment method security code, and/or the like, and may be in XML format substantially in the following form:

```
<XML>
    <PaymentSelectionResponse>
        <PaymentMethod>Credit Card 1</PaymentMethod>
        <PaymentMethodSecurityCode>432</PaymentMethodSecurityCode>
    </PaymentSelectionResponse>
</XML>
```

Upon verifying that the customer's payment information is acceptable, the EWCP provider may provide a payment confirmation 340a to the merchant, and/or 340b to the client. For example, the payment confirmation may include a transaction ID, the transaction date and/or time, transaction status, a transaction authorization and/or verification code, details regarding the purchase, and/or the like, and may be in XML format substantially in the following form:

```
<XML>
    <PaymentConfirmation>
        <TransactionID>ID567T</TransactionID>
        <TransactionDate>Jun. 12, 2011</TransactionDate>
        <TransactionTime>9:00:00 pm</TransactionTime>
        <TransactionStatus>OK</TransactionStatus>
        <AuthorizationCode>ANET10</AuthorizationCode>
        <ItemName>SD Card</ItemName>
        <ItemID>ID123I</ItemID>
        <ItemPrice>$3.45</ItemPrice>
        <ItemQuantity>2</ItemQuantity>
        <CustomerID>ID789C</CustomerID>
    </PaymentConfirmation>
</XML>
```

The EWCP provider may also provide a purchase response 345 to the client. The purchase response may facilitate providing the customer with a receipt (e.g., it may include a transaction authorization code that confirms the transaction and may be included as part of the receipt), may redirect the customer to a webpage (e.g., a merchant provided webpage to which the customer should be redirected upon successful payment), and/or the like, and may be in XML format substantially in the following form:

```
<XML>
    <PurchaseResponse>
        <TransactionAuthorizationCode>ANET10</TransactionAuthorizationCode>
        <RedirectPage>www.merchant.com/
            redirect_success.html<RedirectPage>
    </PurchaseResponse>
</XML>
```

The client 308 may output a customer purchase response 350 to the customer 302. The client may output the response using a display, speakers, a printer, and/or the like. For example, the client may display the receipt and/or the redirect webpage to the customer.

Figure 4:
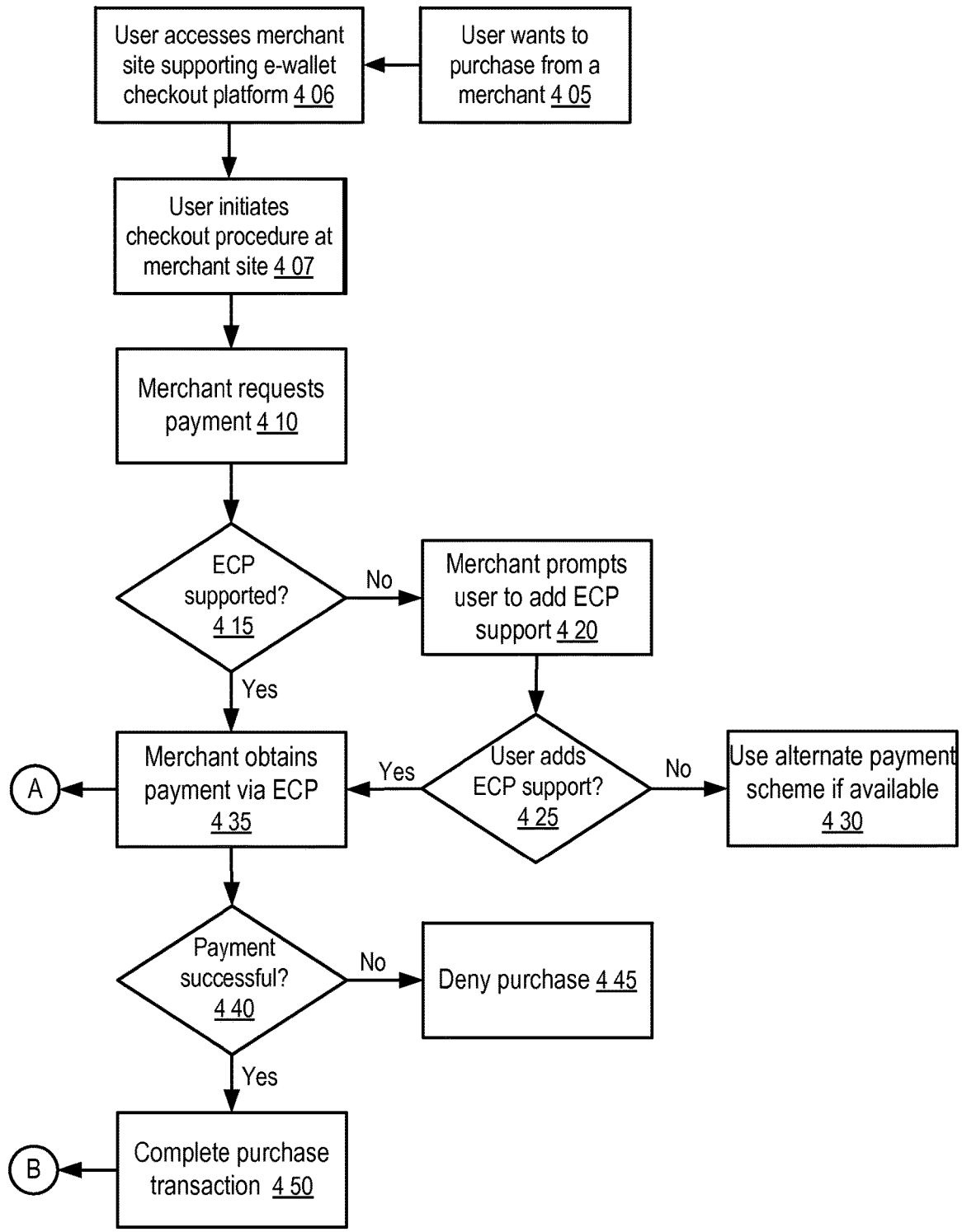
FIG. 4 shows a logic flow diagram of an E-Wallet Checkout (EWC) component in one embodiment of the EWCP.

FIG. 4 shows a logic flow diagram of an E-Wallet Checkout (EWC) component in one embodiment of the EWCP. In FIG. 4, a user (e.g., a customer) may indicate that the user wants to purchase at item from a merchant at 405. The user may access a merchant site supporting the e-wallet checkout platform provided by the EWCP, e.g., 406. The user may then initiate a checkout procedure at the merchant site, e.g., 407. For example, the user may click a "Buy" button on the merchant's website, take a picture of a barcode identifying the item while shopping in a store, and/or the like. The merchant may request payment for the item from the buyer at 410. For example, the merchant's website may provide a webpage that facilitates payment (e.g., by instructing the user's mobile device to launch an EWCP application upon recognizing an EWCP-supported protocol). In another example, an EWCP application (e.g., used by the user to take a picture of the barcode) may provide a payment page upon recognizing an EWCP-supported barcode.

In one embodiment, the EWCP may already be supported and trusted by the client. In another embodiment, EWCP support may be added to the client upon the user's authorization. A determination may be made at 415 whether the EWCP is supported by the user's client. For example, the merchant's payment request webpage may execute code that queries the client regarding EWCP support, and the code may be written in JavaScript substantially in the following form:

```
//The result of the IF statement indicates whether the
    device supports EWCP
if (navigator.mimeTypes && navigator.mimeTypes["application/EWCP"])
```

If the client does not support EWCP, the merchant's website may prompt the user to add EWCP support 420. For example, the merchant's website may present a webpage to the user. In various embodiments, the webpage may be a webpage with a link that the user may use to add EWCP support, a redirect to a webpage of the EWCP provider, a webpage with a Java applet that provides EWCP support, a Web 2.0 and/or Javascript widget loaded/embedded into the currently viewed webpage, and/or the like. In one embodiment, the user may add EWCP support by installing a browser extension, a plug-in, an add-on, an applet, and/or the like. Such an extension may be used to trigger, launch and instantiate an E-Wallet application. In another embodiment, the user may add EWCP support by installing a mobile EWCP application. Thus, regardless of the medium, location, and/or format the user may enjoy full access to the EWCP and/or E-Wallet.

A determination may be made at 425 whether the user added EWCP support. If the user does not add EWCP support 430, a non-EWCP payment scheme may be used by the merchant if available. If the user has and/or adds EWCP support, the merchant may obtain payment via EWCP at 435. For example, the user may provide payment information to the EWCP provider authorized by the merchant to collect payment. See FIG. 5 for additional details regarding obtaining payment via EWCP.

A determination may be made at 440 whether the payment was successful (e.g., whether the user's credit card was charged successfully). For example, such a determination may be based on a payment confirmation from the EWCP provider (e.g., transaction details may be verified and the TransactionStatus field of the PaymentConfirmation data structure may be examined to determine whether the value of the field is "OK"). If the payment was unsuccessful, the purchase may be denied at 445. For example, the user may be directed to a webpage that informs the user that the payment was unsuccessful and/or provides the user an opportunity to correct payment information and/or choose a different payment method. If the payment was successful, the purchase transaction may be completed at 450. For example, the user may be provided with a receipt and/or redirected to a merchant specified webpage. See FIG. 6 for additional details regarding completing the purchase transaction.

Figure 5:
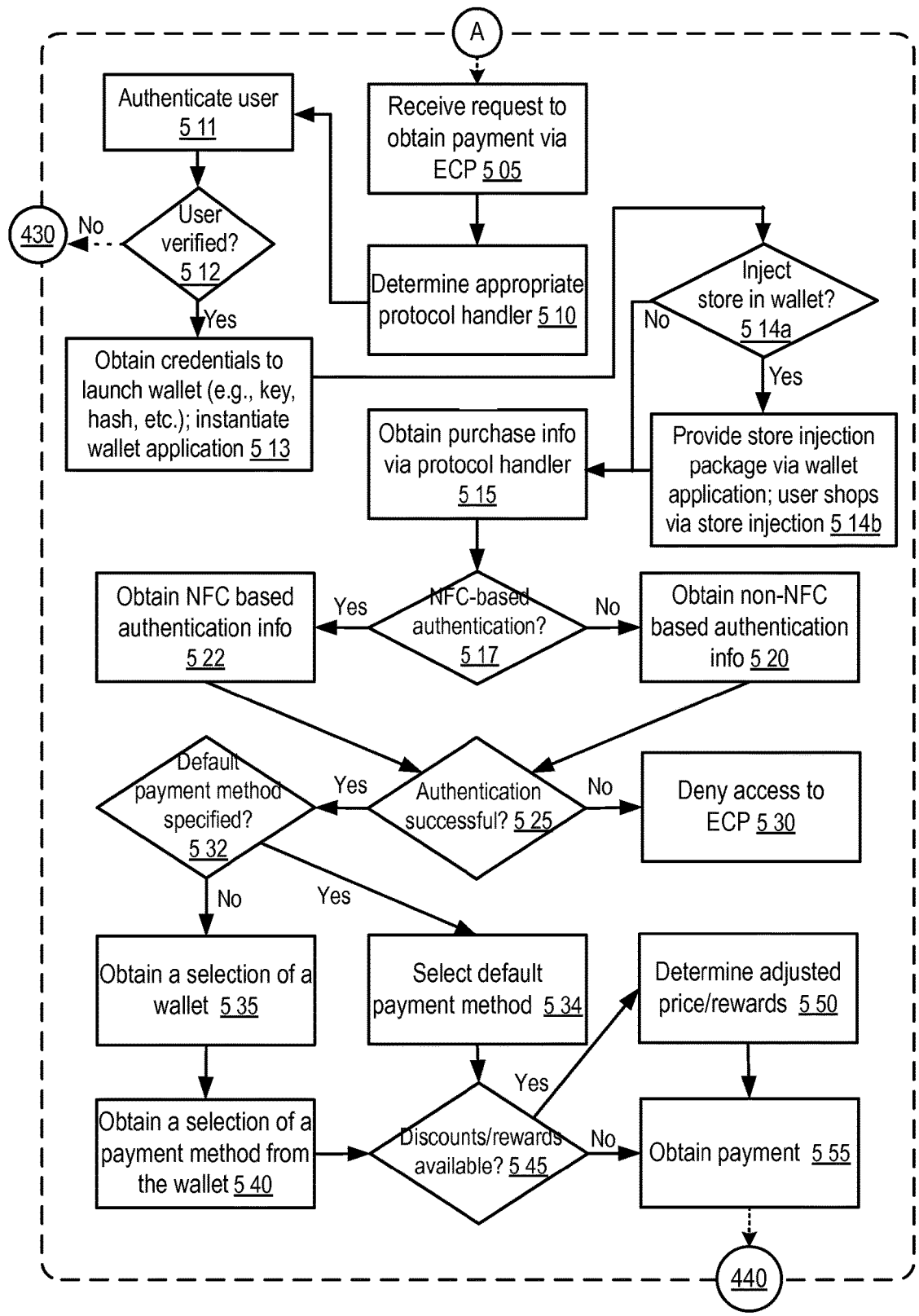
FIG. 5 shows a logic flow diagram of an E-Wallet Checkout Payment Acquisition (EWCPA) component in one embodiment of the EWCP.

FIG. 5 shows a logic flow diagram of an E-Wallet Checkout Payment Acquisition (EWCPA) component in one embodiment of the EWCP. In FIG. 5, a request to obtain payment via EWCP may be received at 505. For example, an EWCP browser extension may detect that a merchant's webpage is using an EWCP-supported protocol (e.g., by determining existence of a protocol string starting with "ewalletcheckout://", "specialcheckout://", "specialwallet://", and/or the like) to request payment from a user. The appropriate protocol handler may be determined at 510. Such a determination may be made by examining the protocol string. In some embodiments, the protocol handler may parsed from the request. For example, the EWCP may utilize various parsers to parse the protocol handler from the request, including those discussed below in the description with reference to FIG. 20. The EWCP may look for string matches (e.g., using the Perl m//operator) to identify the protocol handlers from the parsed request. In one embodiment, different protocol handlers may be available for different customer types. For example, "ewalletcheckout://" may be handled by a protocol handler available to consumers, while "specialcheckout://" may be handled by a protocol handler available to selected corporate customers. In another embodiment, different protocol handlers may be available for different device types, operating systems, configurations, and/or the like. For example, "ewalletcheckout://" may be handled by a mobile EWCP application, while "specialcheckout://" may be handled by a desktop EWCP application. In some embodiments, the client may support a plurality of protocol handlers, and the protocol handler that is used may be determined based on a ranking of the protocol handlers. In one implementation, this ranking may be based on a configuration file (e.g., which lists the protocol handlers in order of preference) stored on the client, and the client may choose the appropriate protocol handler. In another implementation, the merchant's website may detect (e.g., via Javascript) that the client supports multiple protocol handlers and provide a protocol string based on a ranking specified by the merchant. If a supported protocol handler is found, and the protocol handler is one that is handled by an EWCP application, the client may utilize the protocol handler to instantiate a EWCP application (e.g., an e-wallet application) and pass any parameters to it. For example, the client may first authenticate the user, e.g., 511. For example, the client may challenge the user in a variety of ways. As non-limiting illustrative example, the user may be required to enter login information, answer a challenge question, submit a voice/biometric signature, provide a digital certificate, enter into a video call for verification purposes, and/or the like. If the user is not verified, e.g., 512, option "No," the client may use an alternative payment scheme if available (see FIG. 4, 440). If the user is verified, e.g., 512, option "Yes," the client may obtain security credentials (e.g., a hash code, a secure key, etc.), for example, retrieved from the client's memory, to launch the wallet application, and may instantiate the wallet application, e.g., 513.

In some embodiments, the client may determine whether a store injection package is available to inject into the wallet application, e.g., 514a. For example, the merchant and/or e-wallet checkout platform provider may have provided a store injection package to the client, via which the user may engage in additional shopping actions. The determination of whether a store injection package is available to injection into the wallet application may include a determination of whether the user is authenticated or authorized to receive store injection features via the wallet application. If the client determines that a store injection package is available and should be injected into the wallet application, e.g., 514a, option "Yes," the client may provide the store injection package to the wallet application executing on the client, and the user may engage in shopping actions via the store injected into the wallet application, e.g., 514b (for example, see FIGS. 14H-K). For example, items selected by the user while shopping via the store injection into the wallet application may be added on the items selected by the user during the web-browser-based shopping session with the merchant.

Purchase information may be obtained via the protocol handler at 515. Such information may include the unique ID of the merchant that should receive payment, the unique ID and/or description of the item being purchased, the quantity being purchased, the purchase price, and/or the like. For example, the purchase information may be obtained by parsing (e.g., using the Perl m//operator) the protocol string that may be substantially in the following form:

ewalletcheckout://<globallyUniqueId>/<productId>/
   <productDetail>

The purchase information may be provided to the EWCP provider via the protocol handler to facilitate a purchase transaction. It is to be understaood that numerous languages, forms, implementations, and expressions are contemplated (e.g., JavaScript™, Adobe® Flash, HTML5, downloadable compiled plug-ins, etc.); however, in one non-limiting example implementation, a Java program substantially in the following form may be used to externalize the checkout and/or payment flow:

```
import android.app.Activity;
import android.content.Intent;
import android.os.Bundle;
import android.webkit.WebView;
import android.webkit.WebViewClient;
/**
 * An example implementation of approach to externalize the checkout or payment
 * flow from the web based, merchant site driven checkout and
 * payment flow.
 */
public class Example extends Activity {
    //this is the payment protocol that we intercept i.e. ewalletcheckout://
    //Although, what is shown here is a single protocol, this could be a
    //plurality of protocols.
    //ex: ewalletcheckout://, specialcheckout://, specialwallet:// etc.
    private static final String EWALLET_CHECKOUT = "ewalletcheckout://A?";
    /**
     * May be called when the activity is first created.
     * One approach may be as follows:
     * 1.    Use the web view (browser) of the OS (android in this
     *       example)
     * 2.    Create an intercept mechanism where we get to handle the request for
     *       a resource
```

```
 * 3.     When we detect that the protocol is one of the ones we can handle,
 *        launch the wallet. In the case shown below, we launch our wallet in
 *        response to ewalletcheckout://
 * 4.     In addition to the protocol, the specified URI may contain items of
 *        interest (e.g., regarding a transaction), for example:
 *        a. Globally unique identification of the merchant making the sale.
 *        b. Identification of the product being sold
 *        ex: ewalletcheckout://<globallyUniqueId>/<productId>/<productDetail>
 * 5.     When intercepted, the requested URI may be handled to send the
 *        payment request to an entry point that may handle the payment or
 *        switch it out based on the Globally unique ID of the merchant, to
 *        the processing gateway.
 */
@Override
public void onCreate(Bundle savedInstanceState) {
    super.onCreate(savedInstanceState);
    //create the view where we can display the browser.
    WebView wv = new WebView(this);
    wv.getSettings( ).setJavaScriptEnabled(true);
    //create the OS specific browser.
    wv.setWebViewClient(
        //create the intercept mechanism.
        new WebViewClient( ){
            //this may be called when we request a URI.
            @Override
            public void onLoadResource(WebView view, String url) {
                if(url.startsWith(EWALLET_CHECKOUT))
                {
                    //stop the browser from continuing with the request
                    view.stopLoading( );
                    //start handling the URI
                    String modUrl = url.replace(EWALLET_CHECKOUT, "");
                    //Launch the handler. In this case this is the
                    //wallet. Although the decision may be made here
                    //to launch the specific handler in one
                    //implementation, this may be abstracted
                    //out further in other
                    //implementations to make the handler
                    //registration and invocation more dynamic
                    //and update friendly and to handle more protocols.
                    Intent intent = new Intent(
                        Example.this,Payment.class);
                    //pass the URI to the handler,
                    intent.putExtra("mydata",modUrl);
                    //start the handler.
                    startActivity(intent);
                    //In some implementations, we may block here so
                    //that we can deal with the return
                    //from the handler. This may be a receipt
                    //(text, bar code, and/or the like)
                    //that may be displayed and/or analyzed.
                }
            }
        });
    //set the view for display.
    setContentView(wv);
    //first invocation to load the site.
    wv.loadData("<a href='http://.../android/first.html?"+
        System.currentTimeMillis( )
        +"'>Use Shop Keeper.</a>","text/html","utf-8");
}
}
```

The user's authentication information (e.g., login information for the EWCP) may be obtained. For example, the protocol handler may request authentication information to determine whether to allow the user access to the E-Wallet. A determination may be made at 517 regarding whether the authentication is Near Field Communication (NFC) based. For example, if the user taps the client with an NFC capable credit card, the authentication may be NFC based, otherwise, if the user enters a password, the authentication may be non-NFC based. If the authentication is non-NFC based, the user's non-NFC based authentication information may be obtained at 520. For example, a password associated with the E-Wallet entered by the user may be obtained. If the authentication is NFC based, the user's NFC based authentication information may be obtained at 522. For example, if the user tapped the client with an NFC capable credit card and provided a pin associated with that credit card (e.g., a pin that decrypts a certificate associated with the client that decrypts data from a tag associated with the credit card), information transmitted via NFC and the pin may be obtained. In one implementation, a program substantially in the following form may be used to facilitate NFC based authentication:

```
#############START ISSUER #############
//at the issuer side before providing the tag
Tag newTag;
String cardTrack1="<track1>";
String cardTrack2="<track2>";
String pin=generateRandomNCharPin( )
cardTrack1=encrypt(pin//key used to encrypt
    ,cardTrack1);
cardTrack2=encrypt(pin//key used to encrypt
    ,cardTrack2);
//form the data to be pushed on to the tag and write it
String finalData=cardTrack1+MARKER+cardTrack2;
newTag.write(finalData);
//issuer may then provide the PIN via an electronic PIN
    retrieval system, via mail, and/or
the like to the user
#############END ISSUER #############
#############START CARD USER #############
//Gets the tag and PIN and uses the wallet/application
//to activate the tag for the card (e.g., by re-encrypting the
    tag using a
//client certificate encrypted by a PIN.
Tag recdTag;
String tagData=recdTag.read( )
//get the (temporary) PIN provided to the user.
String mailedPin=promptUserForPIN( )
//split the data based on the marker
Byte[ ] cardTrack1; //obtained from tagData above
Byte[ ] cardTrack2; //obtained from tagData above
//decrypt the data using the temporary PIN
cardTrack1=decrypt(mailedPin, cardTrack1);
cardTrack2=decrypt(mailedPin, cardTrack2);
//get the PIN for device use.
String pin=promptUserForPIN( )
//decrypt the certificate to use.
Certificate cert=getDecryptedCert(pin);
//encrypt the data using the public key.
cardTrack1=cert.encryptWithPublicKey(
    cardTrack1);
cardTrack2=cert.encryptWithPublicKey(
    cardTrack2);
//form the data to be pushed on to the
//tag and write it.
Byte [ ] finalData=
    cardTrack1
    +MARKER
    +cardTrack2;
//push the data on to the tag.
recdTag.write(finalData);
//stick the tag on the card.
#############END CARD USER #############
```

A determination may be made at 525 whether the authentication information provided by the user is valid. If the user does not provide valid authentication information, access to the EWCP may be denied at 530. For example, the user may be informed that login information was incorrect, and/or may be provided opportunity to re-enter correct login information. If the user provides valid authentication information, access to the EWCP may be granted. The authentication information may be provided to the EWCP provider via the protocol handler to facilitate the purchase transaction. For example, the login information provided by the user may be sent via SSL to an authentication server of the EWCP provider, which may verify the information.

A determination may be made at 532 whether a default payment method has been specified by the user. For example, the user may have selected a Visa credit card as the default payment method, for all client devices, for this client, and/or the like. In one implementation, this determination may be made by examining a default payment method field of a User Accounts table and/or Client Accounts table via a SQL statement substantially in the following form:

```
SELECT DefaultPaymentMethod
FROM UserAccounts
WHERE UserAccounts.CustomerID='Customer's ID'
    AND
    ClientAccounts.ClientID='Client device ID'
```

In another implementation, this determination may be by examining a default payment method setting stored on the client device (e.g., in a settings file of the E-Wallet). In yet another embodiment, if the user uses an NFC capable credit card to authenticate, that credit card may be used as the default payment method.

If the default payment method is specified, the EWCP may select the default payment method at 534. Otherwise, a selection of a wallet may be obtained at 535. For example, the user may be prompted to select an available wallet via the E-Wallet. In one embodiment, the user may select a wallet stored on the user's client (e.g., stored on a secure micro SD card of a mobile device). In another embodiment, the user may select an online wallet (e.g., stored in a database of the EWCP provider). A selection of a payment method associated with the selected wallet may be obtained at 540. For example, the payment method may be a credit card, debit card, gift card, and/or the like.

A determination may be made at 545 whether any rewards, discounts, bonus items, and/or the like are associated with using the selected payment method. For example, a merchant may specify that using the merchant's gift card gives the customer 100 merchant reward points with every order. If there is a promotion associated with the selected payment method, adjusted price (e.g., discounted price), rewards points, and/or the like may be calculated in accordance with promotion rules.

The selected payment method may be used to obtain payment for the item being purchased at 555. In one embodiment, the user may not have to enter additional information to use the selected payment method. In another embodiment, the user may have to enter a payment method security code (e.g., a three digit security code on the back of a credit card) to use the selected payment method. The EWCP provider may obtain the selected payment method and verify that the user may pay for the item using the selected payment method. For example, the EWCP provider may verify the payment security code, that the amount does not exceed the user's credit card limit, that the transaction is not suspicious, and/or the like.

Figure 6:
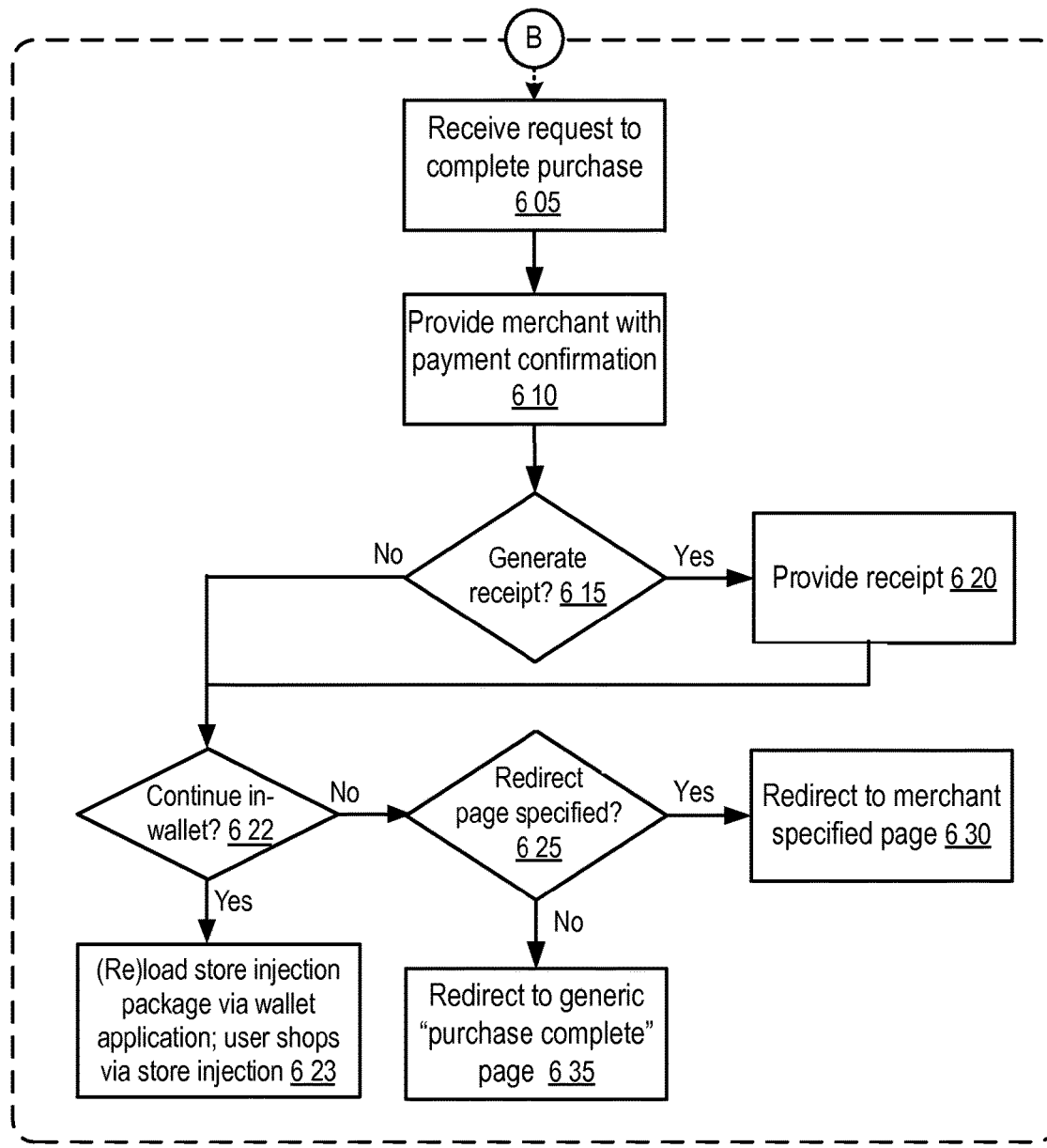
FIG. 6 shows a logic flow diagram of an E-Wallet Checkout Purchase Transaction (EWCPT) component in one embodiment of the EWCP.

FIG. 6 shows a logic flow diagram of an E-Wallet Checkout Purchase Transaction (EWCPT) component in one embodiment of the EWCP. In FIG. 6, a request to complete a purchase transaction may be received at 605. For example, such a request may be received upon verifying that a user successfully paid for an item (e.g., via a callback function). The EWCP provider may provide the merchant with a payment confirmation at 610. The payment confirmation may indicate that the user successfully paid for the item and may include a transaction ID, the transaction date and/or time, transaction status, a transaction authorization and/or verification code, details regarding the purchase, and/or the like. In one embodiment, the payment confirmation may be provided to the merchant upon verifying the payment method. For example, upon verifying that a user successfully paid for an item, the EWCP provider may send an email to the merchant that includes the payment confirmation. In another example, the EWCP provider may access the merchant's webpage with parameters that correspond to the data in the payment confirmation (e.g., http://www.merchant.com/payment_confirm.html?TransactionID=ID567T&AuthorizationCode=ANET10). In another embodiment, a plurality of payment confirmations may be provided to the merchant at specified times (e.g., daily, weekly, monthly, and/or the like). For example, the EWCP provider may store (e.g., in the Transactions table 2019*f*) payment confirmations for the merchant during a week via a SQL statement substantially in the following form:
  INSERT INTO ECP_Transactions (TransactionID, AuthorizationCode, Date)
  VALUES ('ID567T', 'ANET10', 'Date of the transaction')

The EWCP provider may retrieve this data from the database at the end of the week via a SQL statement substantially in the following form:
  SELECT TransactionID, AuthorizationCode
  FROM ECP_Transactions
  WHERE Date='Dates for the week' and provide the retrieved data to the merchant by sending an email, by accessing the merchant's webpage, and/or the like. In some embodiments, a history of purchase transactions may be stored (e.g., in the Transactions table 2019*f*) and/or made available to various applications (e.g., EWCP applications, third party applications, and/or the like). For example, an application may access the transaction history and analyze data (e.g., determine the amount spent per month and/or the types of products purchased by the user) for a variety of purposes (e.g., to determine which protocol handlers the user may be allowed to use).

A determination may be made at 615 whether a receipt should be generated. In one embodiment, the EWCP provider may generate the receipt and provide the receipt to the client (e.g., an image may be generated and sent to the client). In another embodiment, the client may obtain applicable information (e.g., transaction authorization code) and generate the receipt via the EWCP application. If the receipt is generated, the receipt may be provided to the user (e.g., via the EWCP application) at 620. A determination may be made at 622 whether to continue the user experience in-wallet (e.g., whether to continue the user's shopping experience in a store injected into the wallet), or to redirect the user back to an online website of the merchant that the user was shopping at via the user's web browser, e.g., 622. For example, the client may prompt the user to provide a one-time/default preference selection on whether to continue within the wallet application or redirect to the client's web browser. If the determination is made to continue in-wallet, the client may (re)load/refresh the store injection package via the wallet application, and the user may continue the in-wallet shopping experience, e.g., 623. A determination may be made at 625 whether a redirect page was specified by the merchant (e.g., by checking a "RedirectPage" field associated with the merchant's database record). For example, the merchant may wish to redirect the user to a "Thank you" webpage upon completion of the purchase transaction. If the merchant specifies a redirect page, the EWCP application may redirect the user's browser to the redirect page at 630. Otherwise, the user may be redirected to a redirect page specified by the EWCP provider 635 (e.g., a generic "Purchase Complete" webpage).

FIG. 7 shows a datagraph diagram illustrating example aspects of transforming a user checkout request input via a User Purchase Checkout ("UPC") component into a checkout data display. In some embodiments, a user, e.g., 701*a*, may desire to purchase a product, service, offering, and/or the like ("product"), from a merchant via a merchant online site or in the merchant's store. The user may communicate with a merchant/acquirer ("merchant") server, e.g., 703*a*, via a client such as, but not limited to: a personal computer, mobile device, television, point-of-sale terminal, kiosk, ATM, and/or the like (e.g., 702). For example, the user may provide user input, e.g., checkout input 711, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 712, and provide the checkout request, e.g., 713, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 712, substantially in the form of a HTTP(S) POST message including XML-formatted data, is provided below:
  POST/checkoutrequest.php HTTP/1.1
  Host: www.merchant.com
  Content-Type: Application/XML
  Content-Length: 667
  <?XML version="1.0" encoding="UTF-8"?>

```
<checkout_request>
    <session_ID>4NFU4RG94</session_ID>
    <!--optional parameters-->
    <timestamp>2011-02-22 15:22:41</timestamp>
    <user_ID>john.q.public@ gmail.com</user_ID>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345
            </device_ECID>
        <device_identifier>jqp_air</device_identifier>
        <device_UDID>21343e34-14f4-8jn4-7yfe-
            124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </device_fingerprint>
</checkout_request>
```

In some embodiments, the merchant server may obtain the checkout request from the client, and extract the checkout detail (e.g., XML data) from the checkout request. For example, the merchant server may utilize a parser such as the example parsers described below in the discussion with reference to FIG. 20. Based on parsing the checkout request 712, the merchant server may extract product data (e.g., product identifiers), as well as available PoS client data, from the checkout request. In some embodiments, using the product data, the merchant server may query, e.g., 714, a merchant/acquirer ("merchant") database, e.g., 703b, to obtain product data, e.g., 715, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 20, Products 20191) for product data. An example product data query 714, substantially in the form of PHP/SQL commands, is provided below:

```
<?PHP
header('Content-Type: text/plain');
mysql_connect("254.93.179.112",$DBserver,$password); //access database server
mysql_select_db("EWCP_DB.SQL"); //select database table to search
//create query
$query="SELECT product_title product_attributes_list product_price tax_info_list related_products_list offers_list discounts_list rewards_list merchants_list merchant_availability_list FROM ProductsTable WHERE product_ID LIKE '%' $prodID";
$result=mysql_query($query); //perform the search query
mysql_close("EWCP_DB.SQL"); //close database access
?>
```

In some embodiments, in response to obtaining the product data, the merchant server may generate, e.g., 716, checkout data to provide for the PoS client. In some embodiments, such checkout data, e.g., 717, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. For example, the checkout data may be a HTML webpage that includes a protocol string (e.g., a string starting with "ewalletcheckout://") to indicate that the merchant uses an EWCP-supported protocol, and may facilitate triggering the instantiation of an e-wallet checkout application. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 9-10. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 717, substantially in the form of XML-formatted data, is provided below:

```
<?XML version = "1.0" encoding = "UTF-8"?>
<checkout_data>
    <session_ID>4NFU4RG94</session_ID>
    <!--optional data-->
    <timestamp>2011-02-22 15:22:43</timestamp>
    <expiry_lapse>00:00:30</expiry_lapse>
    <total_cost>$121.49</total_cost>
    <alerts_URL>www.merchant.com/shopcarts.php?sessionID=4NFU4RG94</alerts_URL>
    <user_ID>john.q.public@gmail.com</user_ID>
    <user_device_fingerprint>
        <device_IP>192.168.23.126</device_IP>
        <device_MAC>0123.4567.89ab</device_MAC>
```

```xml
            <device_serial>312456768798765432</device_serial>
            <device_ECID>00000AEBCDF12345</device_ECID>
            <device_identifier>jqp_air</device_identifier>
            <device_UDID>21343e34-14f4-8jn4-7yfe-124578632134</device_UDID>
            <device_browser>firefox 2.2</device_browser>
            <device_type>smartphone</device_type>
            <device_model>HTC Hero</device_model>
            <OS>Android 2.2</OS>
            <wallet_app_installed_flag>true</wallet_app_installed_flag>
    </user_device_fingerprint>
    <purchase_detail>
        <cart>
            <product>
                <merchant_params>
                    <merchant_id>54TBRELF8</merchant_id>
                    <merchant_name>BARNES, Inc.</merchant_name>
                    <merchant_auth_key>TMN45GER98</merchant_auth_key>
                </merchant_params>
                <product_type>book</product_type>
                <product_params>
                    <product_title>XML for dummies</product_title>
                    <ISBN>938-2-14-168710-0</ISBN>
                    <edition>2nd ed.</edition>
                    <cover>hardbound</cover>
                </product_params>
                <quantity>2</quantity>
                <unit_cost>$14.46</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>Books, Inc.</merchant_name>
                    <merchant_auth_key>1N484MCP</merchant_auth_key>
                </merchant_params>
                <product_type>book</product_type>
                <product_params>
                    <product_title>Sophie's World</product_title>
                    <ISBN>955-2-14-112310-0</ISBN>
                    <edition>NULL</edition>
                    <cover>hardbound</cover>
                </product_params>
                <quantity>1</quantity>
                <unit_cost>$34.78</unit_cost>
                <coupon_id>null</coupon_id>
            <social_flag>OFF</social_flag>
            </product>
        </cart>
        <cart>
            <product>
                <merchant_params>
                    <merchant_id>RFH5IB4FT</merchant_id>
                    <merchant_name>Amzn, Inc.</merchant_name>
                    <merchant_auth_key>44543DSJFG</merchant_auth_key>
                </merchant_params>
                <product_type>book</product_type>
                <product_params>
                    <product_title>XML - a primer</product_title>
                    <ISBN>938-2-14-1436710-0</ISBN>
                    <edition>2nd ed.</edition>
                    <cover>hardbound</cover>
                </product_params>
                <quantity>1</quantity>
                <unit_cost>$12.93</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>BestBooks, Inc.</merchant_name>
                    <merchant_auth_key>1N484MCP</merchant_auth_key>
                </merchant_params>
                <product_type>book</product_type>
```

-continued

```
        <product_params>
            <product_title>Sophie's Choice</product_title>
            <ISBN>938-2-14-168710-0</ISBN>
            <edition>1st ed.</edition>
        </product_params>
        <quantity>1</quantity>
        <unit_cost>$44.86</unit_cost>
        <coupon_id>null</coupon_id>
      <social_flag>OFF</social_flag>
      </product>
    </cart>
  </purchase_detail>
<checkout_data>
```

Upon obtaining the checkout data, e.g., 717, the PoS client may render and display, e.g., 718, the checkout data for the user.

FIG. 8 shows a logic flow diagram illustrating example aspects of transforming a user checkout request input via a User Purchase Checkout ("UPC") component into a checkout data display. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 801, into the client indicating the user's desire to purchase the product. The client may generate a checkout request, e.g., 802, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 20. Based on parsing the checkout request, the merchant server may extract product data (e.g., product identifiers), as well as available PoS client data, from the checkout request. In some embodiments, using the product data, the merchant server may query, e.g., 803, a merchant/acquirer ("merchant") database to obtain product data, e.g., 804, such as product information, product pricing, sales tax, offers, discounts, rewards, and/or other information to process the purchase transaction and/or provide value-added services for the user. In some embodiments, in response to obtaining the product data, the merchant server may generate, e.g., 805, checkout data to provide, e.g., 806, for the PoS client. For example, the checkout data may be a HTML webpage that includes a protocol string (e.g., a string starting with "ewalletcheckout://") to indicate that the merchant uses an EWCP-supported protocol, and may facilitate triggering the instantiation of an e-wallet checkout application Upon obtaining the checkout data, the PoS client may render and display, e.g., 807, the checkout data for the user.

Figure 9A:
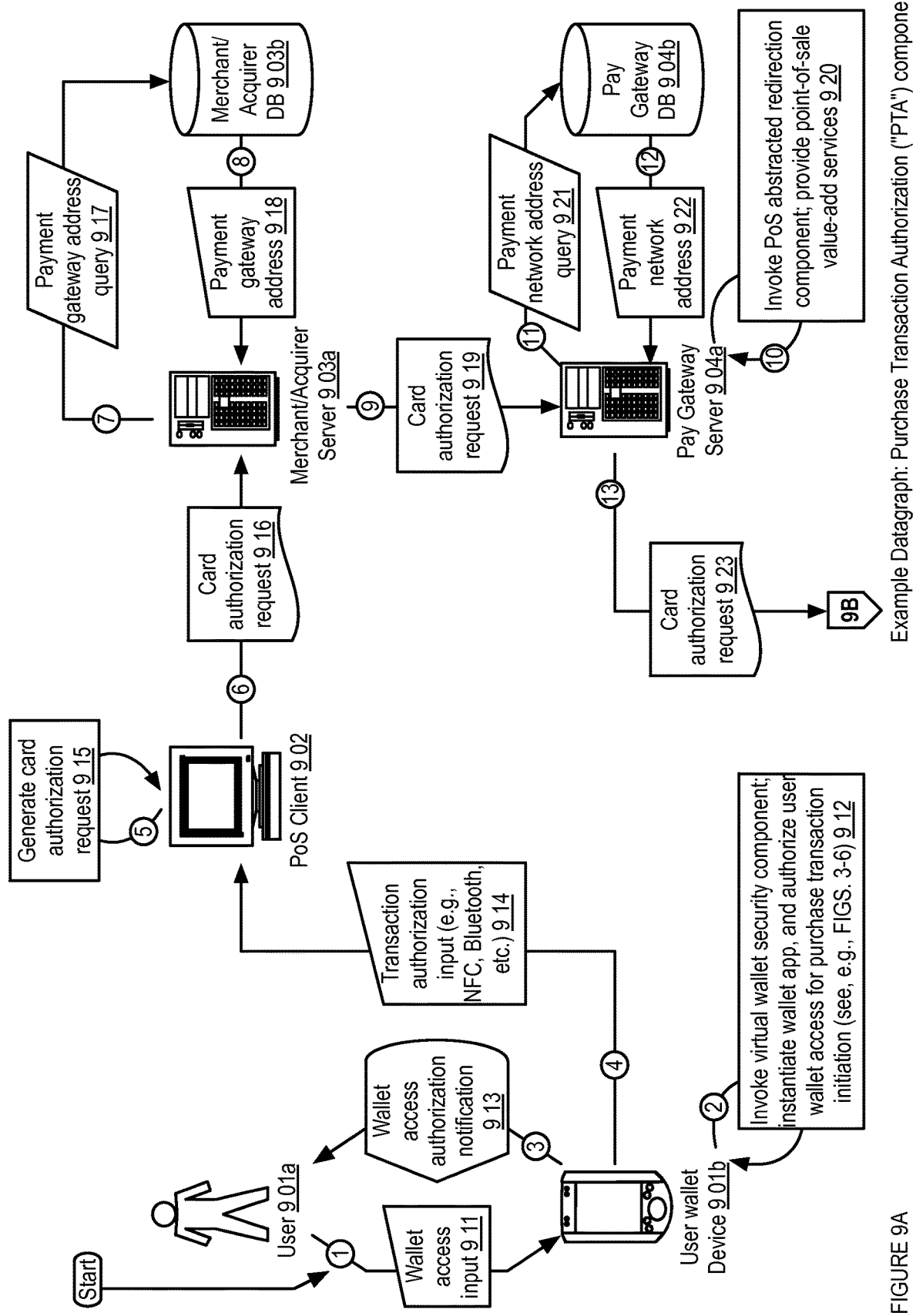
FIGS. 9A-B show datagraph diagrams illustrating example aspects of transforming a user virtual wallet access input via a Purchase Transaction Authorization ("PTA") component into a purchase transaction receipt notification.
Figure 9B:
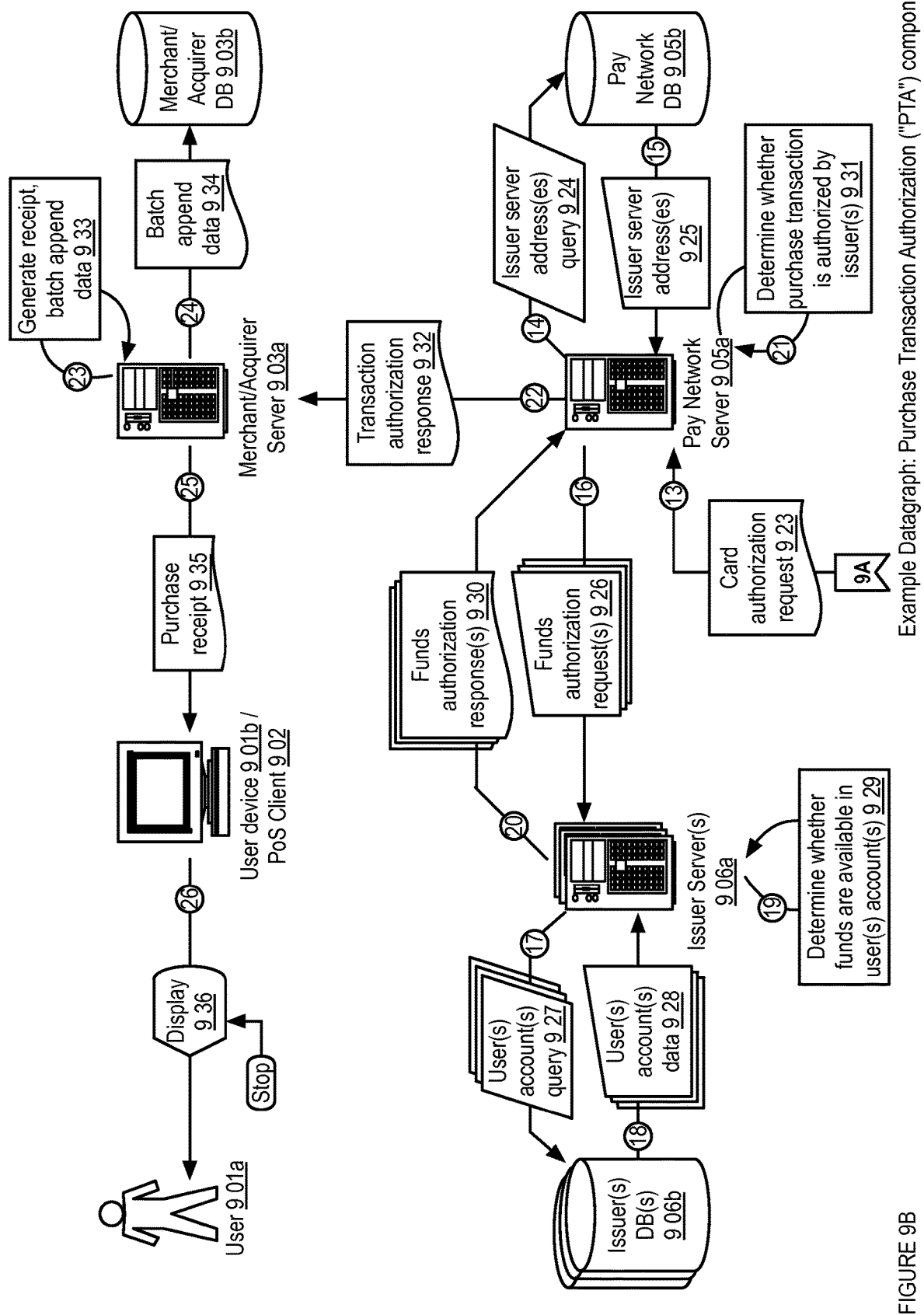

FIGS. 9A-B show datagraph diagrams illustrating example aspects of transforming a user virtual wallet access input via a Purchase Transaction Authorization ("PTA") component into a purchase transaction receipt notification. With reference to FIG. 9A, in some embodiments, a user, e.g., 901*a*, may wish to utilize a virtual wallet account to purchase a product, service, offering, and/or the like ("product"), from a merchant via a merchant online site or in the merchant's store. The user may utilize a physical card, or a user wallet device, e.g., 901*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 911 into the user wallet device. In various embodiments, the user input may include, but not be limited to: a single tap (e.g., a one-tap mobile app purchasing embodiment) of a touch-screen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, instantiate a wallet application (see, e.g., FIGS. 13-19B) upon authenticating the user, and provide virtual wallet features for the user via the wallet application. For example, the user wallet device may utilize the components described above in the description with respect to FIGS. 3-6 to provide e-wallet checkout services for the user via the wallet application.

In some embodiments, upon authenticating the user for access to virtual wallet features, the user wallet device may provide a transaction authorization input, e.g., 914, to a point-of-sale ("PoS") client, e.g., 902. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 914, track 1 data from the user's plastic card (e.g., credit card, debit card, prepaid card, charge card, etc.), such as the example track 1 data provided below:

%      B123456789012345^PUBLIC/
  J.Q.^99011200000000000000901****?*

(wherein '123456789012345' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 914, substantially in the form of XML-formatted data, is provided below:

```
<?XML version="1.0" encoding="UTF-8"?>
<transaction_authorization_input>
    <payment_data>
        <account>
            <charge_priority>1</charge_priority>
            <charge_ratio>40%</charge_ratio>
            <account_type>debit</account_type>
            <value_exchange_symbol>USD</value_exchange_symbol>
            <account_number>123456789012345</account_number>
            <account_name>John Q. Public</account_name>
            <bill_add>987 Green St #456, Chicago, IL 94652</bill_add>
            <ship_add>987 Green St #456, Chicago, IL 94652</ship_add>
            <CVV_type>dynamic<CVV_type>
            <CVV>http://www.paynet.com/dcvv.php?sessionID=4NFU4RG94</CVV>
            <cloak_flag>ON</cloak_flag>
            <alert_rules>tar1 tar4 tar12</alert_rules>
            <mode>NFC</mode>
        </account>
        <account>
            <charge_priority>1</charge_priority>
            <charge_ratio>60%</charge_ratio>
            <account_type>rewards</account_type>
            <value_exchange_symbol>VME</value_exchange_symbol>
            <account_number>234567890123456</account_number>
            <account_name>John Q. Public</account_name>
            <bill_add>987 Green St #456, Chicago, IL 94652</bill_add>
            <ship_add>987 Green St #456, Chicago, IL 94652</ship_add>
            <CVV_type>static<CVV_type>
            <CVV>173</CVV>
            <cloak_flag>ON</cloak_flag>
            <alert_rules>tar1 tar4 tar12</alert_rules>
            <mode>Bluetooth</mode>
        </account>
        <account>
            <charge_priority>2</charge_priority>
            <charge_ratio>100%</charge_ratio>
            <account_number>345678901234567</account_number>
            <account_type>credit</account_type>
            <value_exchange_symbol>USD</value_exchange_symbol>
            <account_name>John Q. Public</account_name>
            <bill_add>987 Green St #456, Chicago, IL 94652</bill_add>
            <ship_add>987 Green St #456, Chicago, IL 94652</ship_add>
            <CVV_type>static<CVV_type>
            <CVV>173</CVV>
            <cloak_flag>ON</cloak_flag>
            <alert_rules>tar1 tar4 tar12</alert_rules>
            <mode>NFC</mode>
        </account>
    </payment_data>
    <!--optional data-->
    <timestamp>2011-02-22 15:22:43</timestamp>
    <expiry_lapse>00:00:30</expiry_lapse>
    <secure_key>0445329070598623487956543322</secure_key>
    <alerts_track_flag>TRUE</alerts_track_flag>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </device_fingerprint>
</transaction_authorization_input>
```

In some embodiments, the PoS client may generate a card authorization request, e.g., 915, using the obtained transaction authorization input from the user wallet device, and/or product/checkout data (see, e.g., FIG. 7, 715-717). An example listing of a card authorization request 915-916, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
    <session_ID>4NFU4RG94</order_ID>
    <!--optional data-->
    <timestamp>2011-02-22 15:22:43</timestamp>
    <expiry>00:00:30</expiry>
    <alerts_URL>www.merchant.com/shopcarts.php?sessionID=AEBB4356</alerts_URL>
    <user_ID>john.q.public@gmail.com</user_ID>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-124578632134</device_UDID>
        <device_browser>firefox 2.2</device_browser>
```

```xml
            <device_type>smartphone</device_type>
            <device_model>HTC Hero</device_model>
            <OS>Android 2.2</OS>
            <wallet_app_installed_flag>true</wallet_app_installed_flag>
    </device_fingerprint>
    <purchase_details>
        <total_cost>$121.49</total_cost>
        <cart>
            <product>
                <merchant_params>
                    <merchant_id>54TBRELF8</merchant_id>
                    <merchant_name>BARNES, Inc.</merchant_name>
                    <merchant_auth_key>TMN45GER98</merchant_auth_key>
                </merchant_params>
                <product_type>book</product_type>
                <product_params>
                    <product_title>XML for dummies</product_title>
                    <ISBN>938-2-14-168710-0</ISBN>
                    <edition>2nd ed.</edition>
                    <cover>hardbound</cover>
                </product_params>
                <quantity>2</quantity>
                <unit_cost>$14.46</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>Books, Inc.</merchant_name>
                    <merchant_auth_key>1N484MCP</merchant_auth_key>
                </merchant_params>
                <product_type>book</product_type>
                <product_params>
                    <product_title>Sophie's World</product_title>
                    <ISBN>955-2-14-112310-0</ISBN>
                    <edition>NULL</edition>
                    <cover>hardbound</cover>
                </product_params>
                <quantity>1</quantity>
                <unit_cost>$34.78</unit_cost>
                <coupon_id>null</coupon_id>
            <social_flag>OFF</social_flag>
            </product>
        </cart>
        <cart>
            <product>
                <merchant_params>
                    <merchant_id>RFH5IB4FT</merchant_id>
                    <merchant_name>Amzn, Inc.</merchant_name>
                    <merchant_auth_key>44543DSJFG</merchant_auth_key>
                </merchant_params>
                <product_type>book</product_type>
                <product_params>
                    <product_title>XML - a primer</product_title>
                    <ISBN>938-2-14-1436710-0</ISBN>
                    <edition>2nd ed.</edition>
                    <cover>hardbound</cover>
                </product_params>
                <quantity>1</quantity>
                <unit_cost>$12.93</unit_cost>
                <coupon_id>AY34567</coupon_id>
            <social_flag>ON</social_flag>
            <social_message>Look what I bought today!</social_message>
            <social_networks>facebook twitter</social_networks>
            </product>
            <product>
                <merchant_params>
                    <merchant_id>3FBCR4INC</merchant_id>
                    <merchant_name>BestBooks, Inc.</merchant_name>
                    <merchant_auth_key>1N484MCP</merchant_auth_key>
                </merchant_params>
                <product_type>book</product_type>
                <product_params>
                    <product_title>Sophie's Choice</product_title>
                    <ISBN>938-2-14-168710-0</ISBN>
                    <edition>1st ed.</edition>
```

```
            </product_params>
            <quantity>1</quantity>
            <unit_cost>$44.86</unit_cost>
            <coupon_id>null</coupon_id>
          <social_flag>OFF</social_flag>
        </product>
      </cart>
    </purchase_details>
    <account_params>
      <account>
        <charge_priority>1</charge_priority>
        <charge_ratio>40%</charge_ratio>
        <account_type>debit</account_type>
        <value_exchange_symbol>USD</value_exchange_symbol>
        <account_number>123456789012345</account_number>
        <account_name>John Q. Public</account_name>
        <bill_add>987 Green St #456, Chicago, IL 94652</bill_add>
        <ship_add>987 Green St #456, Chicago, IL 94652</ship_add>
        <CVV_type>dynamic<CVV_type>
        <CVV>http://www.paynet.com/dcvv.php?sessionID=4NFU4RG94</CVV>
        <cloak_flag>ON</cloak_flag>
        <alert_rules>tar1 tar4 tar12</alert_rules>
        <mode>NFC</mode>
      </account>
      <account>
        <charge_priority>1</charge_priority>
        <charge_ratio>60%</charge_ratio>
        <account_type>rewards</account_type>
        <value_exchange_symbol>VME</value_exchange_symbol>
        <account_number>234567890123456</account_number>
        <account_name>John Q. Public</account_name>
        <bill_add>987 Green St #456, Chicago, IL 94652</bill_add>
        <ship_add>987 Green St #456, Chicago, IL 94652</ship_add>
        <CVV_type>static<CVV_type>
        <CVV>173</CVV>
        <cloak_flag>ON</cloak_flag>
        <alert_rules>tar1 tar4 tar12</alert_rules>
        <mode>Bluetooth</mode>
      </account>
      <account>
        <charge_priority>2</charge_priority>
        <charge_ratio>100%</charge_ratio>
        <account_number>345678901234567</account_number>
        <account_type>credit</account_type>
        <value_exchange_symbol>USD</value_exchange_symbol>
        <account_name>John Q. Public</account_name>
        <bill_add>987 Green St #456, Chicago, IL 94652</bill_add>
        <ship_add>987 Green St #456, Chicago, IL 94652</ship_add>
        <CVV_type>static<CVV_type>
        <CVV>173</CVV>
        <cloak_flag>ON</cloak_flag>
        <alert_rules>tar1 tar4 tar12</alert_rules>
        <mode>NFC</mode>
      </account>
    </account_params>
    <shipping_info>
      <shipping_adress>#ref-ANON-123-45-678</shipping_address>
      <ship_type>expedited</ship_type>
      <ship_carrier>FedEx</ship_carrier>
      <ship_account>ANON-123-45-678</ship_account>
      <tracking_flag>true</tracking_flag>
      <sign_flag>false</sign_flag>
    </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 916. The merchant server may forward the card authorization request to a pay gateway server, e.g., 904a, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 903b, for a network address of the payment gateway server, for example by using a portion of a user payment card number, or a user ID (such as an email address) as a keyword for the database query. For example, the merchant server may issue PHP/SQL commands to query a database table (such as FIG. 20, Pay Gateways 2019h) for a URL of the pay gateway server. An example payment gateway address query 917, substantially in the form of PHP/SQL commands, is provided below:

```
<?PHP
header('Content-Type: text/plain');
mysql_connect("254.93.179.112",$DBserver,$password); //access database server
mysql_select_db("EWCP_DB.SQL"); //select database table to search
//create query
$query="SELECT paygate_id paygate_address paygate_URL paygate_name FROM PayGatewayTable WHERE card_num LIKE '%' $cardnum";
$result=mysql_query($query); //perform the search query
mysql_close("EWCP_DB.SQL"); //close database access
?>
```

In response, the merchant/acquirer database may provide the requested payment gateway address, e.g., 918. The merchant server may forward the card authorization request to the pay gateway server using the provided address, e.g., 919. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. The pay gateway server may forward the card authorization request to a pay network server, e.g., 905a, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 904b, for a network address of the payment network server, for example by using a portion of a user payment card number, or a user ID (such as an email address) as a keyword for the database query. For example, the pay gateway server may issue PHP/SQL commands to query a database table (such as FIG. 20, Pay Gateways 2019h) for a URL of the pay network server. An example payment network address query 921, substantially in the form of PHP/SQL commands, is provided below:

```
<?PHP
header('Content-Type: text/plain');
mysql_connect("254.93.179.112",$DBserver,$password); //access database server
mysql_select_db("EWCP_DB.SQL"); //select database table to search
//create query
$query="SELECT payNET_id payNET_address payNET_URL payNET_name FROM PayGatewayTable WHERE card_num LIKE '%' $cardnum";
$result=mysql_query($query); //perform the search query
mysql_close("EWCP_DB.SQL"); //close database access
?>
```

In response, the payment gateway database may provide the requested payment network address, e.g., 922. The pay gateway server may forward the card authorization request to the pay network server using the provided address, e.g., 923.

With reference to FIG. 9B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

Figure 20:
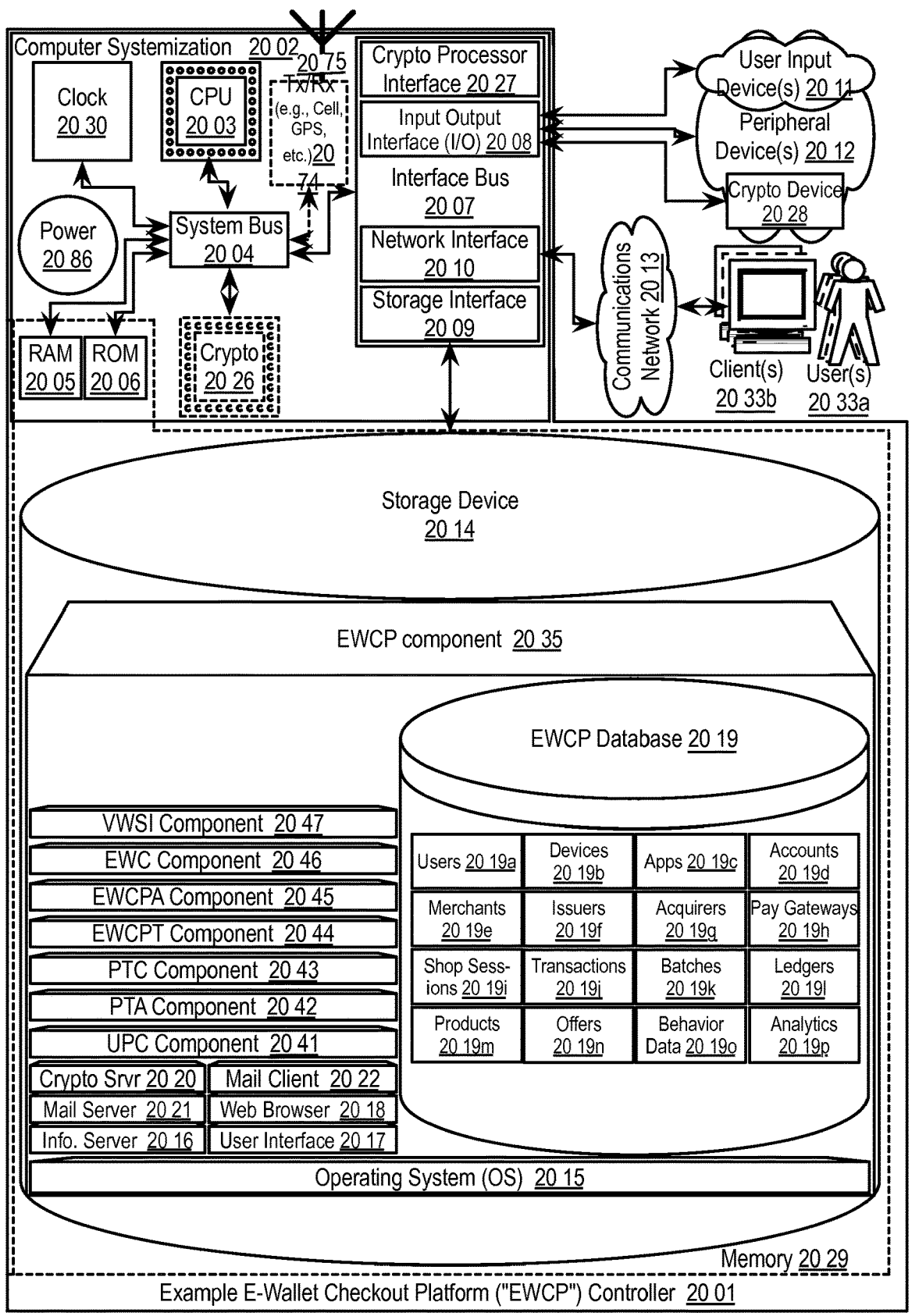
FIG. 20 shows a block diagram illustrating example aspects of a EWCP controller.

In some embodiments, the pay network server may generate a query, e.g., 924, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 906a, of the issuer(s) may maintain details of the user's account(s). In some embodiments, a database, e.g., pay network database 905b, may store details of the issuer server(s) associated with the issuer(s). In some embodiments, the pay network server may query a database, e.g., pay network database 905b, for a network address of the issuer(s) server(s), for example by using a portion of a user payment card number, or a user ID (such as an email address) as a keyword for the database query. For example, the merchant server may issue PHP/SQL commands to query a database table (such as FIG. 20, Issuers 20190 for network address(es) of the issuer(s) server(s). An example issuer server address(es) query 924, substantially in the form of PHP/SQL commands, is provided below:

```
<?PHP
header('Content-Type: text/plain');
mysql_connect("254.93.179.112",$DBserver,$password); //access database server
mysql_select_db("EWCP_DB.SQL"); //select database table to search
//create query
$query="SELECT issuer_id issuer_address issuer_URL issuer_name FROM IssuersTable WHERE card_num LIKE '%' $cardnum";
$result=mysql_query($query); //perform the search query
mysql_close("EWCP_DB.SQL"); //close database access
?>
```

In response to obtaining the issuer server query, e.g., 924, the pay network database may provide, e.g., 925, the requested issuer server data to the pay network server. In some embodiments, the pay network server may utilize the issuer server data to generate funds authorization request(s), e.g., 926, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 926, substantially in the form of a HTTP(S) POST message including XML-formatted data, is provided below:

```
POST/fundsauthorizationrequest.php HTTP/1.1
Host: www.issuer.com
Content-Type: Application/XML
Content-Length: 624
<?XML version="1.0" encoding="UTF-8"?>
<funds_authorization_request>
    <request_ID>VNEI39FK</request_ID>
    <timestamp>2011-02-22 15:22:44</timestamp>
    <debit_amount>$72.89</debit_amount>
    <account_params>
        <account>
            <account_type>debit</account_type>
            <value_exchange_symbol>USD</value_ex-
                change_symbol>
            <account_number>123456789012345
                </account_number>
            <account_name>John Q. Public</account_name>
            <bill_add>987 Green St #456, Chicago, IL
                94652</bill_add>
            <ship_add>987 Green St #456, Chicago, IL
                94652</ship_add>
            <CVV>1234</CVV>
        </account>
    </account_params>
    <!--optional parameters-->
    <user_device_fingerprint>
        <device_IP>192.168.23.126</device_IP>
        <device_MAC>0123.4567.89ab</device_MAC>
        <device_serial>312456768798765432</device_se-
            rial>
        <device_ECID>00000AEBCDF12345
            </device_ECID>
        <device_identifier>jqp_air</device_identifier>
        <device_UDID>21343e34-14f4-8jn4-7yfe-
            124578632134</device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_in-
            stalled_flag>
    </user_device_fingerprint>
</funds_authorization_request>
```

In some embodiments, an issuer server may parse the authorization request(s), and based on the request details may query a database, e.g., user profile database 906b, for data associated with an account linked to the user. For example, the merchant server may issue PHP/SQL commands to query a database table (such as FIG. 20, Accounts 2019d) for user account(s) data. An example user account(s) query 927, substantially in the form of PHP/SQL commands, is provided below:

```
<?PHP
header('Content-Type: text/plain');
mysql_connect("254.93.179.112",$DBserver,$pass-
    word); //access database server
mysql_select_db("EWCP_DB.SQL"); //select database
    table to search
//create query
$query="SELECT issuer user_id user_name user_bal-
    ance account_type FROM AccountsTable WHERE
    account_num LIKE '%' $accountnum";
$result=mysql_query($query); //perform the search
    query
mysql_close("EWCP_DB.SQL"); //close database
    access
?>
```

In some embodiments, on obtaining the user account(s) data, e.g., 928, the issuer server may determine whether the user can pay for the transaction using funds available in the account, 929. For example, the issuer server may determine whether the user has a sufficient balance remaining in the account, sufficient credit associated with the account, and/or the like. Based on the determination, the issuer server(s) may provide a funds authorization response, e.g., 930, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 931, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 20, Transactions 2019i). An example transaction store command, substantially in the form of PHP/SQL commands, is provided below:

```
<?PHP
header('Content-Type: text/plain');
mysql_connect("254.92.185.103",$DBserver,$pass-
    word); //access database server
mysql_select("EWCP_DB.SQL"); //select database to
    append
mysql_query("INSERT INTO TransactionsTable (Pur-
    chasesTable (timestamp, purchase_summary_list,
    num_products, product_summary, product_quantity,
    transaction_cost, account_params_list, account_name,
    account_type, account_num, billing_addres, zipcode,
    phone, sign, merchant_params_list, merchant_id, mer-
    chant_name, merchant_auth_key)
```

VALUES (time( ) $purchase_summary_list, $num_products, $product_summary, $product_quantity, $transaction_cost, $account_params_list, $account_name, $account_type, $account_num, $billing_addres, $zipcode, $phone, $sign, $merchant_params_list, $merchant_id, $merchant_name, $merchant_auth_key"); //add data to table in database
mysq1_close("EWCP_DB.SQL"); //close connection to database
?>

In some embodiments, the pay network server may forward a transaction authorization response, e.g., 932, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 933, and store the XML data file, e.g., 934, in a database, e.g., merchant database 404. For example, a batch XML data file may be structured similar to the example XML data structure template provided below:

```
<?XML version="1.0" encoding="UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</merchant_auth_key>
    <account_number>123456789</account_number>
</merchant_data>
<transaction_data>
    <transaction 1>
    </transaction 1>
    <transaction 2>
    </transaction 2>
    <transaction n>
    </transaction n>
</transaction_data>
```

In some embodiments, the server may also generate a purchase receipt, e.g., 933, and provide the purchase receipt to the client, e.g., 935. The client may render and display, e.g., 936, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 10A:
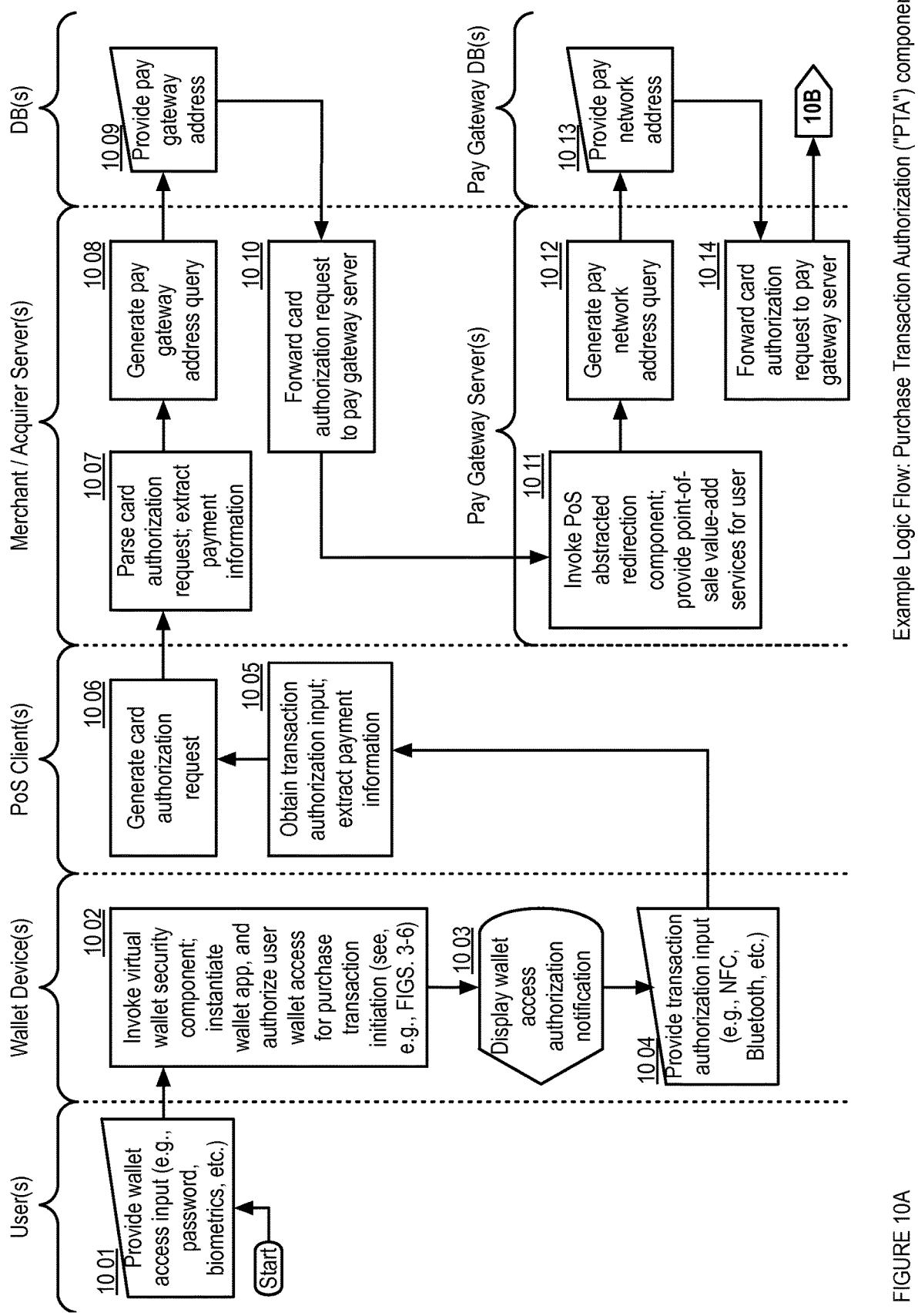
FIGS. 10A-B show logic flow diagrams illustrating example aspects of transforming a user virtual wallet access input via a Purchase Transaction Authorization ("PTA") component into a purchase transaction receipt notification.
Figure 10B:
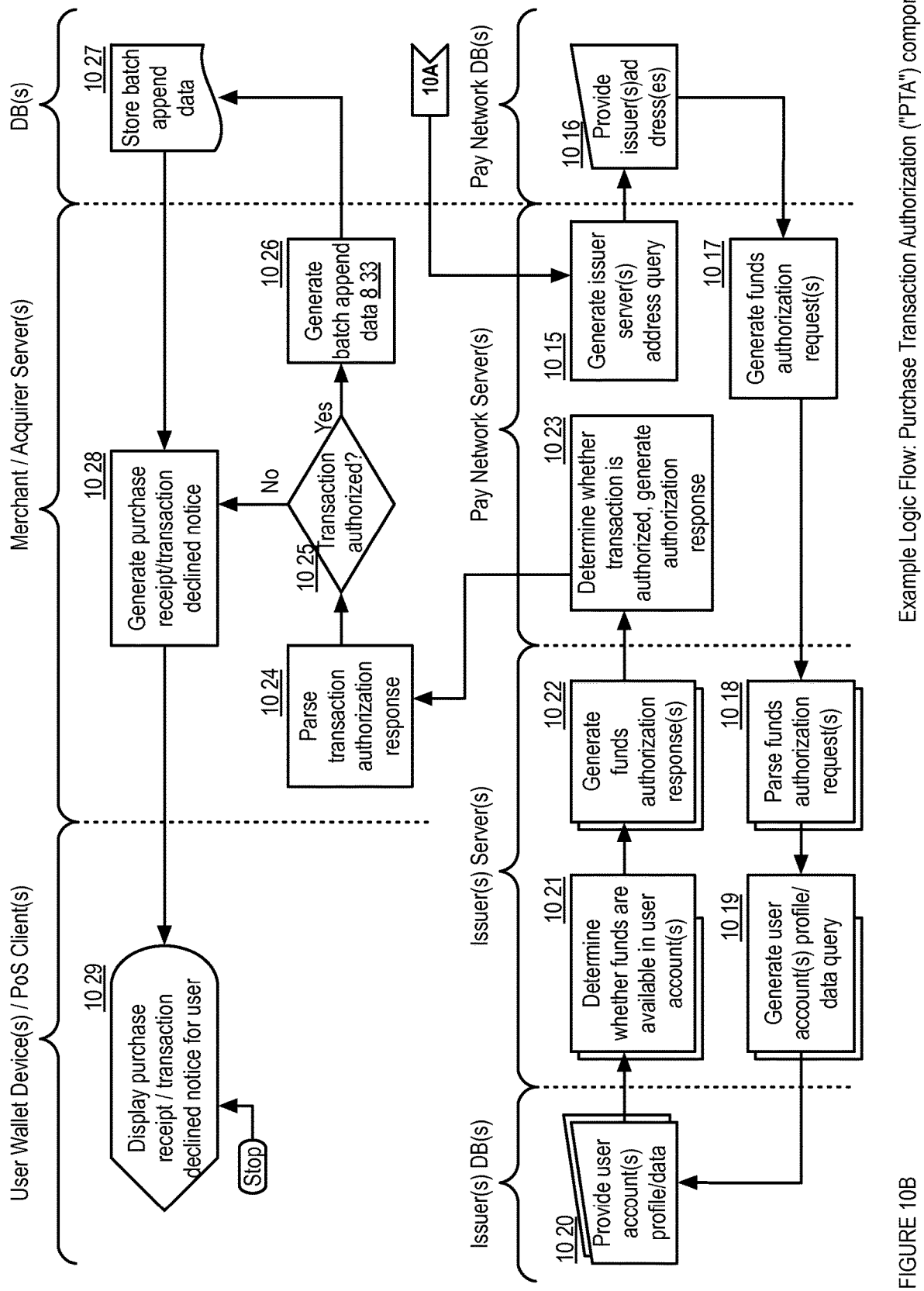

FIGS. 10A-B show logic flow diagrams illustrating example aspects of transforming a user virtual wallet access input via a Purchase Transaction Authorization ("PTA") component into a purchase transaction receipt notification. With reference to FIG. 10A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 1001, into the user wallet device. In various embodiments, the user input may include, but not be limited to: a single tap (e.g., a one-tap mobile app purchasing embodiment) of a touchscreen interface, keyboard entry, card swipe, activating a RFID/NFC equipped hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, instantiate a wallet application (see, e.g., FIGS. 13-19B) upon authenticating the user, and provide virtual wallet features for the user via the wallet application, e.g., 1002-1003.

In some embodiments, upon authenticating the user for access to virtual wallet features, the user wallet device may provide a transaction authorization input, e.g., 1004, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 1005. For example, the PoS client may utilize a parser, such as the example parsers provided below in the discussion with reference to FIG. 20. The PoS client may generate a card authorization request, e.g., 1006, using the obtained transaction authorization input from the user wallet device, and/or product/checkout data (see, e.g., FIG. 7, 715-717).

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 1008, for a network address of the payment gateway server, for example by using a portion of a user payment card number, or a user ID (such as an email address) as a keyword for the database query. In response, the merchant/acquirer database may provide the requested payment gateway address, e.g., 1010. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 1011. For example, the pay gateway server may invoke components for fraud prevention (see e.g., VerifyChat, FIG. 3E), loyalty and/or rewards, and/or other services for which the user-merchant combination is authorized.

The pay gateway server may forward the card authorization request to a pay network server for payment processing, e.g., 1014. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 1012, for a network address of the payment network server, for example by using a portion of a user payment card number, or a user ID (such as an email address) as a keyword for the database query. In response, the payment gateway database may provide the requested payment network address, e.g., 1013. The pay gateway server may forward the card authorization request to the pay network server using the provided address, e.g., 1014.

With reference to FIG. 10B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 1015, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 1015, for a network address of the issuer(s) server(s), for example by using a portion of a user payment card number, or a user ID (such as an email address) as a keyword for the database query.

In response to obtaining the issuer server query, the pay network database may provide, e.g., 1016, the requested issuer server data to the pay network server. In some embodiments, the pay network server may utilize the issuer server data to generate funds authorization request(s), e.g., 1017, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 1018, and based on the request details may query a database, e.g., 1019, for data associated with an account linked to the user.

In some embodiments, on obtaining the user account(s) data, e.g., 1020, the issuer server may determine whether the user can pay for the transaction using funds available in the account, e.g., 1021. For example, the issuer server may determine whether the user has a sufficient balance remaining in the account, sufficient credit associated with the account, and/or the like. Based on the determination, the issuer server(s) may provide a funds authorization response, e.g., 1022, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 1023, the pay network server may invoke a component to provide value-add services for the user, e.g., 1023.

In some embodiments, the pay network server may forward a transaction authorization response to the user wallet device, PoS client, and/or merchant server. The merchant may parse, e.g., 1024, the transaction authorization response, and determine from it that the user possesses sufficient funds in the card account to conduct the transaction, e.g., 1025, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1026, and store the XML data file, e.g., 1027, in a database. In some embodiments, the server may also generate a purchase receipt, e.g., 1028, and provide the purchase receipt to the client. The client may render and display, e.g., 1029, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 11B:
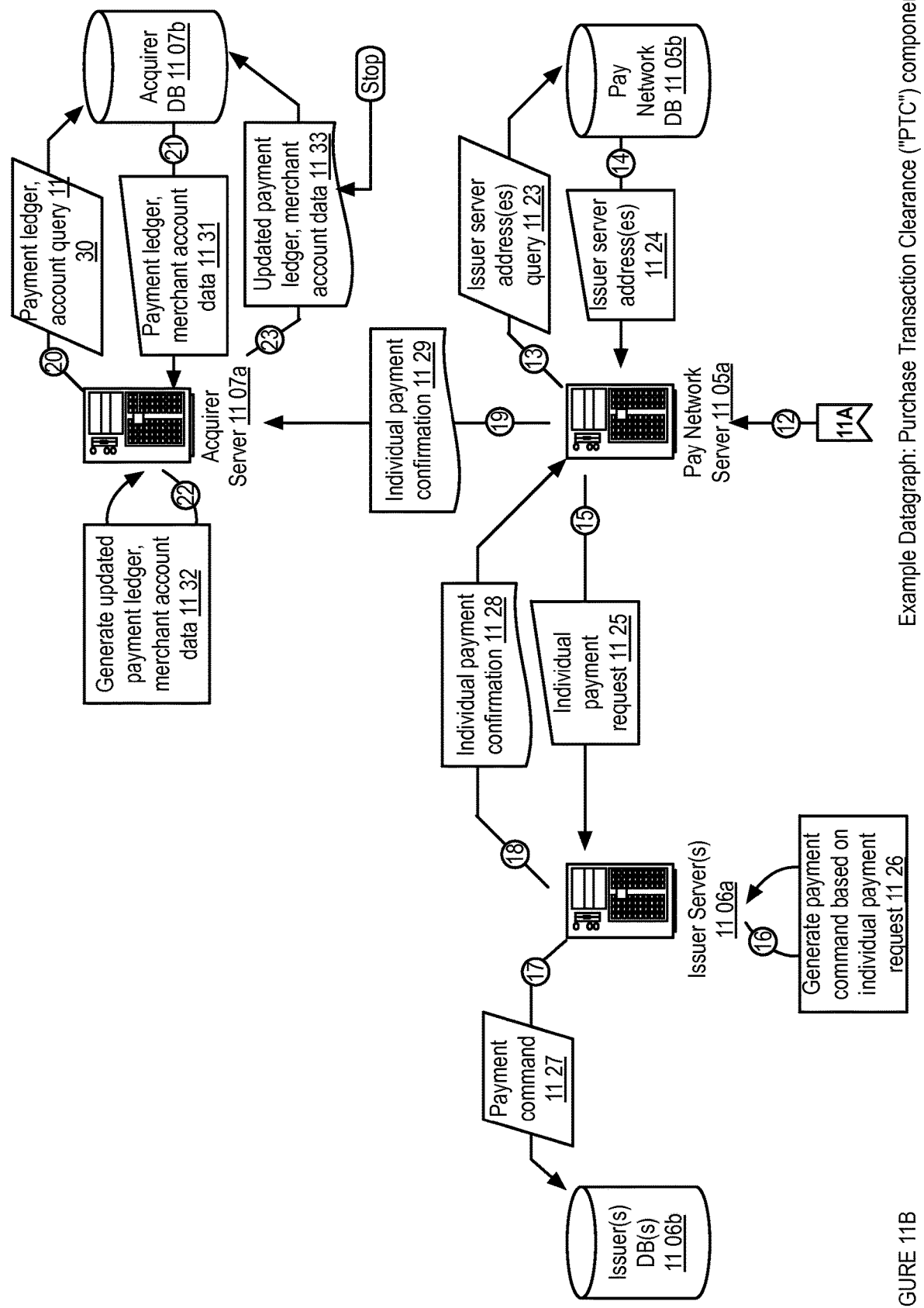

FIGS. 11A-B show data flow diagrams illustrating example aspects of transforming a merchant transaction batch data query via a Purchase Transaction Clearance ("PTC") component into an updated payment ledger record. With reference to FIG. 11A, in some embodiments, a merchant server, e.g., 1103a, may initiate clearance of a batch of authorized transactions. For example, the merchant server may generate a batch data request, e.g., 1111, and provide the request, to a merchant database, e.g., 1103b. For example, the merchant server may utilize PHP/SQL commands similar to the examples provided above to query a relational database. In response to the batch data request, the database may provide the requested batch data, e.g., 1112. The server may generate a batch clearance request, e.g., 1113, using the batch data obtained from the database, and provide, e.g., 1114, the batch clearance request to an acquirer server, e.g., 1107a. For example, the merchant server may provide a HTTP(S) POST message including XML-formatted batch data in the message body for the acquirer server. The acquirer server may generate, e.g., 1115, a batch payment request using the obtained batch clearance request, and provide, e.g., 1118, the batch payment request to the pay network server, e.g., 1105*a*. The pay network server may parse the batch payment request, and extract the transaction data for each transaction stored in the batch payment request, e.g., 1119. The pay network server may store the transaction data, e.g., 1120, for each transaction in a database, e.g., pay network database 1105*b*. In some embodiments, the pay network server may invoke a component to provide value-add analytics services based on analysis of the transactions of the merchant for whom the EWCP is clearing purchase transactions. Thus, in some embodiments, the pay network server may provide analytics-based value-added services for the merchant and/or the merchant's users.

With reference to FIG. 11B, in some embodiments, for each extracted transaction, the pay network server may query, e.g., 1123, a database, e.g., pay network database 1105*b*, for an address of an issuer server. For example, the pay network server may utilize PHP/SQL commands similar to the examples provided above. The pay network server may generate an individual payment request, e.g., 1125, for each transaction for which it has extracted transaction data, and provide the individual payment request, e.g., 1125, to the issuer server, e.g., 1106*a*. For example, the pay network server may provide an individual payment request to the issuer server(s) as a HTTP(S) POST message including XML-formatted data. An example listing of an individual payment request 1125, substantially in the form of a HTTP(S) POST message including XML-formatted data, is provided below:

```
POST/paymentrequest.php HTTP/1.1
Host: www.issuer.com
Content-Type: Application/XML
Content-Length: 788
<?XML version="1.0" encoding="UTF-8"?>
<pay_request>
    <request_ID>CNI4ICNW2</request_ID>
    <timestamp>2011-02-22 17:00:01</timestamp>
    <pay_amount>$72.89</pay_amount>
    <account_params>
        <account>
            <account_type>debit</account_type>
            <value_exchange_symbol>USD</value_exchange_symbol>
            <account_number>123456789012345
                </account_number>
            <account_name>John Q. Public</account_name>
            <bill_add>987 Green St #456, Chicago, IL
                94652</bill_add>
            <ship_add>987 Green St #456, Chicago, IL
                94652</ship_add>
            <CVV>1234</CVV>
        </account>
    </account_params>
</pay_request>
```

In some embodiments, the issuer server may generate a payment command, e.g., 1127. For example, the issuer server may issue a command to deduct funds from the user's account (or add a charge to the user's credit card account). The issuer server may issue a payment command, e.g., 1127, to a database storing the user's account information, e.g., user profile database 1106*b*. The issuer server may provide an individual payment confirmation, e.g., 1128, to the pay network server, which may forward, e.g., 1129, the funds transfer message to the acquirer server. An example listing of an individual payment confirmation 1128, substantially in the form of a HTTP(S) POST message including XML-formatted data, is provided below:

```
POST/clearance.php HTTP/1.1
Host: www.acquirer.com
Content-Type: Application/XML
Content-Length: 206
<?XML version="1.0" encoding="UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$72.89</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 1130, an acquirer database 1107*b* for payment ledger and/or merchant account data, e.g., 1131. The acquirer server may utilize payment ledger and/or merchant account data from the acquirer database, along with the individual payment confirmation, to generate updated payment ledger and/or merchant account data, e.g., 1132. The acquirer server may then store, e.g., 1133, the updated payment ledger and/or merchant account data to the acquire database.

Figure 12A:
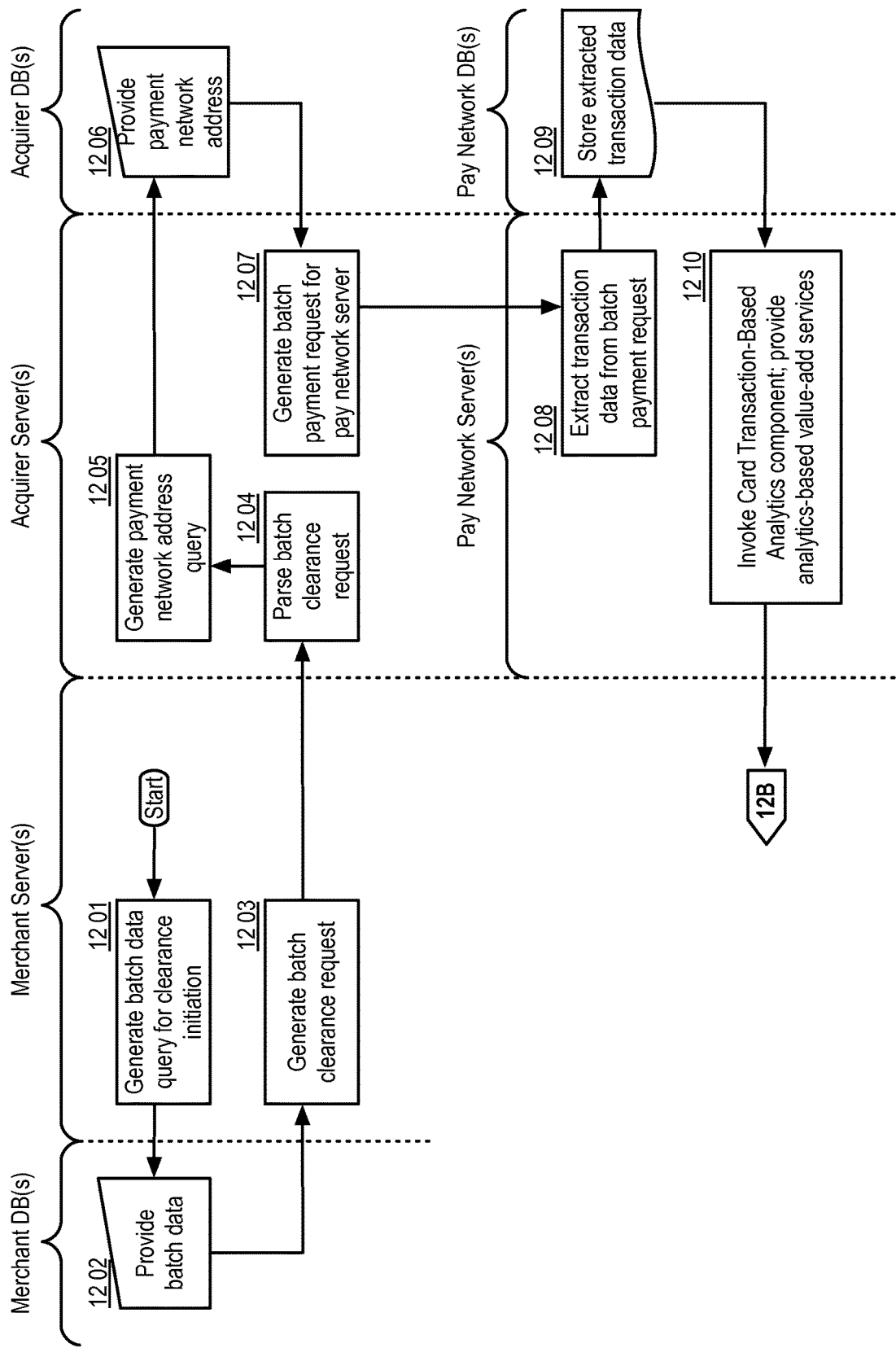
FIGS. 12A-B show logic flow diagrams illustrating example aspects of transforming a merchant transaction batch data query via a Purchase Transaction Clearance ("PTC") component into an updated payment ledger record.
Figure 12B:
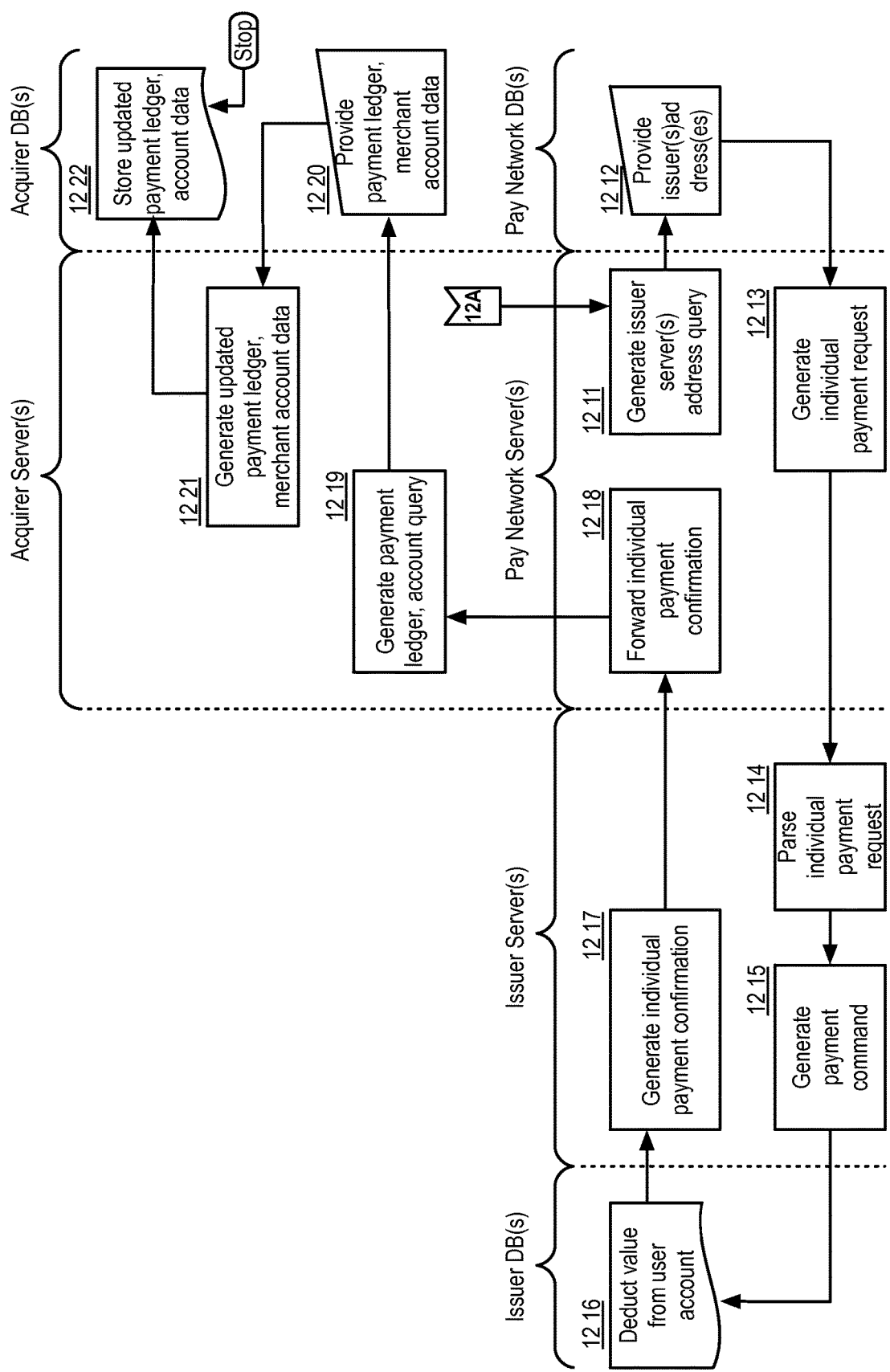

FIGS. 12A-B show logic flow diagrams illustrating example aspects of transforming a merchant transaction batch data query via a Purchase Transaction Clearance ("PTC") component into an updated payment ledger record. With reference to FIG. 12A, in some embodiments, a merchant server may initiate clearance of a batch of authorized transactions. For example, the merchant server may generate a batch data request, e.g., 1201, and provide the request to a merchant database. In response to the batch data request, the database may provide the requested batch data, e.g., 1202. The server may generate a batch clearance request, e.g., 1203, using the batch data obtained from the database, and provide the batch clearance request to an acquirer server. The acquirer server may parse, e.g., 1204, the obtained batch clearance request, and generate, e.g., 1207, a batch payment request using the obtained batch clearance request to provide, the batch payment request to a pay network server. For example, the acquirer server may query, e.g., 1205, an acquirer database for an address of a payment network server, and utilize the obtained address, e.g., 1206, to forward the generated batch payment request to the pay network server.

The pay network server may parse the batch payment request obtained from the acquirer server, and extract the transaction data for each transaction stored in the batch payment request, e.g., 1208. The pay network server may store the transaction data, e.g., 1209, for each transaction in a pay network database. In some embodiments, the pay network server may invoke a component, e.g., 1210, to provide analytics based on the transactions of the merchant for whom purchase transaction are being cleared.

With reference to FIG. 12B, in some embodiments, for each extracted transaction, the pay network server may query, e.g., 1211, a pay network database for an address of an issuer server. The pay network server may generate an individual payment request, e.g., 1213, for each transaction for which it has extracted transaction data, and provide the individual payment request to the issuer server. In some embodiments, the issuer server may parse the individual payment request, e.g., 1214, and generate a payment command, e.g., 1215, based on the parsed individual payment request. For example, the issuer server may issue a command to deduct funds from the user's account (or add a charge to the user's credit card account). The issuer server may issue a payment command, e.g., 1215, to a database storing the user's account information, e.g., a user profile database. The issuer server may provide an individual payment confirmation, e.g., 1217, to the pay network server, which may forward, e.g., 1218, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 1219, an acquirer database for payment ledger and/or merchant account data, e.g., 1220. The acquirer server may utilize payment ledger and/or merchant account data from the acquirer database, along with the individual payment confirmation, to generate updated payment ledger and/or merchant account data, e.g., 1221. The acquirer server may then store, e.g., 1222, the updated payment ledger and/or merchant account data to the acquire database.

Figure 13:
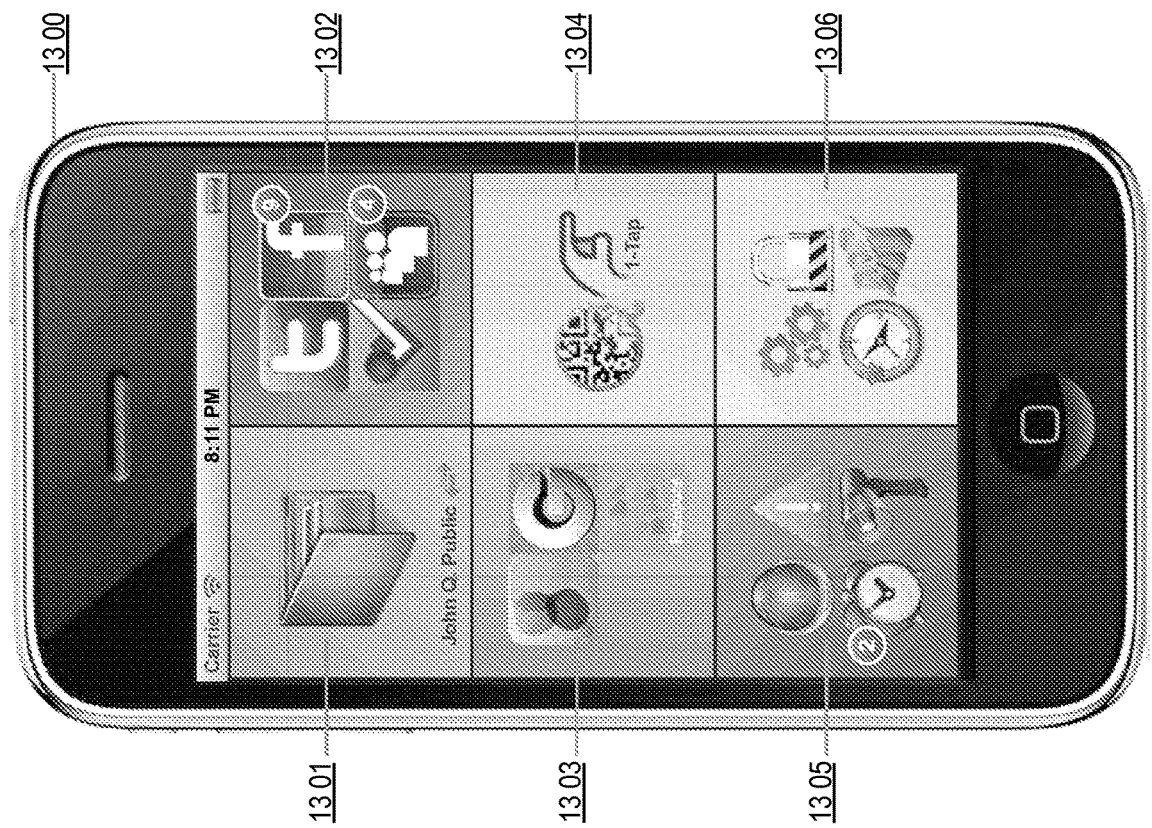
FIG. 13 shows a user interface diagram illustrating an overview of example features of virtual wallet applications in some embodiments of the EWCP.

FIG. 13 shows a user interface diagram illustrating an overview of example features of virtual wallet applications in some embodiments of the EWCP. FIG. 13 shows an illustration of various exemplary features of a virtual wallet mobile application 1300. Some of the features displayed include a wallet 1301, social integration via TWITTER, FACEBOOK, etc., offers and loyalty 1303, snap mobile purchase 1304, alerts 1305 and security, setting and analytics 1396. These features are explored in further detail below.

Figure 14B:
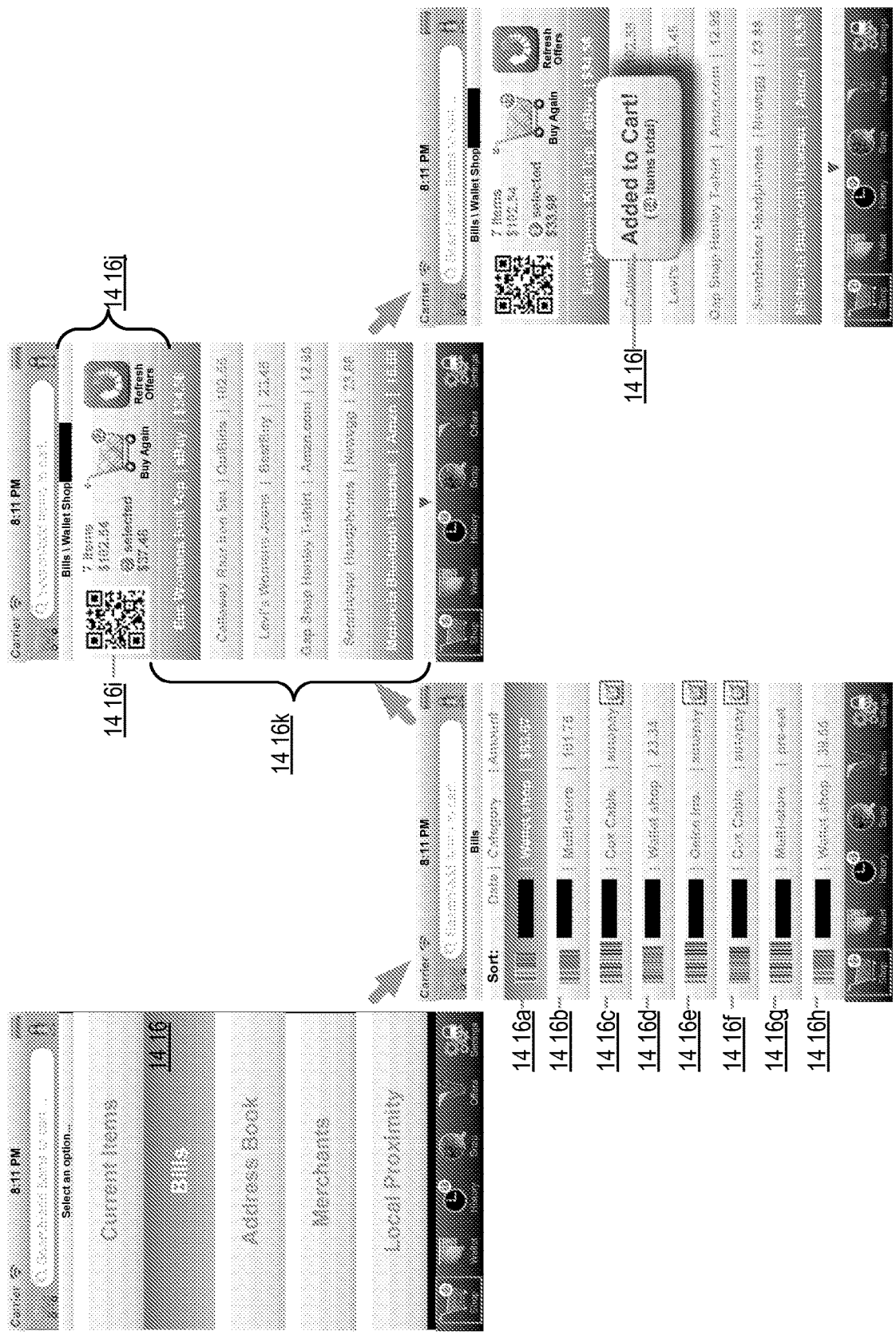

FIGS. 14A-K show user interface and logic flow diagrams illustrating example features of virtual wallet applications in a shopping mode, in some embodiments of the EWCP. With reference to FIG. 14A, some embodiments of the virtual wallet mobile app facilitate and greatly enhance the shopping experience of consumers. A variety of shopping modes, as shown in FIG. 14A, may be available for a consumer to peruse. In one implementation, for example, a user may launch the shopping mode by selecting the shop icon 1410 at the bottom of the user interface. A user may type in an item in the search field 1412 to search and/or add an item to a cart 1411. A user may also use a voice activated shopping mode by saying the name or description of an item to be searched and/or added to the cart into a microphone 1413. In a further implementation, a user may also select other shopping options 1414 such as current items 1415, bills 1416, address book 1417, merchants 1418 and local proximity 1419.

In one embodiment, for example, a user may select the option current items 1415, as shown in the left most user interface of FIG. 14A. When the current items 1415 option is selected, the middle user interface may be displayed. As shown, the middle user interface may provide a current list of items 1415*a-h* in a user's shopping cart 1411. A user may select an item, for example item 1415*a*, to view product description 1415*j* of the selected item and/or other items from the same merchant. The price and total payable information may also be displayed, along with a QR code 1415*k* that captures the information necessary to effect a snap mobile purchase transaction.

With reference to FIG. 14B, in another embodiment, a user may select the bills 1416 option. Upon selecting the bills 1416 option, the user interface may display a list of bills and/or receipts 1416*a-h* from one or more merchants. Next to each of the bills, additional information such as date of visit, whether items from multiple stores are present, last bill payment date, auto-payment, number of items, and/or the like may be displayed. In one example, the wallet shop bill 1416*a* dated Jan. 20, 2011 may be selected. The wallet shop bill selection may display a user interface that provides a variety of information regarding the selected bill. For example, the user interface may display a list of items 1416*k* purchased, <<1416*i*>>, a total number of items and the corresponding value. For example, 7 items worth $102.54 were in the selected wallet shop bill. A user may now select any of the items and select buy again to add purchase the items. The user may also refresh offers 1416*j* to clear any invalid offers from last time and/or search for new offers that may be applicable for the current purchase. As shown in FIG. 14B, a user may select two items for repeat purchase. Upon addition, a message 1416*l* may be displayed to confirm the addition of the two items, which makes the total number of items in the cart 14.

With reference to FIG. 14C, in yet another embodiment, a user may select the address book option 1417 to view the address book 1417*a* which includes a list of contacts 1417*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 1417*c*. In another example, money may be transferred to Brian S. via QR code as indicated by the QR code icon 1417*d*. In yet another example, Charles B. may accept payment via near field communication 1417*e*, Bluetooth 1417*f* and email 1417*g*. Payment may also be made via USB 1417*h* (e.g., by physically connecting two mobile devices) as well as other social channels such as TWITTER.

Figure 14D:
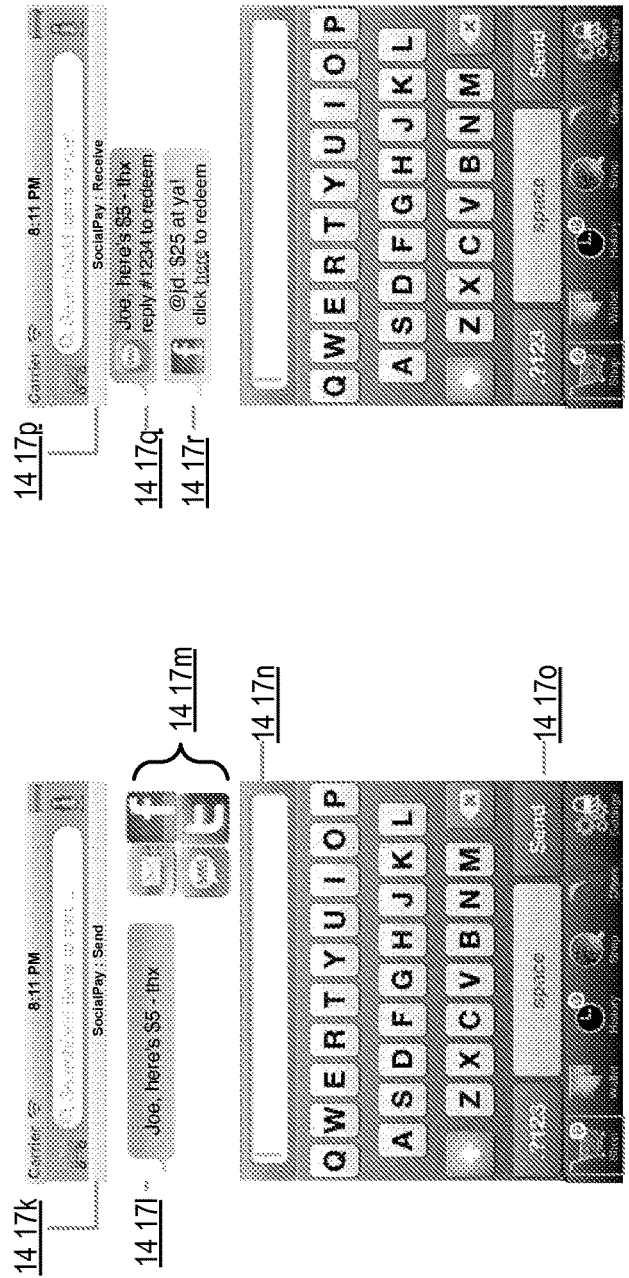

In one implementation, a user may select Joe P. for payment. Joe P., as shown in the user interface, has an email icon 1417*g* next to his name indicating that Joe P. accepts payment via email. When his name is selected, the user interface may display his contact information such as email, phone, etc. If a user wishes to make a payment to Joe P. by a method other than email, the user may add another transfer mode 1417*j* to his contact information and make a payment transfer. With reference to FIG. 14D, the user may be provided with a screen 1417*k* where the user can enter an amount to send Joe, as well as add other text to provide Joe with context for the payment transaction 1417*l*. The user can choose modes (e.g., SMS, email, social networking) via which Joe may be contacted via graphical user interface elements, 1417*m*. As the user types, the text entered may be provided for review within a GUI element 1417*n*. When the user has completed entering in the necessary information, the user can press the send button 1417*o* to send the social message to Joe. If Joe also has a virtual wallet application, Joe may be able to review 1417*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 14D, the SMS 1417*q* Joe received indicates that Joe can redeem the $5 obtained via SMS by replying to the SMS and entering the hash tag value '#1234'. In the same illustration, Joe has also received a message 1417*r* via Facebook®, which includes a URL link that Joe can activate to initiate redemption of the $25 payment.

Figure 14E:

With reference to FIG. 14E, in some other embodiments, a user may select merchants 1418 from the list of options in the shopping mode to view a select list of merchants 1418a-e. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 1418a for example. The user may then navigate through the merchant's listings to find items of interest such as 1418f-j. Directly through the wallet and without visiting the merchant site from a separate page, the user may make a selection of an item 1418j from the catalog of Amazon 1418a. As shown in the right most user interface of FIG. 14D, the selected item may then be added to cart. The message 1418k indicates that the selected item has been added to the cart, and updated number of items in the cart is now 13.

Figure 14F:

With reference to FIG. 14F, in one embodiment, there may be a local proximity option 1419 which may be selected by a user to view a list of merchants that are geographically in close proximity to the user. For example, the list of merchants 1419a-e may be the merchants that are located close to the user. In one implementation, the mobile application may further identify when the user in a store based on the user's location. For example, position icon 1419d may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 1419f-j available on aisle 5 of Walgreens. In one implementation, the user may select corn 1419i from his or her mobile application to add to cart 1419k.

With reference to FIG. 14G, in another embodiment, the local proximity option 1419 may include a store map and a real time map features among others. For example, upon selecting the Walgreens store, the user may launch an aisle map 14191 which displays a map 1419m showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 1419n may display images/video of the user's surrounding. For example, if the user is about to enter aisle 5, the store view map may show the view of aisle 5. Further the user may manipulate the orientation of the map using the navigation tool 14190 to move the store view forwards, backwards, right, left as well clockwise and counterclockwise rotation.

Figure 14H:
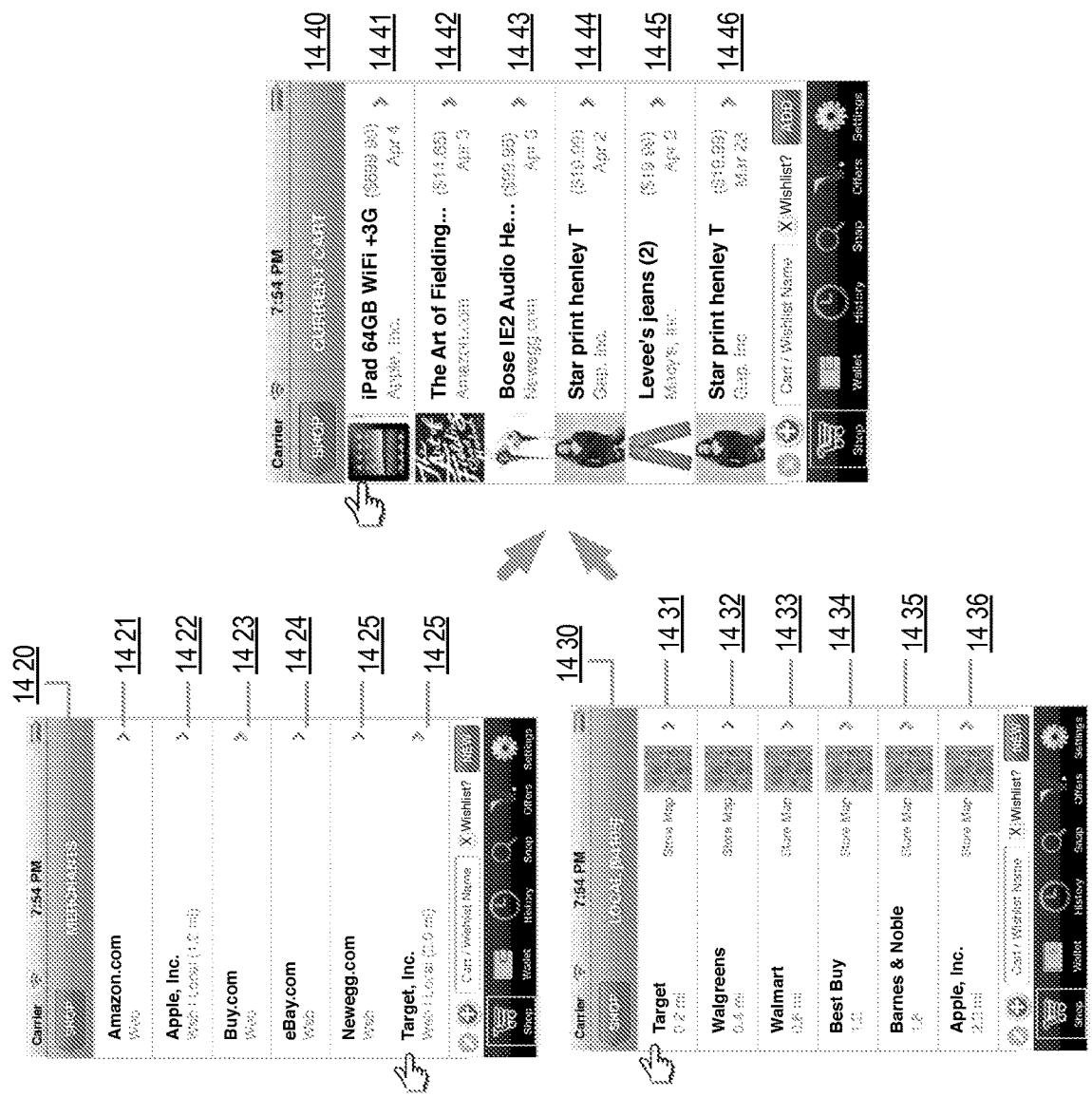

FIGS. 14H-K show user interface and logic flow diagrams illustrating example aspects of virtual store injection into a virtual wallet application in some embodiments of the EWCP. In some implementations, the virtual wallet application may presents screens 1420 and 1430, respectively, as depicted in FIG. 14H. In FIG. 14H, 1420, the virtual wallet application displays a list of merchants participating in the virtual wallet of the EWCP, e.g., 601-605. Similarly, in FIG. 14H, 1430, the virtual wallet application displays a list of merchants participating in the virtual wallet of the EWCP and at or nearby the approximate location of the user the user. The user may click on any of the merchants listed in the two screens 1420 and 1430, to be injected into the store inventory of the merchant. Upon injection, the user may be presented with a screen such as 1440. In some implementations, the virtual wallet application may be able to store, maintain and manage a plurality of shopping carts and/or wishlists for a user. The carts may be purely virtual or they may represent the contents of a physical cart in a merchant store. The user may activate any of the carts listed (e.g., 1440) to view the items currently stored in a cart (e.g., 1441-1446). In some implementations, the virtual wallet application may also provide wishlists, e.g., tech wishlist, with items that the user desires to be gifted. In some implementations, the virtual wallet may allow the user to quickly change carts or wishlists from another cart or wishlist, using a pop-up menu.

Figure 14I:
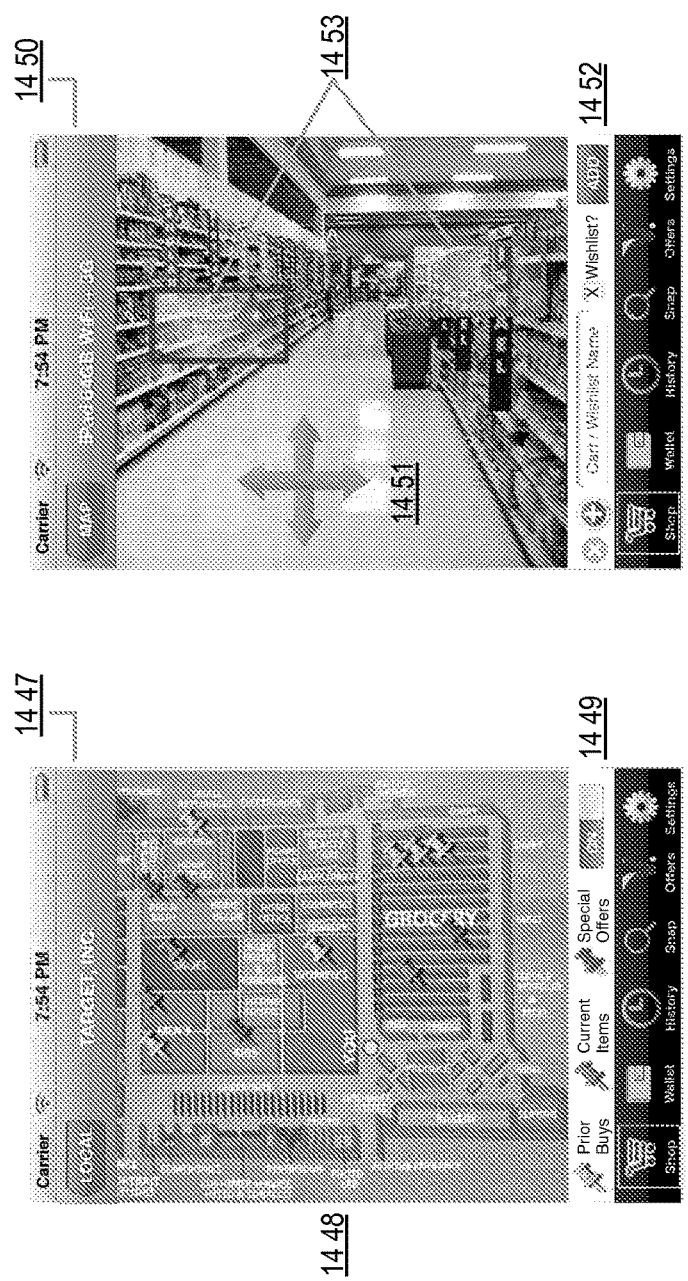

With reference to FIG. 14I, in some embodiments, the user may be injected into a virtual reality 2D/3D storefront of the merchant, e.g., 1447. For example, the user may be presented with a plan map view of the store 1448. In some map views, the user may provided with the user's location (e.g., using GPS, or if not available, then using a coarse approximation using a cellular signal). In some implementations, the locations of the user's prior and current purchases may be provided for the user, if the user wishes (see 1449, the user can turn the indications off, in some implementations). In some implementations, the user may be provided with a 3D aisle view of an aisle within the virtual storefront. The user may point the view direction(s) at any of the objects to obtain virtual tools to obtain items from off the "virtual shelf," and place them in the user's virtual cart. The screen at 1450 shows an augmented reality view of an aisle, where user may see pins of items suggested by a concierge, or that were bookmarked in their cart/wishlist highlighted through a live video view 1453. In some embodiments, the color of a pin depicted in the augmented reality view may be indicative of an attribute of the suggestion, e.g., a discount offer, a warning not to buy, a prior purchase, etc. In still further embodiments, a color of a 3D viewer window may indicate additional attributes such as, without limitation, whether the product was recommended by the user's social graph, the product's rating (e.g., according to experts, the user's friends, Internet users, etc.), and/or the like.

In another view, a virtual store aisle view (e.g., akin to a Google map Street View) may be navigated 1451 when the consumer is not at the store, but would like to look for product; the directional control 1451 allows for navigation up and down the aisle, and rotation and views of items at the merchant location. Additionally, consumers may tap items in the shelves and create a new product pin, which may then be added 1452 to a cart or wishlist for further transacting.

Figure 14J:
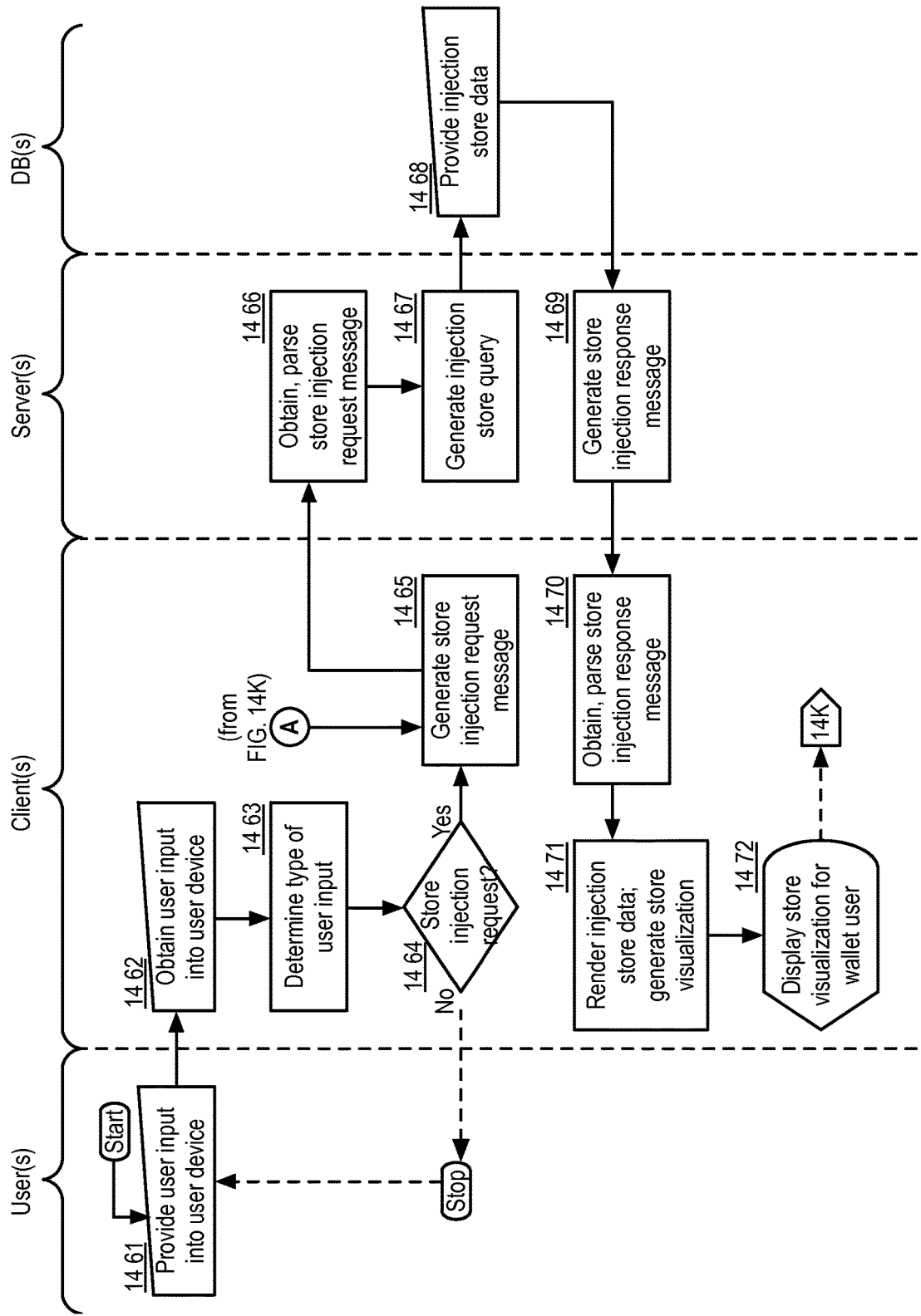

FIG. 14J shows a logic flow diagram illustrating example aspects of virtual store injection into a virtual wallet application in some embodiments of the EWCP, e.g., a Virtual Wallet Store Injection ("VWSI") component. In some embodiments, a user may provide a user input into a user device executing a virtual wallet application, e.g., 1461. The user device ("client") may obtain the user input, e.g., 1462. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. The client may determine the type of user input, e.g., 1463. For example, the client may determine whether the user input is one that requests that the a virtual store of merchant(s) be injected into the virtual wallet application. If the user input constitutes a store injection request, e.g., 1464, option "Yes," the client may generate a store injection request message, e.g., 1465. For example, the client may provide a store injection request message to a server as a HTTP(S) POST message including XML-formatted data. An example listing of a store injection request message, substantially in the form of a HTTP(S) POST message including XML-formatted data, is provided below:

POST/storeinjectionrequest.php HTTP/1.1
Host: www.merchant.com
Content-Type: Application/XML
Content-Length: 453
<?XML version="1.0" encoding="UTF-8"?>
<store_injection_request>
   <session_ID>ANAv483</session_ID>
   <timestamp>2052-01-01 12:12:12</timestamp>
   <user_id>john.q.public</user_id>
   <injection_data_request>
     <type>NEW STORE REQUEST</type>
     <merchant_id>JKHVHCGV456</merchant_id>
     <store_id>1234</store_id>
     <injection_point>ENTRY</injection_point>
     <augmented_reality_flag>ON</augmented_reality_flag>
     <view_type>street view</view_type>
     <alt_view_type>map view</alt_view_type>
   </injection_data_request>

In some embodiments, the server may obtain the store injection request from the client, and may parse the message, e.g., 1466. For example, the client may utilize a parser such as the example parsers discussed below in the description with reference to FIG. 20. The client may extract the request parameters from the client's message and generate a query for the requested store injection data, e.g., 1467. Examples of store injection data include, without limitation: product information, product images, product animations, videos, media content, animations, store wireframes, street view data, map data, lists of products (e.g., XML data), URLs pointing to other store injection data, augmented reality data, executable script (e.g., JavaScript™, Adobe Flash® object, .bundle files, HTML5 code, etc.), and/or the like. For example, the server may issue PHP/SQL commands to query a database table (such as FIG. 20, Shop Sessions 2019*i*) for store injection data. An example store injection data query command, substantially in the form of PHP/SQL commands, is provided below:

```
<?PHP
header('Content-Type: text/plain');
mysql_connect("254.93.179.112",$DBserver,$password); //access database server
mysql_select_db("EWCP_DB.SQL"); //select database table to search
//create query
$query="SELECT product_information, product_images, product_animations, videos, media_content, animations, store_wireframes, street_view_data, map_data, product_list, pointer_URL_list, augmented_reality_data, executable_script_list FROM ShopSessionTable WHERE session_id LIKE '%' $sessionid";
$result=mysql_query($query); //perform the search query
mysql_close("EWCP_DB.SQL"); //close database access
?>
```

In some embodiments, in response to the query, a database of the server may provide the data requested by the server, e.g., 1468. Using the obtained data, the server may generate a store injection response message, e.g., 1469. For example, the server may provide a store injection response message to the client as a HTTP(S) POST message including XML-formatted data. An example listing of a store injection response message, substantially in the form of a HTTP(S) POST message including XML-formatted data, is provided below:

```
POST /storeinjectionresponse.php HTTP/1.1
Host: www.client.com
Content-Type: Application/XML
Content-Length: 1777
<?XML version = "1.0" encoding = "UTF-8"?>
<store_injection_response>
    <session_ID>ANAv483</session_ID>
    <timestamp>2052-01-01 12:12:15</timestamp>
    <user_id>john.q.public</user_id>
    <merchant_id>JKHVHCGV456</merchant_id>
    <store_id>1234</store_id>
    <injection_point>ENTRY</injection_point>
    <augmented_reality_flag>ON</augmented_reality_flag>
    <view_type>street view</view_type>
    <alt_view_type>map view</alt_view_type>
    <inventory_data>
        <categories>
            <books>
                ...
                <product_params>
                    <product_type>Self Help</product_type>
                    <product_title>XML for dummies</product_title>
                    <ISBN>938-2-14-168710-0</ISBN>
                    <edition>2nd ed.</edition>
                    <cover>hardbound</cover>
                    <price>$59</price>
                    <inventory>70</ inventory>
                </product_params>
                ...
```

```
            </books>
            ...
            <electronics>
                <vendors>
                    ...
                    <Apple>
                        ...
                        <product_params>
                            <product_type>tablet</product_type>
                            <product_name>iPad</product_name>
                            <serialno>12345678</ serialno >
                            <modelno>12345</modelno>
                            <description>64GB, 4G</description>
                            <price>$829</price>
                            <inventory>7</ inventory>
                        </product_params>
                        ...
                    </Apple>
                    ...
            </electronics>
        </categories>
        <products>
            ...
            <product_params>
                <publisher_params>
                    <publisher_id>54TBRELF8</publisher_id>
                    <publisher_name>McGraw-Hill,
Inc.</publisher_name>
                </publisher_params>
                <product_type>book</product_type>
                <product_params>
                    <product_title>XML for dummies</product_title>
                    <ISBN>938-2-14-168710-0</ISBN>
                    <edition>2nd ed.</edition>
                    <cover>hardbound</cover>
                </product_params>
                <inventory_level>2</inventory_level>
                <unit_cost>$14.46</unit_cost>
                <coupon_id>AY34567</coupon_id>
            </product_params>
            ...
            <product_params>
                <product_id>HJKFG345</product_id>
                <product_name>Philips Sonicare</product_name>
                <vendor_name>Philips, Inc.</vendor_name>
                <model>EH57</model>
                <product_type>Toothbrush</product_type>
                <inventory_level>12</inventory_level>
                <unit_cost>$34.78</unit_cost>
                <coupon_id>null</coupon_id>
            </product_params>
            ...
        </products>
        ...
    </inventory_data>
    <store_injection_enhanced_interface_data>
        <floorplan_URL>www.inject.com?id= ANAv483&type=img</floorplan_URL>
        <UI_script_URL>www.inject.com?id= ANAv483&type=script</UI_script_URL>
        <ShopAssistant_UIbundle_url>www.inject.com?id= ANAv483&type=bundle</ShopAssistant_UIbundle_url>
        <AugmentedRealityFloorplanCartPinOverlayUI_html5_url>www.inject.com?id= ANAv483&type=html5</AugmentedRealityFloorplanCartPinOverlayUI_html5_url>
        <InteractiveStore_flash_url>www.inject.com?id= ANAv483&type=flash</InteractiveStore_flash_url>
    </store_injection_enhanced_interface_data>
</store_injection_response>
```

In some embodiments, the client may obtain the store injection response message, and parse the message, e.g., 1470. The client may render a visualization of the virtual store using the extracted store injection data, e.g., 1471, and display the rendered visualization for the user via a display device of the client, e.g., 1472.

Figure 14K:
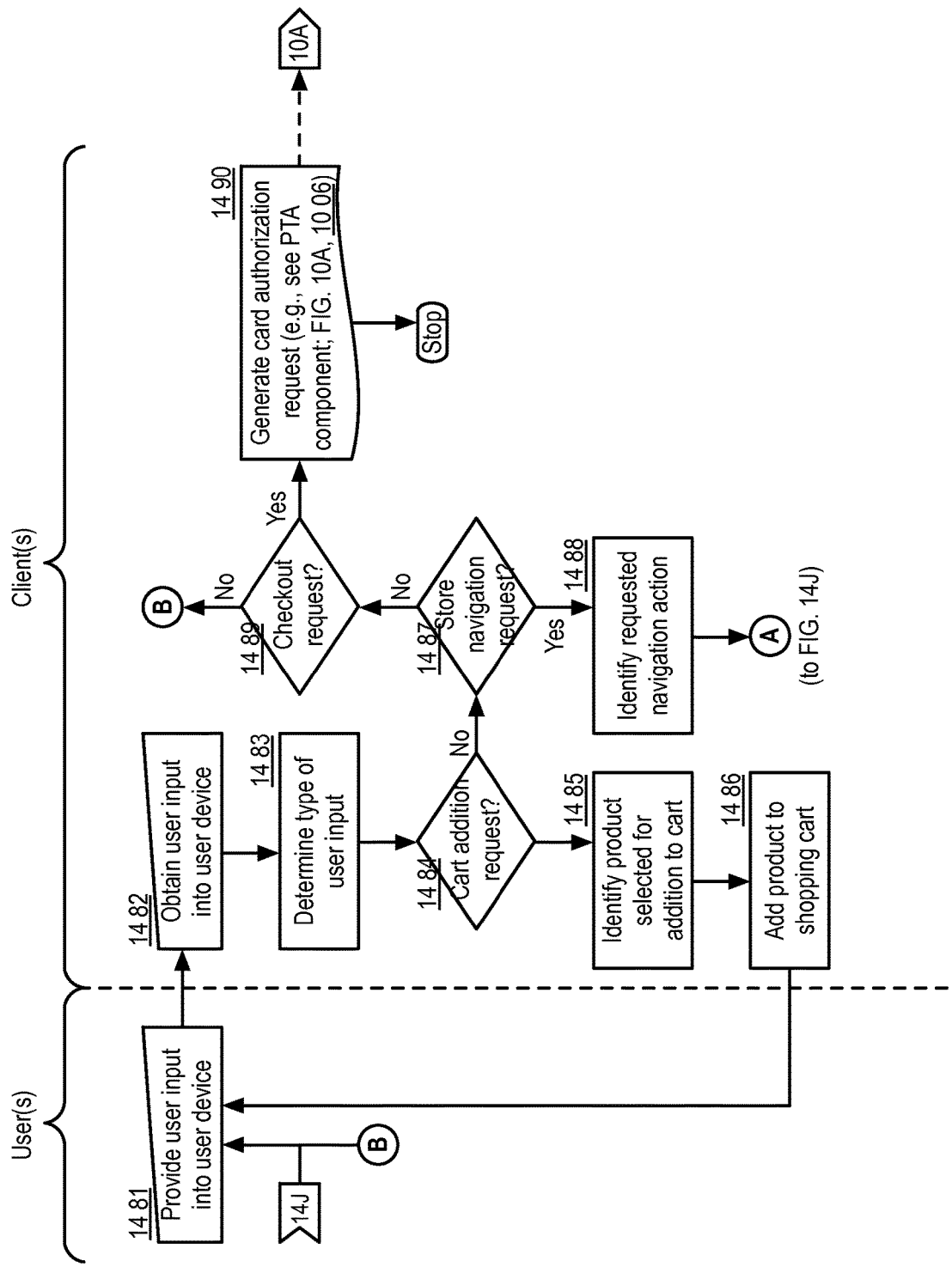

With reference to FIG. 14K, in some embodiments, the user may provide a user input into the virtual store visualization generated by the client, e.g., 1481. The client may obtain the user input, e.g., 1482, and may determine the type of input provided by the user into the client, e.g., 1483. If the user input represents a card addition request, e.g., 1484, option "Yes," the client may identify a product that the user desires to add to a shopping cart, e.g., 1485, and may add the user-selected product to a virtual shopping cart or wishlist, e.g., 1486. If the user input represents a store navigation request (e.g., walking through the aisle within a virtual store), e.g., 1487, option "Yes," the client may identify the store navigation action requested by the user, e.g., 1488, and may generate a store injection request message for the server to process the user's store navigation request (see, e.g., 1465-1472). If the user input represents a checkout request, e.g., 1489, option "Yes," the client may generate a card authorization request, e.g., 1490, as a trigger for a purchase transaction, and may provide the card authorization request to a purchase transaction authorization component such as the example PTA component discussed in the description with reference to FIG. 10A.

Figure 15A:
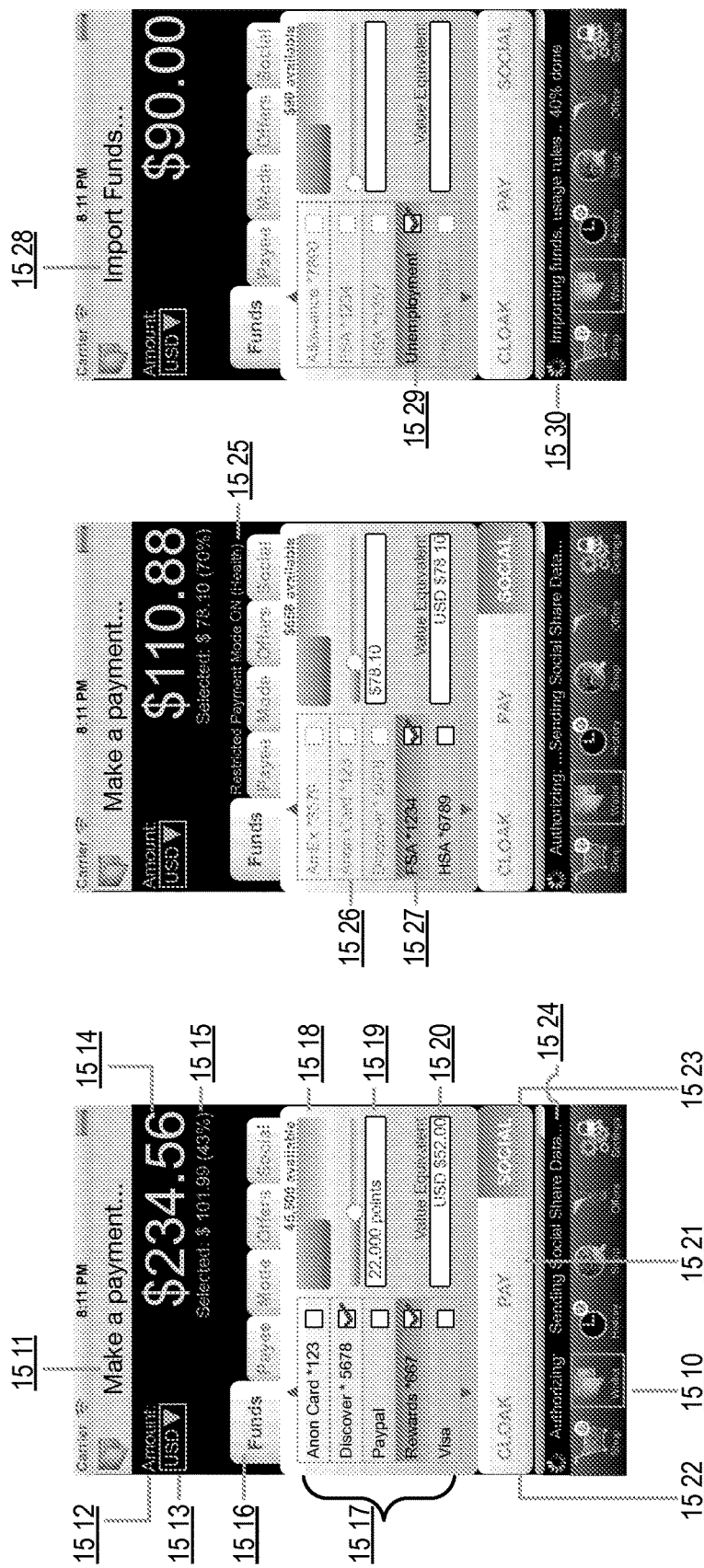

FIGS. 15A-F show user interface diagrams illustrating example features of virtual wallet applications in a payment mode, in some embodiments of the EWCP. With reference to FIG. 15A, in one embodiment, the wallet mobile application may provide a user with a number of options for paying for a transaction via the wallet mode 1510. In one implementation, an example user interface 1511 for making a payment is shown. The user interface may clearly identify the amount 1512 and the currency 1513 for the transaction. The amount may be the amount payable and the currency may include real currencies such as dollars and euros, as well as virtual currencies such as reward points. The amount of the transaction 1514 may also be prominently displayed on the user interface. The user may select the funds tab 1516 to select one or more forms of payment 1517, which may include various credit, debit, gift, rewards and/or prepaid cards. The user may also have the option of paying, wholly or in part, with reward points. For example, the graphical indicator 1518 on the user interface shows the number of points available, the graphical indicator 1519 shows the number of points to be used towards the amount due 234.56 and the equivalent 1520 of the number of points in a selected currency (USD, for example).

In one implementation, the user may combine funds from multiple sources to pay for the transaction. The amount 1515 displayed on the user interface may provide an indication of the amount of total funds covered so far by the selected forms of payment (e.g., Discover card and rewards points). The user may choose another form of payment or adjust the amount to be debited from one or more forms of payment until the amount 1515 matches the amount payable 1514. Once the amounts to be debited from one or more forms of payment are finalized by the user, payment authorization may begin.

In one implementation, the user may select a secure authorization of the transaction by selecting the cloak button 1522 to effectively cloak or anonymize some (e.g., pre-configured) or all identifying information such that when the user selects pay button 1521, the transaction authorization is conducted in a secure and anonymous manner. In another implementation, the user may select the pay button 1521 which may use standard authorization techniques for transaction processing. In yet another implementation, when the user selects the social button 1523, a message regarding the transaction may be communicated to one of more social networks (set up by the user) which may post or announce the purchase transaction in a social forum such as a wall post or a tweet. In one implementation, the user may select a social payment processing option 1523. The indicator 1524 may show the authorizing and sending social share data in progress.

In another implementation, a restricted payment mode 1525 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 1526 under the funds tab to select specialized accounts such as a flexible spending account (FSA) 1527, health savings account (HAS), and/or the like and amounts to be debited to the selected accounts. In one implementation, such restricted payment mode 1525 processing may disable social sharing of purchase information.

In one embodiment, the wallet mobile application may facilitate importing of funds via the import funds user interface 1528. For example, a user who is unemployed may obtain unemployment benefit fund 1529 via the wallet mobile application. In one implementation, the entity providing the funds may also configure rules for using the fund as shown by the processing indicator message 1530. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 15B:
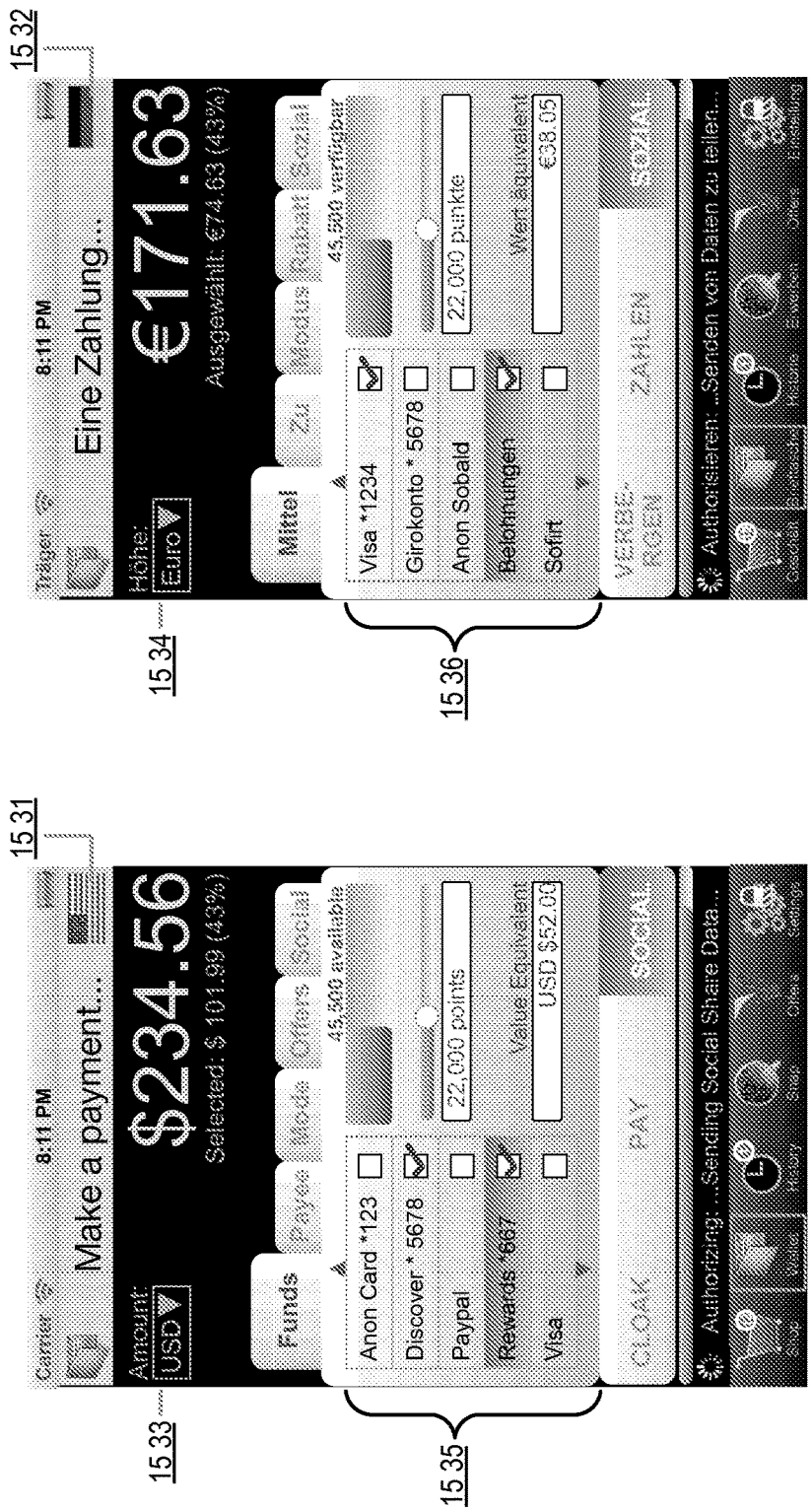

With reference to FIG. 15B, in one embodiment, the wallet mobile application may facilitate dynamic payment optimization based on factors such as user location, preferences and currency value preferences among others. For example, when a user is in the United States, the country indicator 1531 may display a flag of the United States and may set the currency 1533 to the United States. In a further implementation, the wallet mobile application may automatically rearrange the order in which the forms of payments 1535 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 1532 and the currency 1534. In a further implementation, the wallet application may rearrange the order in which different forms of payment 1536 are listed based on their acceptance level in that country. Of course, the order of these forms of payments may be modified by the user to suit his or her own preferences.

With reference to FIG. 15C, in one embodiment, the payee tab 1537 in the wallet mobile application user interface may facilitate user selection of one or more payees receiving the funds selected in the funds tab. In one implementation, the user interface may show a list of all payees 1538 with whom the user has previously transacted or available to transact. The user may then select one or more payees. The payees 1538 may include larger merchants such as Amazon.com Inc., and individuals such as Jane P. Doe. Next to each payee name, a list of accepted payment modes for the payee may be displayed. In one implementation, the user may select the payee Jane P. Doe 1539 for receiving payment. Upon selection, the user interface may display additional identifying information relating to the payee.

Figure 15D:
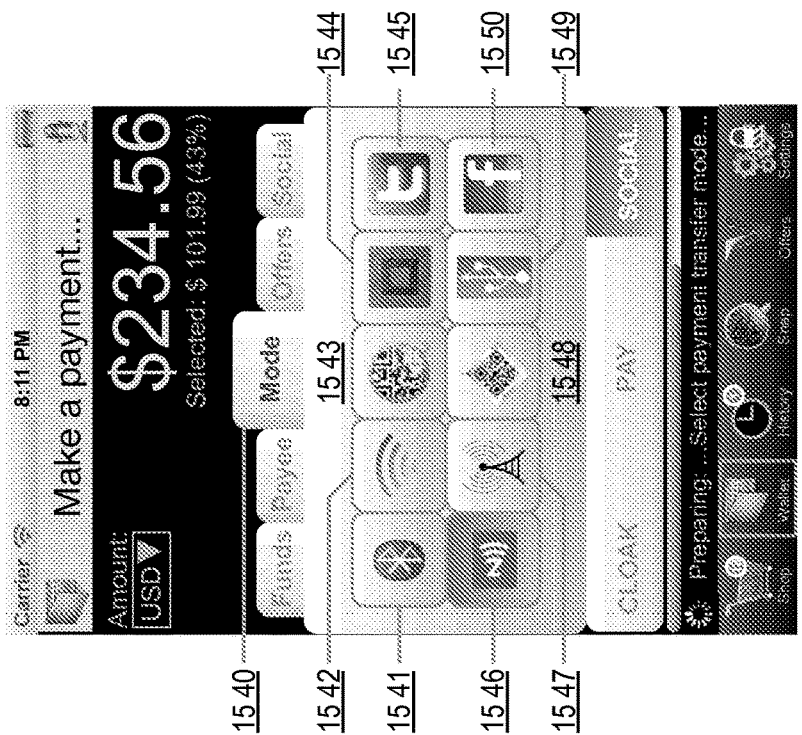

With reference to FIG. 15D, in one embodiment, the mode tab 1540 may facilitate selection of a payment mode accepted by the payee. A number of payment modes may be available for selection. Example modes include, blue tooth 1541, wireless 1542, snap mobile by user-obtained QR code 1543, secure chip 1544, TWITTER 1545, near-field communication (NFC) 1546, cellular 1547, snap mobile by user-provided QR code 1548, USB 1549 and FACEBOOK 1550, among others. In one implementation, only the payment modes that are accepted by the payee may be selectable by the user. Other non-accepted payment modes may be disabled.

Figure 15E:
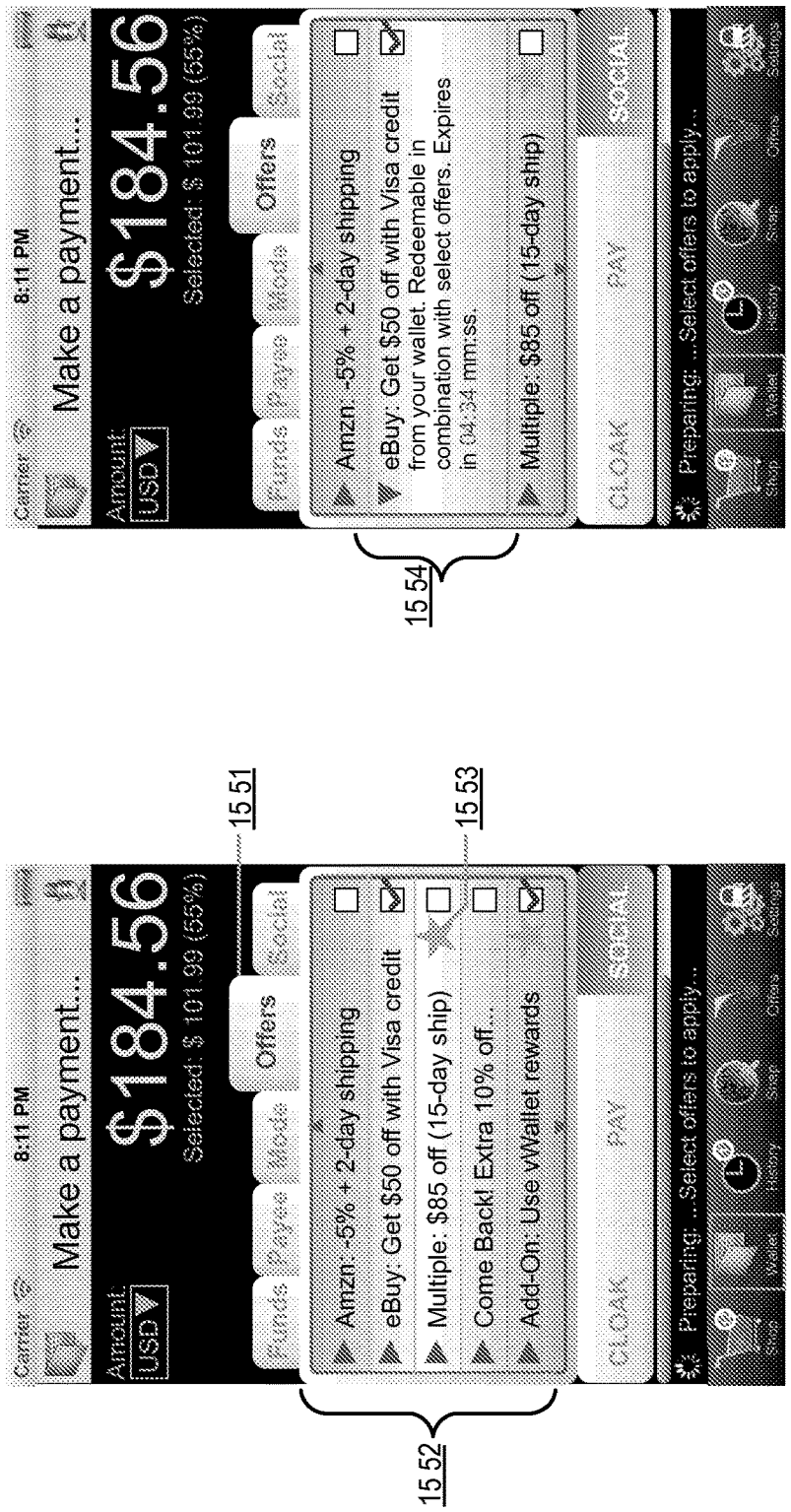

With reference to FIG. 15E, in one embodiment, the offers tab 1551 may provide real-time offers that are relevant to items in a user's cart for selection by the user. The user may select one or more offers from the list of applicable offers 1552 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 1553. In a further implementation, the user may read the details of the offer by expanding the offer row as shown by 1554 in the user interface.

Figure 15F:
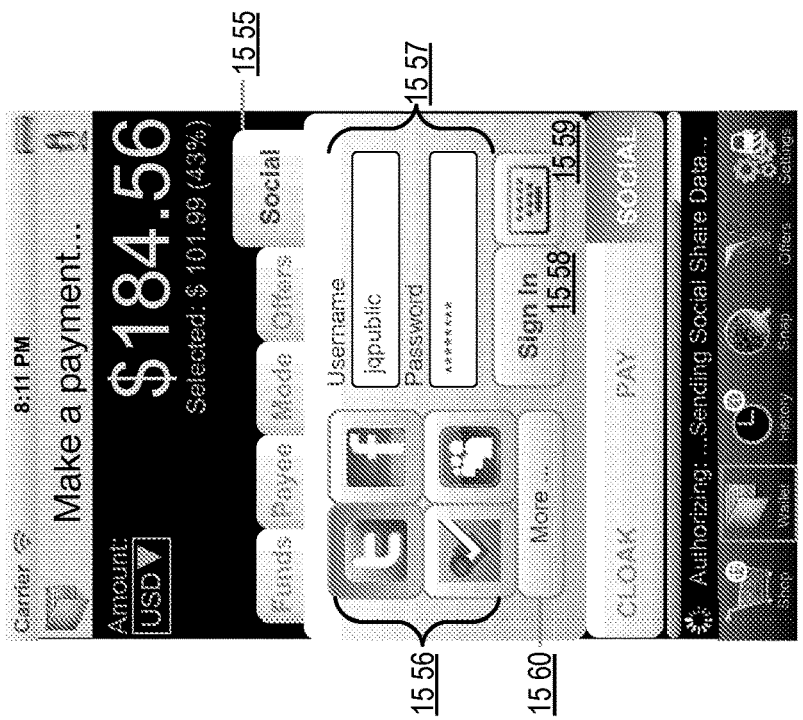

With reference to FIG. 15F, in one embodiment, the social tab 1555 may facilitate integration of the wallet application with social channels 1556. In one implementation, a user may select one or more social channels 1556 and may sign in to the selected social channel from the wallet application by providing to the wallet application the social channel user name and password 1557 and signing in 1558. The user may then use the social button 1559 to send or receive money through the integrated social channels. In a further implementation, the user may send social share data such as purchase information or links through integrated social channels. In another embodiment, the user supplied login credentials may allow EWCP to engage in interception parsing.

Figure 16:
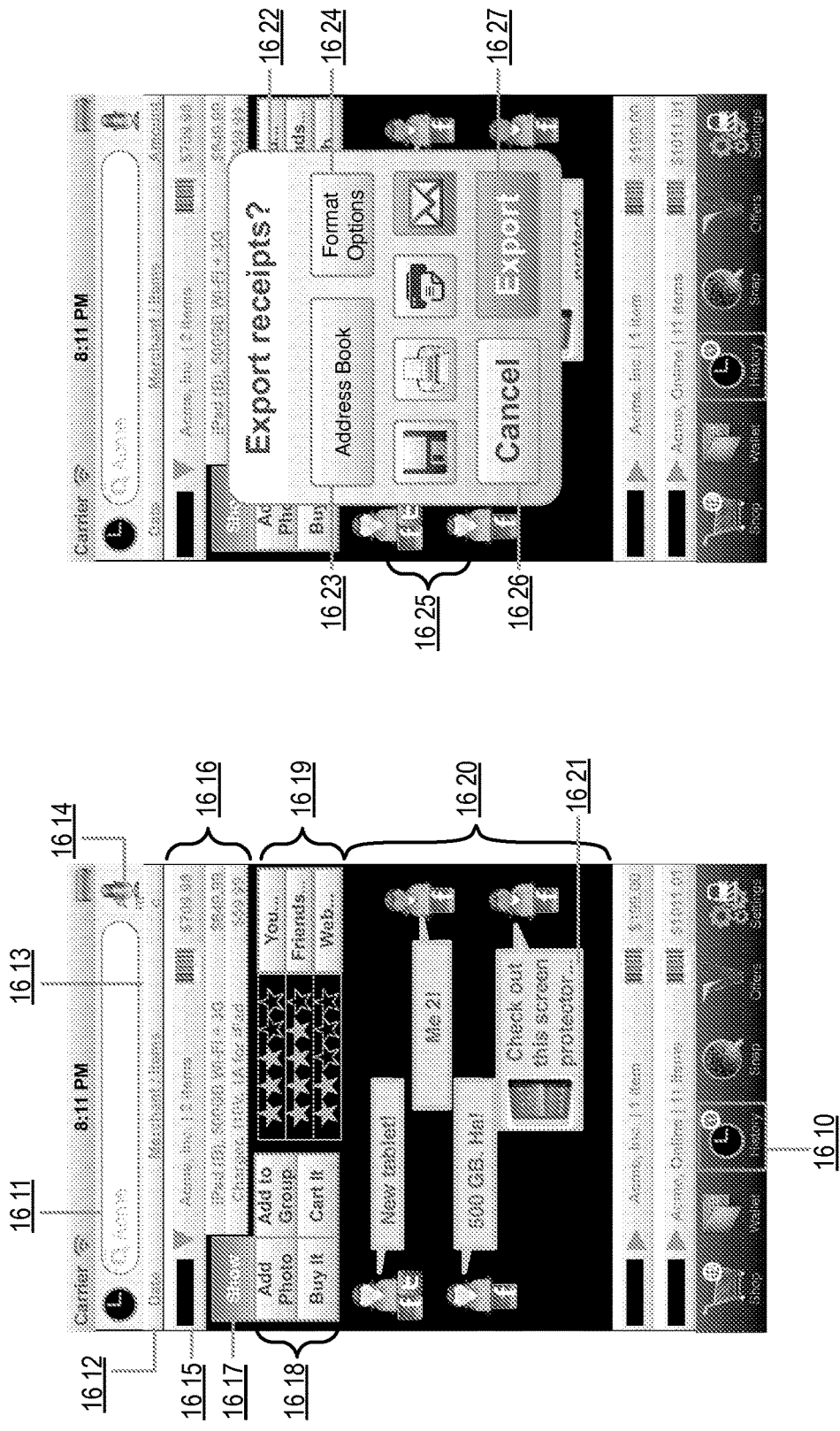
FIG. 16 shows a user interface diagram illustrating example features of virtual wallet applications, in a history mode, in some embodiments of the EWCP.

FIG. 16 shows a user interface diagram illustrating example features of virtual wallet applications, in a history mode, in some embodiments of the EWCP. In one embodiment, a user may select the history mode 1610 to view a history of prior purchases and perform various actions on those prior purchases. For example, a user may enter a merchant identifying information such as name, product, MCC, and/or the like in the search bar 1611. In another implementation, the user may use voice activated search feature by clicking on the microphone icon 1614. The wallet application may query the storage areas in the mobile device or elsewhere (e.g., one or more databases and/or tables remote from the mobile device) for transactions matching the search keywords. The user interface may then display the results of the query such as transaction 1615. The user interface may also identify the date 1612 of the transaction, the merchants and items 1613 relating to the transaction, a barcode of the receipt confirming that a transaction was made, the amount of the transaction and any other relevant information.

In one implementation, the user may select a transaction, for example transaction 1615, to view the details of the transaction. For example, the user may view the details of the items associated with the transaction and the amounts 1616 of each item. In a further implementation, the user may select the show option 1617 to view actions 1618 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1619 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 1620 shows FACEBOOK message exchanges between two users. In one implementation, a user may share a link via a message 1621. Selection of such a message having embedded link to a product may allow the user to view a description of the product and/or purchase the product directly from the history mode.

In one embodiment, the history mode may also include facilities for exporting receipts. The export receipts pop up 1622 may provide a number of options for exporting the receipts of transactions in the history. For example, a user may use one or more of the options 1625, which include save (to local mobile memory, to server, to a cloud account, and/or the like), print to a printer, fax, email, and/or the like. The user may utilize his or her address book 1623 to look up email or fax number for exporting. The user may also specify format options 1624 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 1627 to initiate export of receipts.

Figure 17A:
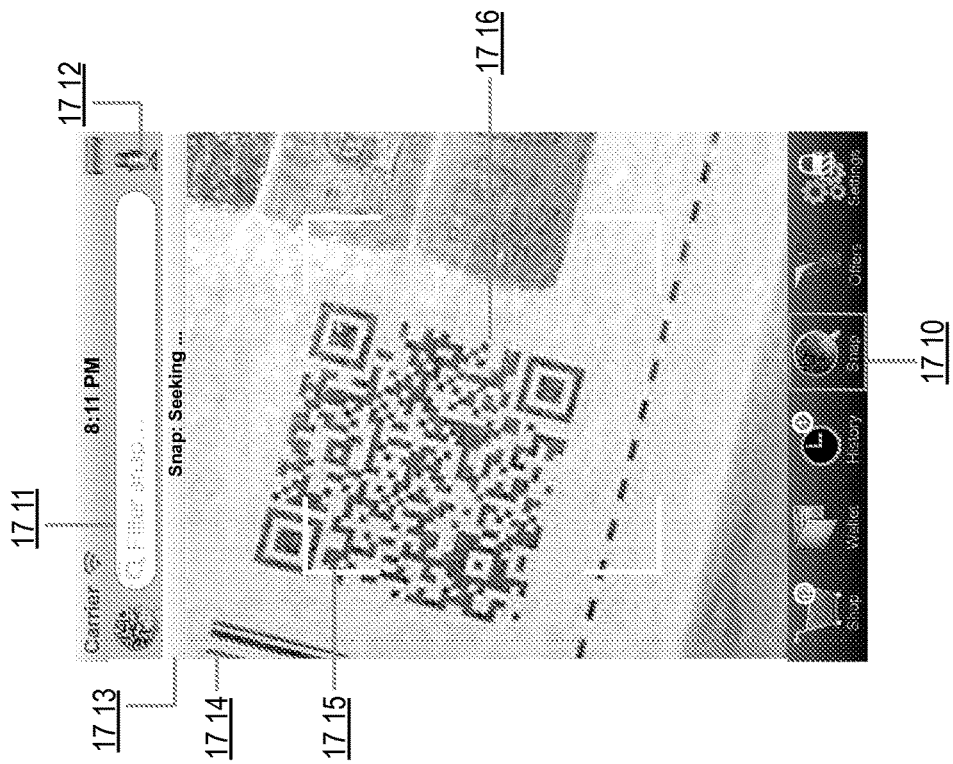

FIGS. 17A-E show user interface diagrams illustrating example features of virtual wallet applications in a snap mode, in some embodiments of the EWCP. With reference to FIG. 17A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 17A. A user may use his or her mobile phone to take a picture of a QR code 1715 and/or a barcode 1714. In one implementation, the bar 1713 and snap frame 1715 may assist the user in snapping codes properly. For example, the snap frame 1715, as shown, does not capture the entirety of the code 1716. As such, the code captured in this view may not be resolvable as information in the code may be incomplete. This is indicated by the message on the bar 1713 that indicates that the snap mode is still seeking the code. When the code 1716 is completely framed by the snap frame 1715, the bar message may be updated to, for example, "snap found." Upon finding the code, in one implementation, the user may initiate code capture using the mobile device camera. In another implementation, the snap mode may automatically snap the code using the mobile device camera.

Figure 17B:

With reference to FIG. 17B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1722 the receipt 1723 the user wants to reallocate. Alternatively, the user may directly snap a picture of a barcode on a receipt, and the snap mode may generate and display a receipt 1723 using information from the barcode. The user may now reallocate 1725. In some implementations, the user may also dispute the transaction 1724 or archive the receipt 1726.

In one implementation, when the reallocate button 1725 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1727 may be generated after the completion of the reallocation process. As discussed, the receipt shows that some charges have been moved from the Visa account to the FSA.

With reference to FIG. 17C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1732. Once the QR code is identified, the navigation bar 1731 may indicate that the pay code is identified. The user may now have an option to add to cart 1733, pay with a default payment account 1734 or pay with wallet 1735.

In one implementation, the user may decide to pay with default 1734. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1737 to share purchase information with others, reallocate 1738 as discussed with regard to FIG. 17B, and archive 1739 to store the receipt.

Figure 17D:

With reference to FIG. 17D, in one embodiment, the snap mode may also facilitate offer identification, application and storage for future use. For example, in one implementation, a user may snap an offer code 1741 (e.g., a bar code, a QR code, and/or the like). The wallet application may then generate an offer text 1742 from the information encoded in the offer code. The user may perform a number of actions on the offer code. For example, the user use the find button 1743 to find all merchants who accept the offer code, merchants in the proximity who accept the offer code, products from merchants that qualify for the offer code, and/or the like. The user may also apply the offer code to items that are currently in the cart using the add to cart button 1744. Furthermore, the user may also save the offer for future use by selecting the save button 1745.

In one implementation, after the offer or coupon 1746 is applied, the user may have the option to find qualifying merchants and/or products using find, the user may go to the wallet using 1748, and the user may also save the offer or coupon 1746 for later use.

Figure 17E:
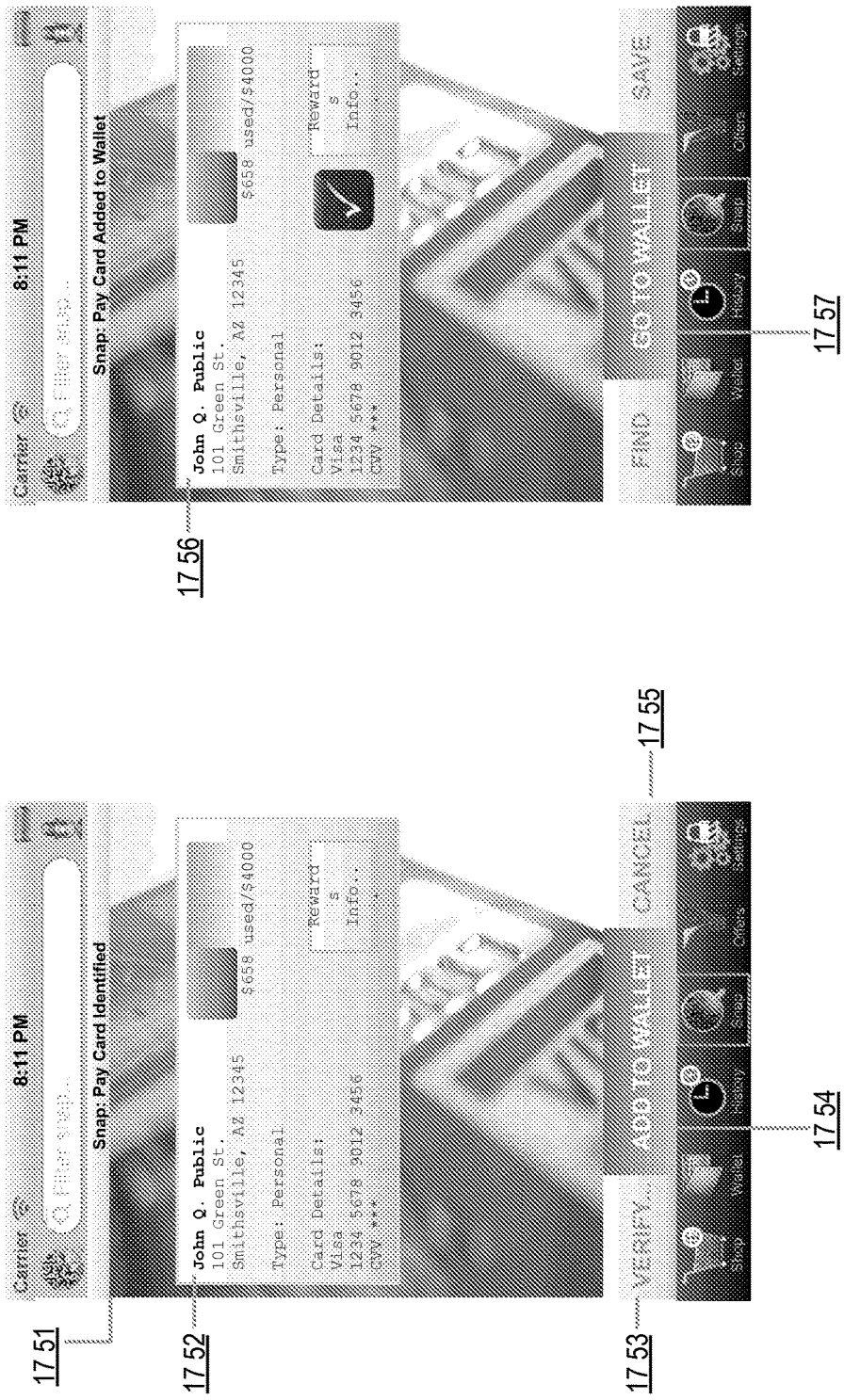

With reference to FIG. 17E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1751 and may display the textual information 1752 encoded in the pay card. The user may then perform verification of the information 1752 by selecting the verify button 1753. In one implementation, the verification may include contacting the issuer of the pay card for confirmation of the decoded information 1752 and any other relevant information. In one implementation, the user may add the pay card to the wallet by selecting the 'add to wallet' button 1754. The instruction to add the pay card to the wallet may cause the pay card to appear as one of the forms of payment under the funds tab 1516 discussed in FIG. 15A. The user may also cancel importing of the pay card as a funding source by selecting the cancel button 1755. When the pay card has been added to the wallet, the user interface may be updated to indicate that the importing is complete via the notification display 1756. The user may then access the wallet 1757 to begin using the added pay card as a funding source.

FIG. 18 shows a user interface diagram illustrating example features of virtual wallet applications, in an offers mode, in some embodiments of the EWCP. In some implementations, the EWCP may allow a user to search for offers for products and/or services from within the virtual wallet mobile application. For example, the user may enter text into a graphical user interface ("GUI") element 1811, or issue voice commands by activating GUI element 1812 and speaking commands into the device. In some implementations, the EWCP may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 1813. For example, the offer may provide a discount, and may include an expiry time. In some implementations, other users may provide gifts (e.g., 1814) to the user, which the user may redeem. In some implementations, the offers section may include alerts as to payment of funds outstanding to other users (e.g., 1815). In some implementations, the offers section may include alerts as to requesting receipt of funds from other users (e.g., 1816). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the EWCP, e.g., 1817-1819, 1820. These offers may sometimes be assembled using a combination of participating merchants, e.g., 1817. In some implementations, the EWCP itself may provide offers for users contingent on the user utilizing particular payment forms from within the virtual wallet application, e.g., 1820.

Figure 19A:
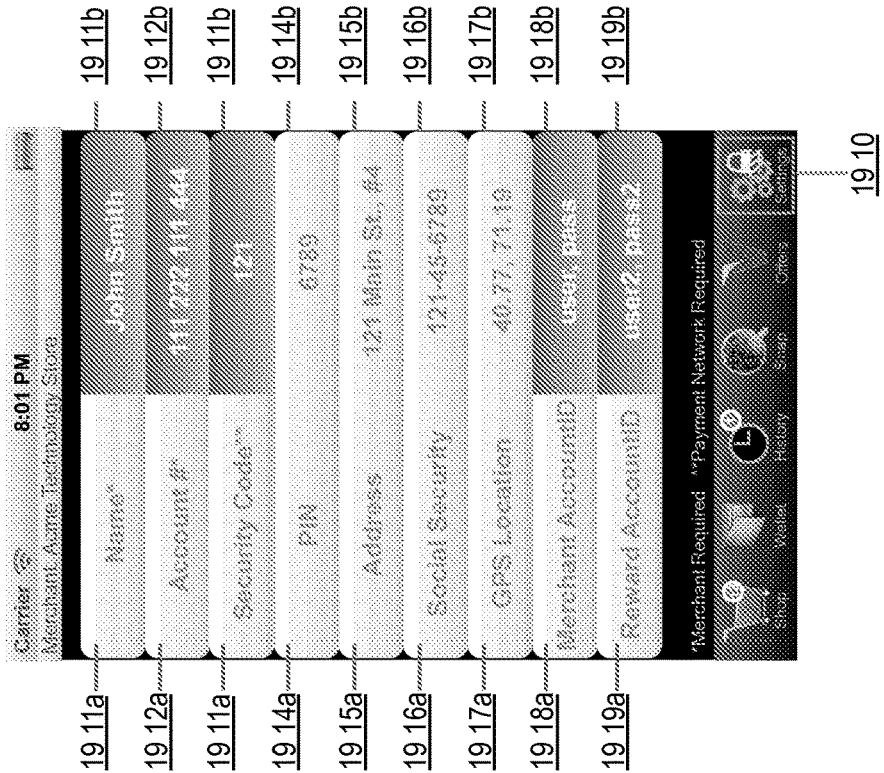
FIGS. 19A-B show user interface diagrams illustrating example features of virtual wallet applications, in a security and privacy mode, in some embodiments of the EWCP.
Figure 19B:
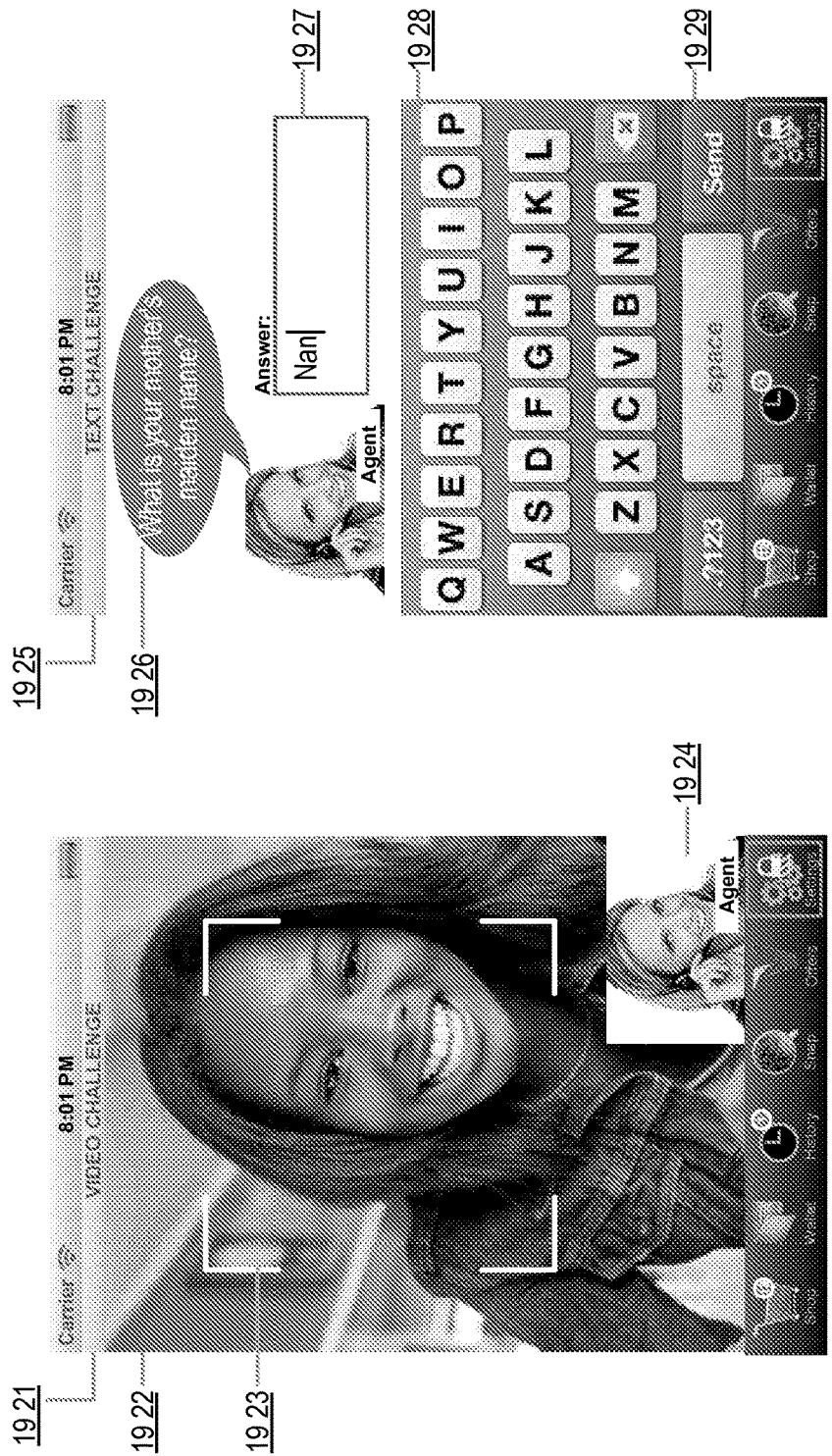

FIGS. 19A-B show user interface diagrams illustrating example features of virtual wallet applications, in a security and privacy mode, in some embodiments of the EWCP. With reference to FIG. 19A, in some implementations, the user may be able to view and/or modify the user profile and/or settings of the user, e.g., by activating a user interface element. For example, the user may be able to view/modify a user name (e.g., 1911*a-b*), account number (e.g., 1912*a-b*), user security access code (e.g., 1913-*b*), user pin (e.g., 1914-*b*), user address (e.g., 1915-*b*), social security number associated with the user (e.g., 1916-*b*), current device GPS location (e.g., 1917-*b*), user account of the merchant in whose store the user currently is (e.g., 1918-*b*), the user's rewards accounts (e.g., 1919-*b*), and/or the like. In some implementations, the user may be able to select which of the data fields and their associated values should be transmitted to facilitate the purchase transaction, thus providing enhanced data security for the user. For example, in the example illustration in FIG. 19A, the user has selected the name 1911*a*, account number 1912*a*, security code 1913*a*, merchant account ID 1918*a* and rewards account ID 1919*a* as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the EWCP with the GPS location of the user. Based on the GPS location of the user, the EWCP may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)—compliant data format and encrypted, and only the recipients who are authorized to view such records may have appropriate decryption keys to decrypt and view the private user information.

With reference to FIG. 19B, in some implementations, the app executing on the user's device may provide a "VerifyChat" feature for fraud prevention. For example, the EWCP may detect an unusual and/or suspicious transaction. The EWCP may utilize the VerifyChat feature to communicate with the user, and verify the authenticity of the originator of the purchase transaction. In various implementations, the EWCP may send electronic mail message, text (SMS) messages, Facebook® messages, Twitter™ tweets, text chat, voice chat, video chat (e.g., Apple FaceTime), and/or the like to communicate with the user. For example, the EWCP may initiate a video challenge for the user, e.g., 1921. For example, the user may need to present him/her-self via a video chat, e.g., 1922. In some implementations, a customer service representative, e.g., agent 1924, may manually determine the authenticity of the user using the video of the user. In some implementations, the EWCP may utilize face, biometric and/or like recognition (e.g., using pattern classification techniques) to determine the identity of the user. In some implementations, the app may provide reference marker (e.g., cross-hairs, target box, etc.), e.g., 1923, so that the user may the video to facilitate the EWCP's automated recognition of the user. In some implementations, the user may not have initiated the transaction, e.g., the transaction is fraudulent. In such implementations, the user may cancel the challenge. The EWCP may then cancel the transaction, and/or initiate fraud investigation procedures on behalf of the user.

In some implementations, the EWCP may utilize a text challenge procedure to verify the authenticity of the user, e.g., 1925. For example, the EWCP may communicate with the user via text chat, SMS messages, electronic mail, Facebook® messages, Twitter™ tweets, and/or the like. The EWCP may pose a challenge question, e.g., 1926, for the user. The app may provide a user input interface element(s) (e.g., virtual keyboard 1928) to answer the challenge question posed by the EWCP. In some implementations, the challenge question may be randomly selected by the EWCP automatically; in some implementations, a customer service representative may manually communicate with the user. In some implementations, the user may not have initiated the transaction, e.g., the transaction is fraudulent. In such implementations, the user may cancel the text challenge. The EWCP may cancel the transaction, and/or initiate fraud investigation on behalf of the user.

EWCP Controller

FIG. 20 shows a block diagram illustrating example aspects of a EWCP controller 2001. In this embodiment, the EWCP controller 2001 may serve to aggregate, process, store, search, serve, identify, instruct, generate, match, and/or facilitate interactions with a computer through various technologies, and/or other related data.

Users, e.g., 2033*a*, which may be people and/or other systems, may engage information technology systems (e.g., computers) to facilitate information processing. In turn, computers employ processors to process information; such processors 2003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the EWCP controller 2001 may be connected to and/or communicate with entities such as, but not limited to: one or more users from user input devices 2011; peripheral devices 2012; an optional cryptographic processor device 2028; and/or a communications network 2013. For example, the EWCP controller 2001 may be connected to and/or communicate with users, e.g., 2033a, operating client device(s), e.g., 2033b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The EWCP controller 2001 may be based on computer systems that may comprise, but are not limited to, components such as: a computer systemization 2002 connected to memory 2029.

Computer Systemization

A computer systemization 2002 may comprise a clock 2030, central processing unit ("CPU(s)" and/or "processor(s)" (these terms are used interchangeably throughout the disclosure unless noted to the contrary)) 2003, a memory 2029 (e.g., a read only memory (ROM) 2006, a random access memory (RAM) 2005, etc.), and/or an interface bus 2007, and most frequently, although not necessarily, are all interconnected and/or communicating through a system bus 2004 on one or more (mother)board(s) 2002 having conductive and/or otherwise transportive circuit pathways through which instructions (e.g., binary encoded signals) may travel to effectuate communications, operations, storage, etc. The computer systemization may be connected to a power source 2086; e.g., optionally the power source may be internal. Optionally, a cryptographic processor 2026 and/or transceivers (e.g., ICs) 2074 may be connected to the system bus. In another embodiment, the cryptographic processor and/or transceivers may be connected as either internal and/or external peripheral devices 2012 via the interface bus I/O. In turn, the transceivers may be connected to antenna(s) 2075, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing EWCP controller to determine its location)); Broadcom BCM4329FKUBG transceiver chip (e.g., providing 802.11n, Bluetooth 2.1+ EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 2029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the EWCP controller and beyond through various interfaces. Should processing requirements dictate a greater amount speed and/or capacity, distributed processors (e.g., Distributed EWCP), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the EWCP may be achieved by implementing a microcontroller such as CAST's R8051XC2 microcontroller; Intel's MCS 51 (i.e., 8051 microcontroller); and/or the like. Also, to implement certain features of the EWCP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the EWCP component collection (distributed or otherwise) and/or features may be implemented via the microprocessor and/or via embedded components; e.g., via ASIC, coprocessor, DSP, FPGA, and/or the like. Alternately, some implementations of the EWCP may be implemented with embedded components that are configured and used to achieve a variety of features or signal processing.

Depending on the particular implementation, the embedded components may include software solutions, hardware solutions, and/or some combination of both hardware/software solutions. For example, EWCP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the EWCP features. A hierarchy of programmable interconnects allow logic blocks to be interconnected as needed by the EWCP system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the EWCP may be developed on regular FPGAs and then migrated into a fixed version that more resembles ASIC implementations. Alternate or coordinating implementations may migrate EWCP controller features to a final ASIC instead of or in addition to FPGAs. Depending on the implementation all of the aforementioned embedded components and microprocessors may be considered the "CPU" and/or "processor" for the EWCP.

Power Source

The power source 2086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2086 is connected to at least one of the interconnected subsequent components of the EWCP thereby providing an electric current to all the interconnected components. In one example, the power source 2086 is connected to the system bus component 2004. In an alternative embodiment, an outside power source 2086 is provided through a connection across the I/O 2008 interface. For example, a USB and/or IEEE 1394 connection carries both data and power across the connection and is therefore a suitable source of power.

Interface Adapters

Interface bus(ses) 2007 may accept, connect, and/or communicate to a number of interface adapters, frequently, although not necessarily in the form of adapter cards, such as but not limited to: input output interfaces (I/O) 2008, storage interfaces 2009, network interfaces 2010, and/or the like. Optionally, cryptographic processor interfaces 2027 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)IS A), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 2009 may accept, communicate, and/or connect to a number of storage devices such as, but not limited to: storage devices 2014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 2010 may accept, communicate, and/or connect to a communications network 2013. Through a communications network 2013, the EWCP controller is accessible through remote clients 2033*b* (e.g., computers with web browsers) by users 2033*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed EWCP), architectures may similarly be employed to pool, load balance, and/or otherwise increase the communicative bandwidth required by the EWCP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2010 may be used to engage with various communications network types 2013. For example, multiple network interfaces may be employed to allow for the communication over broadcast, multicast, and/or unicast networks.

Input Output interfaces (I/O) 2008 may accept, communicate, and/or connect to user input devices 2011, peripheral devices 2012, cryptographic processor devices 2028, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 2011 often are a type of peripheral device 2012 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2012 may be connected and/or communicate to I/O and/or other facilities of the like such as network interfaces, storage interfaces, directly to the interface bus, system bus, the CPU, and/or the like. Peripheral devices may be external, internal and/or part of the EWCP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 2028), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the EWCP controller may be embodied as an embedded, dedicated, and/or monitor-less (i.e., headless) device, wherein access would be provided over a network interface connection.

Cryptographic units such as, but not limited to, microcontrollers, processors 2026, interfaces 2027, and/or devices 2028 may be attached, and/or communicate with the EWCP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2029. However, memory is a fungible technology and resource, thus, any number of memory embodiments may be employed in lieu of or in concert with one another. It is to be understood that the EWCP controller and/or a computer systemization may employ various forms of memory 2029. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 2029 may include ROM 2006, RAM 2005, and a storage device 2014. A storage device 2014 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2029 may contain a collection of program and/or database components and/or data such as, but not limited to: operating system component(s) 2015 (operating system); information server component(s) 2016 (information server); user interface component(s) 2017 (user interface); Web browser component(s) 2018 (Web browser); database(s) 2019; mail server component(s) 2021; mail client component(s) 2022; cryptographic server component(s) 2020 (cryptographic server); the EWCP component(s) 2035; and/or the like (i.e., collectively a component collection). These components may be stored and accessed from the storage devices and/or from storage devices accessible through an interface bus. Although non-conventional program components such as those in the component collection may be stored in a local storage device 2014, they may also be loaded and/or stored in memory such as: peripheral devices, RAM, remote storage facilities through a communications network, ROM, various forms of memory, and/or the like.

Operating System

The operating system component 2015 is an executable program component facilitating the operation of the EWCP controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the EWCP controller to communicate with other entities through a communications network 2013. Various communication protocols may be used by the EWCP controller as a subcarrier transport mechanism for interaction, such as, but not limited to: multicast, TCP/IP, UDP, unicast, and/or the like.

Information Server

An information server component 2016 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the EWCP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the EWCP database 2019, operating systems, other program components, user interfaces, Web browsers, and/or the like.

Access to the EWCP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the EWCP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the EWCP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 2017 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2018 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the EWCP equipped nodes. The combined application may be nugatory on systems employing standard Web browsers.

Mail Server

A mail server component 2021 is a stored program component that is executed by a CPU 2003. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the EWCP.

Access to the EWCP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2022 is a stored program component that is executed by a CPU 2003. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2020 is a stored program component that is executed by a CPU 2003, cryptographic component 2026, cryptographic processor interface 2027, cryptographic processor device 2028, and/or the like.

Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the EWCP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the EWCP component to engage in secure transactions if so desired. The cryptographic component facilitates the secure accessing of resources on the EWCP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The EWCP Database

The EWCP database component 2019 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the EWCP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the EWCP database is implemented as a data-structure, the use of the EWCP database 2019 may be integrated into another component such as the EWCP component 2035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2019 includes several tables 2019a-p. A Users table 2019a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a EWCP. A Devices table 2019b may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed_flag, and/or the like. An Apps table 2019c may include fields such as, but not limited to: app_ID, app_name, app_type, app_dependencies, app_access_code, user_pin, and/or the like. An Accounts table 2019d may include fields such as, but not limited to: account_number, account_security_code, account_name, issuer_acquirer_flag, issuer_name, acquirer_name, account_address, routing_number, access_API_call, linked_wallets_list, and/or the like. A Merchants table 2019e may include fields such as, but not limited to: merchant_id, merchant_name, merchant_address, store_id, ip_address, mac_address, auth_key, port_num, security_settings_list, and/or the like. An Issuers table 2019f may include fields such as, but not limited to: issuer_id, issuer_name, issuer_address, ip_address, mac_address, auth_key, port_num, security_settings_list, and/or the like. An Acquirers table 2019g may include fields such as, but not limited to: account_firstname, account_lastname, account_type, account_num, account_balance_list, billingaddress_line1, billingaddress_line2, billing_zipcode, billing_state, shipping_preferences, shippingaddress)line1, shippingaddress_line2, shipping_zipcode, shipping_state, and/or the like. A Pay Gateways table 2019h may include fields such as, but not limited to: gateway_ID, gateway_IP, gateway_MAC, gateway_secure_key, gateway_access_list, gateway_API_call_list, gateway_services_list, and/or the like. A Shop Sessions table 2019i may include fields such as, but not limited to: user_id, session_id, alerts_URL, timestamp, expiry Japse, merchant_id, store_id, device_type, device_ID, device_IP, device_MAC, device_browser, device_serial, device_ECID, device_model, device_OS, wallet_app_installed, total_cost, cart_ID_list, product_params_list, social_flag, social_message, social_networks_list, coupon_lists, accounts_list, CVV2_lists, charge_ratio_list, charge_priority_list, value_exchange_symbols_list, bill_address, ship_address, cloak_flag, pay_mode, alerts_rules_list, and/or the like. A Transactions table 2019*j* may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 2019*k* may include fields such as, but not limited to: batch_id, transaction_id_list, timestamp_list, cleared_flag_list, clearance_trigger_settings, and/or the like. A Ledgers table 2019*l* may include fields such as, but not limited to: request_id, timestamp, deposit_amount, batch_id, transaction_id, clear_flag, deposit_account, transaction_summary, payor_name, payor_account, and/or the like. A Products table 2019*m* may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 2019*n* may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 2019*o* may include fields such as, but not limited to: user_id, timestamp, activity_type, activity_location, activity_attribute_list, activity_attribute_values_list, and/or the like. An Analytics table 2019*p* may include fields such as, but not limited to: report_id, user_id, report_type, report_algorithm_id, report_destination_address, and/or the like. In one embodiment, the EWCP database may interact with other database systems. For example, employing a distributed database system, queries and data access by search EWCP component may treat the combination of the EWCP database, an integrated data security layer database as a single database entity.

In one embodiment, user programs may contain various user interface primitives, which may serve to update the EWCP. Also, various accounts may require custom database tables depending upon the environments and the types of clients the EWCP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2019*a-p*. The EWCP may be configured to keep track of various settings, inputs, and parameters via database controllers.

The EWCP database may communicate to and/or with other components in a component collection, including itself, and/or facilities of the like. Most frequently, the EWCP database communicates with the EWCP component, other program components, and/or the like. The database may contain, retain, and provide information regarding other nodes and data.

The EWCPs

The EWCP component 2035 is a stored program component that is executed by a CPU. In one embodiment, the EWCP component incorporates any and/or all combinations of the aspects of the EWCP discussed in the previous figures. As such, the EWCP affects accessing, obtaining and the provision of information, services, transactions, and/or the like across various communications networks. The features and embodiments of the EWCP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the EWCP's features and facilities, and in many cases reduce the costs, energy consumption/ requirements, and extend the life of EWCP's underlying infrastructure; this has the added benefit of making the EWCP more reliable. Similarly, many of the features and mechanisms are designed to be easier for users to use and access, thereby broadening the audience that may enjoy/ employ and exploit the feature sets of the EWCP; such ease of use also helps to increase the reliability of the EWCP. In addition, the feature sets include heightened security as noted via the Cryptographic components 2020, 2026, 2028 and throughout, making access to the features and data more reliable and secure.

The EWCP component may transform customer purchase requests triggering electronic wallet applications via EWCP components into electronic purchase confirmation and receipts, and/or the like and use of the EWCP. In one embodiment, the EWCP component 2035 takes inputs (e.g., customer purchase request 305; checkout request 711; product data 715; wallet access input 911; transaction authorization input 914; payment gateway address 918; payment network address 922; issuer server address(es) 925; funds authorization request(s) 926; user(s) account(s) data 928; batch data 1112; payment network address 1116; issuer server address(es) 1124; individual payment request 1125; payment ledger, merchant account data 1131; and/or the like) etc., and transforms the inputs via various components (e.g., UPC 2041; PTA 2042; PTC 2043; EWCPT 2044; EWCPA 2045; EWC 2046; and/or the like), into outputs (e.g., customer purchase response 350; payment confirmation 340; checkout request message 713; checkout data 717; card authorization request 916, 923; funds authorization response(s) 930; transaction authorization response 932; batch append data 934; purchase receipt 935; batch clearance request 1114; batch payment request 1118; transaction data 1120; individual payment confirmation 1128, 1129; updated payment ledger, merchant account data 1133; and/or the like).

The EWCP component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the EWCP server employs a cryptographic server to encrypt and decrypt communications. The EWCP component may communicate to and/or with other components in a component collection, including itself, and/or facilities of the like. Most frequently, the EWCP component communicates with the EWCP database, operating systems, other program components, and/or the like. The EWCP may contain, communicate, generate, obtain, and/or provide program component, system, user, and/or data communications, requests, and/or responses.

Distributed EWCPs

The structure and/or operation of any of the EWCP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the EWCP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the EWCP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address='192.168.0.100';
$port=255;
//create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
```

```
//read input data from client device in 1024 byte blocks
    until end of message
do {
    $input=" ",
    $input=socket_read($client, 1024);
    $data.=$input;
} while($input !=" ");
//parse data to extract variables
$obj=json_decode($data, true);
//store input data in a database
mysql_connect("201.408.185.132",$DBserver,$pass-
    word); //access database server
mysql_select("CLIENT_DB.SQL"); //select database to
    append
mysql_query("INSERT INTO UserTable (transmission)
    VALUES ($data)"); //add data to UserTable table in a
    CLIENT database
mysql_close("CLIENT_DB.SQL"); //close connection
    to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

Non-limiting example embodiments highlighting numerous further advantageous aspects include:

1. An e-wallet checkout processor-implemented method embodiment, comprising:
   receiving a merchant payment request;
   determining a web-to-wallet transition payment protocol handler associated with the merchant payment request;
   instantiating, via a processor, a wallet application via the payment protocol handler;
   obtaining a payment method selection via the wallet application;
   providing a transaction execution request for a transaction associated with the merchant payment request;
   receiving a purchase response to the transaction execution request; and
   outputting purchase response information derived from the received purchase response.

2. The method of embodiment 1, wherein the payment protocol handler includes a purchase transaction parameter.

3. The method of embodiment 2, wherein the purchase transaction parameter includes one of: a selected payment method; a user-selected merchandise; a merchandise price; an applicable discounts; and an offer.

4. The method of embodiment 1, further comprising:
   receiving a merchant payment request resulting from a transaction initiated from an initiating webpage; and
   transistioning to the wallet application from the initiating webpage.

5. The method of embodiment 1, wherein the payment method selection is obtained by determining a default payment method.

6. The method of embodiment 1, wherein the payment method selection is an electronic wallet.

7. The method of embodiment 1, wherein the payment method selection is one of a credit card, a debit card, a gift card.

8. The method of embodiment 1, further comprising:
   obtaining an authorization to use the payment method selection for the transaction.

9. The method of embodiment 1, wherein the wallet application is one of: a Java applet; an HTML application; and a Javascript application.

10. The method of embodiment 1, wherein the purchase response information comprises a receipt.

11. The method of embodiment 1, further comprising:
    determining a discount associated with the payment method selection; and
    calculating a purchase price for the transaction associated with the merchant payment request by applying the discount associated with the payment method selection.

12. The method of embodiment 1, further comprising:
    displaying a default redirect page.

13. The method of embodiment 1, further comprising:
    displaying a redirect page specified by a merchant associated with the merchant payment request.

14. The method of embodiment 1, further comprising:
    obtaining a virtual merchant store injection package;
    instantiating the virtual merchant store within the wallet application for display and interaction; and
    wherein the transaction associated with the merchant payment request includes purchase of a merchandise displayed in the virtual merchant store.

15. An e-wallet checkout means embodiment, comprising means for:
    receiving a merchant payment request;
    determining a web-to-wallet transition payment protocol handler associated with the merchant payment request;
    instantiating, via a processor, a wallet application via the payment protocol handler;
    obtaining a payment method selection via the wallet application;
    providing a transaction execution request for a transaction associated with the merchant payment request;
    receiving a purchase response to the transaction execution request; and
    outputting purchase response information derived from the received purchase response.

16. The means of embodiment 15, wherein the payment protocol handler includes a purchase transaction parameter.

17. The means of embodiment 16, wherein the purchase transaction parameter includes one of: a selected payment method; a user-selected merchandise; a merchandise price; an applicable discounts; and an offer.

18. The means of embodiment 15, further comprising means for:
    receiving a merchant payment request resulting from a transaction initiated from an initiating webpage; and
    transistioning to the wallet application from the initiating webpage.

19. The means of embodiment 15, wherein the payment method selection is obtained by determining a default payment method.

20. The means of embodiment 15, wherein the payment method selection is an electronic wallet.

21. The means of embodiment 15, wherein the payment method selection is one of a credit card, a debit card, a gift card.

22. The means of embodiment 15, further comprising means for:
  obtaining an authorization to use the payment method selection for the transaction.

23. The means of embodiment 15, wherein the wallet application is one of: a Java applet; an HTML application; and a Javascript application.

24. The means of embodiment 15, wherein the purchase response information comprises a receipt.

25. The means of embodiment 15, further comprising means for:
  determining a discount associated with the payment method selection; and
  calculating a purchase price for the transaction associated with the merchant payment request by applying the discount associated with the payment method selection.

26. The means of embodiment 15, further comprising means for:
  displaying a default redirect page.

27. The means of embodiment 15, further comprising means for:
  displaying a redirect page specified by a merchant associated with the merchant payment request.

28. The means of embodiment 15, further comprising means for:
  obtaining a virtual merchant store injection package;
  instantiating the virtual merchant store within the wallet application for display and interaction; and
  wherein the transaction associated with the merchant payment request includes purchase of a merchandise displayed in the virtual merchant store.

29. An e-wallet checkout apparatus embodiment, comprising:
  a processor; and
  a memory disposed in communication with the processor and storing processor-issuable instructions to:
    receive a merchant payment request;
    determine a web-to-wallet transition payment protocol handler associated with the merchant payment request;
    instantiate, via the processor, a wallet application via the payment protocol handler;
    obtain a payment method selection via the wallet application;
    provide a transaction execution request for a transaction associated with the merchant payment request;
    receive a purchase response to the transaction execution request; and
    output purchase response information derived from the received purchase response.

30. The apparatus of embodiment 29, wherein the payment protocol handler includes a purchase transaction parameter.

31. The apparatus of embodiment 30, wherein the purchase transaction parameter includes one of: a selected payment method; a user-selected merchandise; a merchandise price; an applicable discounts; and an offer.

32. The apparatus of embodiment 29, the memory further storing instructions to:
  receive a merchant payment request resulting from a transaction initiated from an initiating webpage; and
  transistion to the wallet application from the initiating webpage.

33. The apparatus of embodiment 29, wherein the payment method selection is obtained by determining a default payment method.

34. The apparatus of embodiment 29, wherein the payment method selection is an electronic wallet.

35. The apparatus of embodiment 29, wherein the payment method selection is one of a credit card, a debit card, a gift card.

36. The apparatus of embodiment 29, the memory further storing instructions to:
  obtain an authorization to use the payment method selection for the transaction.

37. The apparatus of embodiment 29, wherein the wallet application is one of: a Java applet; an HTML application; and a Javascript application.

38. The apparatus of embodiment 29, wherein the purchase response information comprises a receipt.

39. The apparatus of embodiment 29, the memory further storing instructions to:
  determine a discount associated with the payment method selection; and
  calculate a purchase price for the transaction associated with the merchant payment request by applying the discount associated with the payment method selection.

40. The apparatus of embodiment 29, the memory further storing instructions to:
  display a default redirect page.

41. The apparatus of embodiment 29, the memory further storing instructions to:
  display a redirect page specified by a merchant associated with the merchant payment request.

42. The apparatus of embodiment 29, the memory further storing instructions to:
  obtain a virtual merchant store injection package;
  instantiate the virtual merchant store within the wallet application for display and interaction; and
  wherein the transaction associated with the merchant payment request includes purchase of a merchandise displayed in the virtual merchant store.

43. A computer-readable tangible medium embodiment storing computer-executable e-wallet checkout instructions to:
  receive a merchant payment request;
  determine a web-to-wallet transition payment protocol handler associated with the merchant payment request;
  instantiate a wallet application via the payment protocol handler;
  obtain a payment method selection via the wallet application;
  provide a transaction execution request for a transaction associated with the merchant payment request;
  receive a purchase response to the transaction execution request; and
  output purchase response information derived from the received purchase response.

44. The medium of embodiment 43, wherein the payment protocol handler includes a purchase transaction parameter.

45. The medium of embodiment 44, wherein the purchase transaction parameter includes one of: a selected payment method; a user-selected merchandise; a merchandise price; an applicable discounts; and an offer.

46. The medium of embodiment 43, further storing instructions to:
  receive a merchant payment request resulting from a transaction initiated from an initiating webpage; and
  transistion to the wallet application from the initiating webpage.

47. The medium of embodiment 43, wherein the payment method selection is obtained by determining a default payment method.

48. The medium of embodiment 43, wherein the payment method selection is an electronic wallet.

49. The medium of embodiment 43, wherein the payment method selection is one of a credit card, a debit card, a gift card.

50. The medium of embodiment 43, further storing instructions to:
obtain an authorization to use the payment method selection for the transaction.

51. The medium of embodiment 43, wherein the wallet application is one of: a Java applet; an HTML application; and a Javascript application.

52. The medium of embodiment 43, wherein the purchase response information comprises a receipt.

53. The medium of embodiment 43, further storing instructions to:
determine a discount associated with the payment method selection; and
calculate a purchase price for the transaction associated with the merchant payment request by applying the discount associated with the payment method selection.

54. The medium of embodiment 43, further storing instructions to:
display a default redirect page.

55. The medium of embodiment 43, further storing instructions to:
display a redirect page specified by a merchant associated with the merchant payment request.

56. The medium of embodiment 43, further storing instructions to:
obtain a virtual merchant store injection package;
instantiate the virtual merchant store within the wallet application for display and interaction; and
wherein the transaction associated with the merchant payment request includes purchase of a merchandise displayed in the virtual merchant store.

57. An e-wallet checkout platform processor-implemented method embodiment, comprising:
providing a webpage including a merchant payment request and a web-to-wallet transition payment protocol handler associated with the merchant payment request;
wherein the protocol handler is consumer-triggerable for instantiating a wallet application via the protocol handler;
obtaining a payment method selection in response to providing the webpage from an instantiated wallet application;
obtaining a transaction execution request for a transaction associated with the merchant payment request;
providing a purchase response to the transaction execution request.

58. The method of embodiment 57, wherein the transaction execution request is obtained at one of: a merchant server; an issuer server; an acquirer server; and a payment network server.

59. The method of embodiment 57, wherein the payment protocol handler includes a 60. The method of embodiment 59, wherein the purchase transaction parameter includes one of: a selected payment method; a user-selected merchandise; a merchandise price; an applicable discounts; and an offer.

61. The method of embodiment 57, further comprising:
providing a merchant payment request resulting from a transaction initiated from an initiating webpage; and
obtaining a response from a wallet application instantiated based on the provided webpage.

62. The method of embodiment 57, wherein the payment method selection is obtained by determining a default payment method.

63. The method of embodiment 57, wherein the payment method selection is an electronic wallet.

64. The method of embodiment 57, wherein the payment method selection is one of a credit card, a debit card, a gift card.

The method of embodiment 57, further comprising:
obtaining an authorization to use the payment method selection for the transaction.

66. The method of embodiment 57, wherein the provided purchase response to the transaction execution request includes a purchase receipt.

67. The method of embodiment 57, further comprising:
determining a discount associated with the payment method selection; and
calculating a purchase price for the transaction associated with the merchant payment request by applying the discount associated with the payment method selection.

68. The method of embodiment 57, further comprising:
providing a virtual merchant store injection package;
instantiating the virtual merchant store within the wallet application for display and interaction; and
wherein the transaction associated with the merchant payment request includes purchase of a merchandise displayed in the virtual merchant store.

69. An e-wallet checkout platform means embodiment, comprising means for:
providing a webpage including a merchant payment request and a web-to-wallet transition payment protocol handler associated with the merchant payment request;
wherein the protocol handler is consumer-triggerable for instantiating a wallet application via the protocol handler;
obtaining a payment method selection in response to providing the webpage from an instantiated wallet application;
obtaining a transaction execution request for a transaction associated with the merchant payment request;
providing a purchase response to the transaction execution request.

70. The means of embodiment 69, wherein the transaction execution request is obtained at one of: a merchant server; an issuer server; an acquirer server; and a payment network server.

71. The means of embodiment 69, wherein the payment protocol handler includes a purchase transaction parameter.

72. The means of embodiment 71, wherein the purchase transaction parameter includes one of: a selected payment method; a user-selected merchandise; a merchandise price; an applicable discounts; and an offer.

73. The means of embodiment 69, further comprising means for:
providing a merchant payment request resulting from a transaction initiated from an initiating webpage; and
obtaining a response from a wallet application instantiated based on the provided webpage.

74. The means of embodiment 69, wherein the payment method selection is obtained by determining a default payment method.

75. The means of embodiment 69, wherein the payment method selection is an electronic wallet.

76. The means of embodiment 69, wherein the payment method selection is one of a credit card, a debit card, a gift card.

77. The means of embodiment 69, further comprising means for:
 obtaining an authorization to use the payment method selection for the transaction.

78. The means of embodiment 69, wherein the provided purchase response to the transaction execution request includes a purchase receipt.

79. The means of embodiment 69, further comprising means for:
 determining a discount associated with the payment method selection; and
 calculating a purchase price for the transaction associated with the merchant payment request by applying the discount associated with the payment method selection.

The means of embodiment 69, further comprising means for:
 providing a virtual merchant store injection package;
 instantiating the virtual merchant store within the wallet application for display and interaction; and
 wherein the transaction associated with the merchant payment request includes purchase of a merchandise displayed in the virtual merchant store.

81. An e-wallet checkout platform system embodiment, comprising:
 a processor; and
 a memory disposed in communication with the processor and storing processor-issuable instructions to:
  provide a webpage including a merchant payment request and a web-to-wallet transition payment protocol handler associated with the merchant payment request;
  wherein the protocol handler is consumer-triggerable for instantiating a wallet application via the protocol handler;
  obtain a payment method selection in response to providing the webpage from an instantiated wallet application;
  obtain a transaction execution request for a transaction associated with the merchant payment request;
  provide a purchase response to the transaction execution request.

82. The system of embodiment 81, wherein the transaction execution request is obtained at one of: a merchant server; an issuer server; an acquirer server; and a payment network server.

83. The system of embodiment 81, wherein the payment protocol handler includes a 84. The system of embodiment 83, wherein the purchase transaction parameter includes one of: a selected payment method; a user-selected merchandise; a merchandise price; an applicable discounts; and an offer.

85. The system of embodiment 81, the memory further storing instructions to:
 provide a merchant payment request resulting from a transaction initiated from an initiating webpage; and
 obtain a response from a wallet application instantiated based on the provided webpage.

86. The system of embodiment 81, wherein the payment method selection is obtained by determining a default payment method.

87. The system of embodiment 81, wherein the payment method selection is an electronic wallet.

88. The system of embodiment 81, wherein the payment method selection is one of a credit card, a debit card, a gift card.

89. The system of embodiment 81, the memory further storing instructions to:
 obtain an authorization to use the payment method selection for the transaction.

90. The system of embodiment 81, wherein the provided purchase response to the transaction execution request includes a purchase receipt.

91. The system of embodiment 81, the memory further storing instructions to:
 determine a discount associated with the payment method selection; and
 calculate a purchase price for the transaction associated with the merchant payment request by applying the discount associated with the payment method selection.

92. The system of embodiment 81, the memory further storing instructions to:
 provide a virtual merchant store injection package;
 instantiate the virtual merchant store within the wallet application for display and interaction; and
 wherein the transaction associated with the merchant payment request includes purchase of a merchandise displayed in the virtual merchant store.

93. A computer-readable tangible medium embodiment storing computer-executable e-wallet checkout platform instructions to:
 provide a webpage including a merchant payment request and a web-to-wallet transition payment protocol handler associated with the merchant payment request;
 wherein the protocol handler is consumer-triggerable for instantiating a wallet application via the protocol handler;
 obtain a payment method selection in response to providing the webpage from an instantiated wallet application;
 obtain a transaction execution request for a transaction associated with the merchant payment request;
 provide a purchase response to the transaction execution request.

94. The medium of embodiment 93, wherein the transaction execution request is obtained at one of: a merchant server; an issuer server; an acquirer server; and a payment network server.

95. The medium of embodiment 93, wherein the payment protocol handler includes a purchase transaction parameter.

96. The medium of embodiment 95, wherein the purchase transaction parameter includes one of: a selected payment method; a user-selected merchandise; a merchandise price; an applicable discounts; and an offer.

97. The medium of embodiment 93, further storing instructions to:
 provide a merchant payment request resulting from a transaction initiated from an initiating webpage; and
 obtain a response from a wallet application instantiated based on the provided webpage.

98. The medium of embodiment 93, wherein the payment method selection is obtained by determining a default payment method.

99. The medium of embodiment 93, wherein the payment method selection is an electronic wallet.

100. The medium of embodiment 93, wherein the payment method selection is one of a credit card, a debit card, a gift card.

101. The medium of embodiment 93, further storing instructions to:
 obtain an authorization to use the payment method selection for the transaction.

102. The medium of embodiment 93, wherein the provided purchase response to the transaction execution request includes a purchase receipt.

103. The medium of embodiment 93, further storing instructions to:
    determine a discount associated with the payment method selection; and
    calculate a purchase price for the transaction associated with the merchant payment request by applying the discount associated with the payment method selection.

104. The medium of embodiment 93, further storing instructions to:
    provide a virtual merchant store injection package;
    instantiate the virtual merchant store within the wallet application for display and interaction; and
    wherein the transaction associated with the merchant payment request includes purchase of a merchandise displayed in the virtual merchant store.

In order to address various issues and advance the art, the entirety of this application for ELECTRONIC WALLET CHECKOUT PLATFORM APPARATUSES, METHODS AND SYSTEMS (including the Cover Page, Title, Headings, Field, Background, Summary, Brief Description of the Drawings, Detailed Description, Claims, Abstract, FIGURES, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a EWCP individual and/or enterprise user, database configuration and/or relational model, data type, data transmission and/or network framework, syntax structure, and/or the like, various embodiments of the EWCP may be implemented that allow a great deal of flexibility and customization. For example, aspects of the EWCP may be adapted for facilitating donations, creating web-based operating systems, and/or the like. While various embodiments and discussions of the EWCP have been directed to electronic purchase transactions, however, it is to be understood that the embodiments described herein may be readily configured and/or customized for a wide variety of other applications and/or implementations.

What is claimed is:

1. An e-wallet checkout system, comprising:
    a memory storing processor-issuable instructions; and
    a server having a processor that is in communication with the memory, the processor executing the processor-issuable instructions to:
    receive, from a merchant server, a selection from a user device of an item for purchase from the merchant server;
    receive, from the merchant server, a merchant payment request for the item, wherein the merchant payment request comprises a payment protocol string;
    parse the merchant payment request to identify the payment protocol string within the payment request, wherein the payment protocol string comprises a plurality of payment protocol handlers, wherein at least one of the payment protocol handlers indicates the merchant server uses an electronic wallet checkout platform (EWCP) supported protocol;
    determine an appropriate payment protocol handler from the plurality of payment protocol handlers within the identified payment protocol string in the merchant payment request, wherein the plurality of protocol handlers comprises at least one of a customer type, device type, or operating system type, wherein the appropriate payment protocol handler is determined based on a ranking of the plurality of payment protocol handlers;
    process the merchant payment request using the appropriate payment protocol handler, wherein the payment protocol handler that indicates that the merchant server uses an EWCP supported protocol is used to transition from a web browser to an electronic wallet;
    in response to the payment protocol string indicating the merchant server uses an EWCP supported protocol, instantiate, on the user device, a wallet application, based on the appropriate payment protocol handler;
    obtain, from the user device, a payment method selection via the wallet application; provide a transaction execution request including the selected payment method to the merchant server to initiate payment to the merchant according to the merchant payment request, receive a purchase response to the transaction execution request from a checkout server, and output purchase response information derived from the received purchase response.

2. The system of claim 1, wherein the appropriate payment protocol handler includes a purchase transaction parameter.

3. The system of claim 2, wherein the purchase transaction parameter includes one of a selected payment method, a merchandise price, an applicable discount, and an offer.

4. The system of claim 1, further including processor issuable instructions to: obtain security credentials to launch the wallet application wherein the wallet application is further instantiated in response to verification of the security credentials.

5. The system of claim 1, wherein the payment method selection is obtained by determining a default payment method.

6. The system of claim 1, wherein the payment method selection is an electronic wallet.

7. The system of claim 1, wherein the payment method selection is one of a credit card, a debit card, and a gift card.

8. The system of claim 1, further including processor-issuable instructions to: determine that a store injection package is available from the merchant server to inject into the wallet application after receipt of the merchant payment request; and in response to a determination that the store injection package is available, inject a store into the wallet application to allow selection of additional items for purchase from the store prior to obtaining the payment method.

9. The system of claim 1, wherein the wallet application is one of a Java applet, an HTML application, and a Javascript application.

10. The system of claim 1, further including processor-issuable instructions to: display a redirect page specified by a merchant associated with the merchant payment request.

* * * * *